United States Patent
Horie et al.

(10) Patent No.: US 7,277,376 B2
(45) Date of Patent: Oct. 2, 2007

(54) OPTICAL RECORDING METHOD

(75) Inventors: Michikazu Horie, Minato-ku (JP);
Takashi Ohno, Minato-ku (JP);
Kenjirou Kiyono, Minato-ku (JP);
Masae Kubo, Minato-ku (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 0 days.

(21) Appl. No.: 11/251,941

(22) Filed: Oct. 18, 2005

(65) Prior Publication Data

US 2006/0062125 A1  Mar. 23, 2006

Related U.S. Application Data

(63) Continuation of application No. PCT/JP2004/010574, filed on Jul. 16, 2004.

(30) Foreign Application Priority Data

| Jul. 18, 2003 | (JP) | ............................. 2003-199522 |
| Sep. 25, 2003 | (JP) | ............................. 2003-334342 |

(51) Int. Cl.
*G11B 7/24* (2006.01)
(52) U.S. Cl. .................... 369/59.1; 369/275.4
(58) Field of Classification Search .................... None
See application file for complete search history.

(56) References Cited

U.S. PATENT DOCUMENTS 5,123,007 A  6/1992  Miyauchi et al.
5,257,256 A  10/1993  Terao et al.
5,412,626 A  5/1995  Ohno et al.
5,530,688 A  6/1996  Hurst, Jr. et al.
5,732,062 A  3/1998  Yokoi et al.
5,818,808 A  10/1998  Takada et al.

(Continued)

FOREIGN PATENT DOCUMENTS

CN  1347553 A  5/2002

(Continued)

OTHER PUBLICATIONS

N. Nobukuni, et al., "Microstructural changes in GeSbTe film during repetitious overwriting in phase-change optical recording", J. Appl. Physics, vol. 78, No. 12, Dec. 15, 1995, pp. 6980-6988.

(Continued)

*Primary Examiner*—William Korzuch
*Assistant Examiner*—Joseph Haley
(74) *Attorney, Agent, or Firm*—Oblon, Spivak, McClelland, Maier & Neustadt, P.C.

(57) ABSTRACT

An optical recording method to be used for recording at a high data transfer rate length-modulated marks on a recording medium by applying a recording laser beam locally to the recording medium. The recording laser beam has a writing power $Pw_i$, is and a bias power $Pb_i$. A record mark has a length of nT. With respect to at least two record marks, a pulse dividing number m is at least 2, and with respect to all record marks with m being at least 2, 2.5 is smaller than or equal to n/m, in a case where plural different record mark lengths are to be respectively formed by the same pulse dividing number m.

25 Claims, 34 Drawing Sheets

U.S. PATENT DOCUMENTS

| | | | |
|---|---|---|---|
| 5,848,043 A | 12/1998 | Takada et al. | |
| 6,256,277 B1 | 7/2001 | Saga et al. | |
| 6,294,310 B1 | 9/2001 | Ohno et al. | |
| 6,411,579 B2 | 6/2002 | Nobukuni et al. | |
| 6,560,178 B2 * | 5/2003 | Lee et al. | 369/53.19 |
| 6,661,759 B1 * | 12/2003 | Seo | 369/59.11 |
| 6,661,760 B2 | 12/2003 | Nobukuni et al. | |
| 6,707,783 B2 | 3/2004 | Ohno | |
| 6,801,240 B2 * | 10/2004 | Abe et al. | 347/252 |
| 6,811,949 B2 | 11/2004 | Ohno et al. | |
| 2002/0160305 A1 | 10/2002 | Horie et al. | |
| 2003/0214857 A1 | 11/2003 | Horie et al. | |
| 2003/0227850 A1 * | 12/2003 | Kato et al. | 369/59.11 |
| 2004/0130994 A1 | 7/2004 | Hellmig et al. | |
| 2004/0136307 A1 | 7/2004 | Ito et al. | |
| 2004/0190407 A1 | 9/2004 | Nobukuni et al. | |
| 2004/0246835 A1 | 12/2004 | Nobukuni et al. | |
| 2004/0248036 A1 | 12/2004 | Ohno et al. | |
| 2005/0041552 A1 | 2/2005 | Shoji et al. | |
| 2005/0175808 A1 | 8/2005 | Mizuno et al. | |
| 2005/0207310 A1 | 9/2005 | Nobukuni et al. | |
| 2006/0013098 A1 | 1/2006 | Nobukuni et al. | |
| 2006/0062125 A1 | 3/2006 | Horie et al. | |

FOREIGN PATENT DOCUMENTS

| | | |
|---|---|---|
| EP | 0 388 897 B1 | 9/1990 |
| EP | 0 902 424 B1 | 3/1999 |
| EP | 1 598 816 A1 | 11/2005 |
| JP | 62-259229 | 11/1987 |
| JP | 63-266632 | 11/1988 |
| JP | 6-12674 | 1/1994 |
| JP | 7-37251 | 2/1995 |
| JP | 7-37252 | 2/1995 |
| JP | 8-287465 | 11/1996 |
| JP | 9-7176 | 1/1997 |
| JP | 9-282661 | 10/1997 |
| JP | 10-83573 A | 3/1998 |
| JP | 2001-229537 | 8/2001 |
| JP | 2002-334433 A | 11/2002 |
| JP | 2003-30836 | 1/2003 |
| JP | 2003-331422 A | 11/2003 |
| JP | 2003-331423 A | 11/2003 |
| JP | WO 03098610 * | 11/2003 |
| JP | 2004-213743 | 7/2004 |
| WO | WO 00/772316 | 11/2000 |

OTHER PUBLICATIONS

Tatsuya Kato, et al., "The Phase Change Optical Disc with the Data Recording Rate of 140 Mbps", Jpn. J. Appl. Phys., vol. 41, Part 1, No. 3B, Mar. 2002, pp. 1664-1667.

Natsuko Nobukuni, et al., "High speed rewritable CD and DVD", Proceedings of the 12th Symposium on Phase Change Optical Information Storage, PCOS2000, Nov. 30-Dec. 1, 2000, pp. 52-55.

Michikazu Horie, et al., "High speed rewritable DVD up to 20m/s with nucleation-free eutectic phase-change material of Ge($Sb_{70}Te_{30}$)+Sb", Proceedings of SPIE, Optical Data Storage 2000, vol. 4090, May 14-17, 2000, pp. 135-143.

Michikazu Horie, et al., "Material Characterizaiton and Application of Eutectic SbTe Based Phase-Change Optical Recording Media", Proceedings of SPIE Reprint, Optical Data Storage 2001, vol. 4342, Apr. 22-25, 2001, pp. 76-87.

U.S. Appl. No. 11/374,042, filed Mar. 14, 2006, Ohno.

* cited by examiner

PRIOR ART

3T: 3T period
T: Reference clock period T

3T: 3T period
4T: 4T period
T: Reference clock period T

3T: 3T period
4T: 4T period
T: Reference clock period T

Fig. 10

| | m | dTtop | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ |
|---|---|---|---|---|---|---|---|---|---|---|---|---|
| 3T | 1 | 0 | 20/15 | 12/15 | | | | | | | | |
| 4T | 1 | 1/15 | 25/15 | 21/15 | | | | | | | | |
| 5T | 2 | -2/15 | 20/15 | 20/15 | 17/15 | 11/15 | | | | | | |
| 6T | 2 | 0 | 20/15 | 25/15 | 21/15 | 11/15 | | | | | | |
| 7T | 2 | 0 | 20/15 | 30/15 | 30/15 | 11/15 | | | | | | |
| 8T | 3 | 0 | 20/15 | 25/15 | 20/15 | 20/15 | 16/15 | 11/15 | | | | |
| 9T | 3 | 0 | 20/15 | 25/15 | 20/15 | 25/15 | 21/15 | 11/15 | | | | |
| 10T | 3 | 0 | 20/15 | 25/15 | 20/15 | 30/15 | 30/15 | 11/15 | | | | |
| 11T | 4 | 0 | 20/15 | 25/15 | 20/15 | 25/15 | 20/15 | 20/15 | 16/15 | 11/15 | | |
| 14T | 5 | 0 | 20/15 | 25/15 | 20/15 | 25/15 | 20/15 | 25/15 | 20/15 | 20/15 | 16/15 | 11/15 |

Fig. 11

| | m | dTtop | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ | $\alpha_6$ | $\beta_6$ | $\alpha_7$ | $\beta_7$ |
|---|---|---|---|---|---|---|---|---|---|---|---|---|---|---|---|---|
| 3T | 1 | 0 | 15/15 | 13/15 | | | | | | | | | | | | |
| 4T | 2 | -4/15 | 15/15 | 19/15 | 11/15 | | | | | | | | | | | |
| 5T | 2 | -3/15 | 15/15 | 22/15 | 15/15 | 11/15 | | | | | | | | | | |
| 6T | 3 | -4/15 | 15/15 | 19/15 | 11/15 | 19/15 | 12/15 | 11/15 | | | | | | | | |
| 7T | 3 | -4/15 | 15/15 | 19/15 | 11/15 | 23/15 | 15/15 | 11/15 | | | | | | | | |
| 8T | 4 | -4/15 | 15/15 | 19/15 | 11/15 | 19/15 | 11/15 | 19/15 | 12/15 | 11/15 | | | | | | |
| 9T | 4 | -4/15 | 15/15 | 19/15 | 11/15 | 19/15 | 11/15 | 23/15 | 15/15 | 11/15 | | | | | | |
| 10T | 5 | -4/15 | 15/15 | 19/15 | 11/15 | 19/15 | 11/15 | 19/15 | 11/15 | 19/15 | 12/15 | 11/15 | | | | |
| 11T | 5 | -4/15 | 15/15 | 19/15 | 11/15 | 19/15 | 11/15 | 19/15 | 11/15 | 23/15 | 15/15 | 11/15 | | | | |
| 14T | 7 | -4/15 | 15/15 | 19/15 | 11/15 | 19/15 | 11/15 | 19/15 | 11/15 | 19/15 | 11/15 | 19/15 | 11/15 | 19/15 | 12/15 | 11/15 |

Fig. 13

| | m | dTtop | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ |
|---|---|---|---|---|---|---|---|---|---|---|---|---|
| 3T | 1 | -1/15 | 7/15 | 32/15 | | | | | | | | |
| 4T | 1 | 1/15 | 11/15 | 40/15 | | | | | | | | |
| 5T | 2 | -2/15 | 7/15 | 28/15 | 6/15 | 34/15 | | | | | | |
| 6T | 2 | 0 | 7/15 | 38/15 | 7/15 | 34/15 | | | | | | |
| 7T | 2 | 0 | 7/15 | 45/15 | 11/15 | 34/15 | | | | | | |
| 8T | 3 | 0 | 7/15 | 38/15 | 7/15 | 25/15 | 6/15 | 34/15 | | | | |
| 9T | 3 | 0 | 7/15 | 38/15 | 7/15 | 38/15 | 7/15 | 34/15 | | | | |
| 10T | 3 | 0 | 7/15 | 38/15 | 7/15 | 45/15 | 11/15 | 34/15 | | | | |
| 11T | 4 | 0 | 7/15 | 38/15 | 7/15 | 38/15 | 7/15 | 38/15 | 6/15 | 34/15 | | |
| 14T | 5 | 0 | 7/15 | 38/15 | 7/15 | 38/15 | 7/15 | 38/15 | 7/15 | 38/15 | 6/15 | 34/15 |

Fig. 14

| | m | dTtop | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ | $\alpha_6$ | $\beta_6$ | $\alpha_7$ | $\beta_7$ |
|---|---|---|---|---|---|---|---|---|---|---|---|---|---|---|---|---|
| 3T | 1 | 8/16 | 7/16 | 38/16 | | | | | | | | | | | | |
| 4T | 2 | -1/16 | 6/16 | 24/16 | 6/16 | 36/16 | | | | | | | | | | |
| 5T | 2 | -1/16 | 6/16 | 31/16 | 10/16 | 36/16 | | | | | | | | | | |
| 6T | 3 | 0 | 6/16 | 26/16 | 6/16 | 25/16 | 6/16 | 36/16 | | | | | | | | |
| 7T | 3 | 0 | 6/16 | 26/16 | 6/16 | 31/16 | 10/16 | 36/16 | | | | | | | | |
| 8T | 4 | 0 | 6/16 | 26/16 | 6/16 | 26/16 | 6/16 | 26/16 | 6/16 | 36/16 | | | | | | |
| 9T | 4 | 0 | 6/16 | 26/16 | 6/16 | 26/16 | 6/16 | 31/16 | 10/16 | 36/16 | | | | | | |
| 10T | 5 | 0 | 6/16 | 26/16 | 6/16 | 26/16 | 6/16 | 26/16 | 6/16 | 26/16 | 6/16 | 36/16 | | | | |
| 11T | 5 | 0 | 6/16 | 26/16 | 6/16 | 26/16 | 6/16 | 26/16 | 6/16 | 31/16 | 10/16 | 36/16 | | | | |
| 14T | 7 | 0 | 6/16 | 26/16 | 6/16 | 26/16 | 6/16 | 26/16 | 6/16 | 26/16 | 6/16 | 26/16 | 6/16 | 26/16 | 6/16 | 36/16 |

Fig. 16

| | m | dTtop | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ |
|---|---|---|---|---|---|---|---|---|---|---|---|---|
| 3T | 1 | -1/15 | 18/15 | 5/15 | | | | | | | | |
| 4T | 1 | 0 | 29/15 | 8/15 | | | | | | | | |
| 5T | 2 | -1/15 | 20/15 | 17/15 | 15/15 | 8/15 | | | | | | |
| 6T | 2 | 0 | 25/15 | 20/15 | 18/15 | 8/15 | | | | | | |
| 7T | 2 | 0 | 25/15 | 20/15 | 30/15 | 8/15 | | | | | | |
| 8T | 2 | 0 | 30/15 | 30/15 | 30/15 | 8/15 | | | | | | |
| 9T | 3 | 0 | 25/15 | 20/15 | 25/15 | 20/15 | 18/15 | 8/15 | | | | |
| 10T | 3 | 0 | 25/15 | 20/15 | 25/15 | 20/15 | 30/15 | 8/15 | | | | |
| 11T | 3 | 0 | 30/15 | 30/15 | 25/15 | 20/15 | 30/15 | 8/15 | | | | |
| 14T | 4 | 0 | 30/15 | 30/15 | 25/15 | 20/15 | 25/15 | 20/15 | 30/15 | 8/15 | | |

Fig. 17

| | m | dTtop | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ | $\alpha_6$ | $\beta_6$ | $\alpha_7$ | $\beta_7$ |
|---|---|---|---|---|---|---|---|---|---|---|---|---|---|---|---|---|
| 3T | 1 | 3/15 | 17/15 | 7/15 | | | | | | | | | | | | |
| 4T | 2 | -4/15 | 16/15 | 18/15 | 12/15 | 10/15 | | | | | | | | | | |
| 5T | 2 | -4/15 | 16/15 | 19/15 | 17/15 | 10/15 | | | | | | | | | | |
| 6T | 3 | -4/15 | 16/15 | 18/15 | 12/15 | 18/15 | 12/15 | 10/15 | | | | | | | | |
| 7T | 3 | -4/15 | 16/15 | 19/15 | 12/15 | 21/15 | 16/15 | 10/15 | | | | | | | | |
| 8T | 4 | -4/15 | 16/15 | 18/15 | 12/15 | 18/15 | 12/15 | 18/15 | 12/15 | 10/15 | | | | | | |
| 9T | 4 | -4/15 | 16/15 | 18/15 | 12/15 | 18/15 | 12/15 | 21/15 | 16/15 | 10/15 | | | | | | |
| 10T | 5 | -4/15 | 16/15 | 18/15 | 12/15 | 18/15 | 12/15 | 18/15 | 12/15 | 19/15 | 12/15 | 10/15 | | | | |
| 11T | 5 | -4/15 | 16/15 | 18/15 | 12/15 | 18/15 | 12/15 | 18/15 | 12/15 | 21/15 | 16/15 | 10/15 | | | | |
| 14T | 7 | -4/15 | 16/15 | 18/15 | 12/15 | 18/15 | 12/15 | 18/15 | 12/15 | 18/15 | 12/15 | 18/15 | 12/15 | 18/15 | 12/15 | 10/15 |

Fig. 19

|  | m | dTtop | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ |
|---|---|---|---|---|---|---|---|---|---|---|---|---|
| 3T | 1 | -2/16 | 8/16 | 21/16 |  |  |  |  |  |  |  |  |
| 4T | 1 | -1/16 | 14/16 | 30/16 |  |  |  |  |  |  |  |  |
| 5T | 2 | -1/16 | 10/16 | 27/16 | 12/16 | 12/16 |  |  |  |  |  |  |
| 6T | 2 | 0 | 10/16 | 38/16 | 7/16 | 24/16 |  |  |  |  |  |  |
| 7T | 2 | 0 | 10/16 | 38/16 | 18/16 | 24/16 |  |  |  |  |  |  |
| 8T | 2 | 0 | 13/16 | 51/16 | 18/16 | 24/16 |  |  |  |  |  |  |
| 9T | 3 | 0 | 10/16 | 38/16 | 10/16 | 38/16 | 7/16 | 24/16 |  |  |  |  |
| 10T | 3 | 0 | 10/16 | 38/16 | 10/16 | 38/16 | 18/16 | 24/16 |  |  |  |  |
| 11T | 3 | 0 | 13/16 | 51/16 | 10/16 | 38/16 | 18/16 | 24/16 |  |  |  |  |
| 14T | 4 | 0 | 13/16 | 51/16 | 10/16 | 38/16 | 10/16 | 38/16 | 18/16 | 24/16 |  |  |

Fig. 20

|  | m | dTtop | $\alpha_1$ | $\beta_1$ | $\alpha_2$ | $\beta_2$ | $\alpha_3$ | $\beta_3$ | $\alpha_4$ | $\beta_4$ | $\alpha_5$ | $\beta_5$ | $\alpha_6$ | $\beta_6$ | $\alpha_7$ | $\beta_7$ |
|---|---|---|---|---|---|---|---|---|---|---|---|---|---|---|---|---|
| 3T | 1 | 2/16 | 8/16 | 22/16 | | | | | | | | | | | | |
| 4T | 2 | 0 | 9/16 | 23/16 | 9/16 | 11/16 | | | | | | | | | | |
| 5T | 2 | 0 | 9/16 | 32/16 | 14/16 | 11/16 | | | | | | | | | | |
| 6T | 3 | 0 | 9/16 | 23/16 | 9/16 | 23/16 | 9/16 | 11/16 | | | | | | | | |
| 7T | 3 | 0 | 9/16 | 23/16 | 9/16 | 32/16 | 14/16 | 11/16 | | | | | | | | |
| 8T | 4 | 0 | 9/16 | 23/16 | 9/16 | 23/16 | 9/16 | 23/16 | 9/16 | 11/16 | | | | | | |
| 9T | 4 | 0 | 9/16 | 23/16 | 9/16 | 23/16 | 9/16 | 32/16 | 14/16 | 11/16 | | | | | | |
| 10T | 5 | 0 | 9/16 | 23/16 | 9/16 | 23/16 | 9/16 | 23/16 | 9/16 | 23/16 | 9/16 | 11/16 | | | | |
| 11T | 5 | 0 | 9/16 | 23/16 | 9/16 | 23/16 | 9/16 | 23/16 | 9/16 | 32/16 | 14/16 | 11/16 | | | | |
| 14T | 7 | 0 | 9/16 | 23/16 | 9/16 | 23/16 | 9/16 | 23/16 | 9/16 | 23/16 | 9/16 | 23/16 | 9/16 | 23/16 | 9/16 | 11/16 |

— ● — 3T strategy
— □ — 2T strategy

3T: 3T period
4T: 4T period
T: Reference clock period T

3T: 3T period
4T: 4T period
T: Reference clock period T

3T: 3T period
4T: 4T period
T: Reference clock period T

Fig. 28

|     | m | dTtop | $\alpha_1$ | $\beta_1$ | $\alpha_2$ | $\beta_2$ | $\alpha_3$ | $\beta_3$ | $\alpha_4$ | $\beta_4$ |
|-----|---|-------|------|------|------|------|------|------|------|------|
| 3T  | 1 | 0 | 12/12 |  |  |  |  |  |  |  |
| 4T  | 1 | 0 | 22/12 | 6/12 |  |  |  |  |  |  |
| 5T  | 2 | 0 | 13/12 | 8/12 | 9/12 |  |  |  |  |  |
| 6T  | 2 | 0 | 16/12 | 17/12 | 12/12 | 8/12 |  |  |  |  |
| 7T  | 2 | 0 | 16/12 | 20/12 | 22/12 | 8/12 |  |  |  |  |
| 8T  | 2 | 0 | 20/12 | 20/12 | 22/12 | 8/12 |  |  |  |  |
| 9T  | 3 | 0 | 16/12 | 28/12 | 20/12 | 17/12 | 12/12 | 8/12 |  |  |
| 10T | 3 | 0 | 16/12 | 20/12 | 20/12 | 28/12 | 12/12 | 8/12 |  |  |
| 11T | 3 | 0 | 16/12 | 20/12 | 20/12 | 28/12 | 22/12 | 8/12 |  |  |
| 14T | 4 | 0 | 16/12 | 20/12 | 20/12 | 28/12 | 20/12 | 28/12 | 12/12 | 8/12 |

Fig. 29

| | m | dTtop | α₁ | β₁ | α₂ | β₂ | α₃ | β₃ | α₄ | β₄ |
|---|---|---|---|---|---|---|---|---|---|---|
| 3T | 1 | 0 | 4/15 | 34/15 | | | | | | |
| 4T | 1 | 0 | 11/15 | 44/15 | | | | | | |
| 5T | 2 | 0 | 5/15 | 29/15 | 5/15 | 28/15 | | | | |
| 6T | 2 | 0 | 5/15 | 40/15 | 6/15 | 30/15 | | | | |
| 7T | 2 | 0 | 5/15 | 40/15 | 10/15 | 42/15 | | | | |
| 8T | 2 | 0 | 10/15 | 50/15 | 10/15 | 42/15 | | | | |
| 9T | 3 | 0 | 5/15 | 40/15 | 10/15 | 38/15 | 5/15 | 28/15 | | |
| 10T | 3 | 0 | 5/15 | 40/15 | 10/15 | 50/15 | 6/15 | 30/15 | | |
| 11T | 3 | 0 | 5/15 | 40/15 | 10/15 | 50/15 | 10/15 | 42/15 | | |
| 14T | 4 | 0 | 5/15 | 40/15 | 10/15 | 50/15 | 10/15 | 50/15 | 6/15 | 30/15 |

Fig. 31

| | m | dTtop | $\alpha_1$ | $\beta_1$ | $\alpha_2$ | $\beta_2$ | $\alpha_3$ | $\beta_3$ | $\alpha_4$ | $\beta_4$ |
|---|---|---|---|---|---|---|---|---|---|---|
| 3T | 1 | -2/15 | 23/15 | 15/15 | | | | | | |
| 4T | 2 | -5/15 | 21/15 | 15/15 | 11/15 | 12/15 | | | | |
| 5T | 2 | -2/15 | 21/15 | 19/15 | 16/15 | 12/15 | | | | |
| 6T | 2 | 0 | 21/15 | 24/15 | 21/15 | 12/15 | | | | |
| 7T | 2 | 0 | 21/15 | 27/15 | 32/15 | 12/15 | | | | |
| 8T | 3 | -1/15 | 21/15 | 25/15 | 20/15 | 19/15 | 15/15 | 12/15 | | |
| 9T | 3 | -1/15 | 21/15 | 25/15 | 20/15 | 25/15 | 21/15 | 12/15 | | |
| 10T | 3 | -1/15 | 21/15 | 25/15 | 20/15 | 28/15 | 32/15 | 12/15 | | |
| 11T | 4 | -1/15 | 21/15 | 25/15 | 20/15 | 25/15 | 20/15 | 19/15 | 15/15 | 12/15 |

OPTICAL RECORDING METHOD

TECHNICAL FIELD

The present invention relates to an optical recording method. More particularly, it relates to a high speed optical recording method for a rewritable optical recording medium.

BACKGROUND ART

With a compact disk (CD) or a digital versatile disk (DVD), it is common that recording of binary signals and detection of tracking signals are carried out by utilizing a change in reflectivity caused by interference of reflected lights from the mirror surface and the bottom of pits.

In recent years, phase-change type rewritable compact disks (CD-RW, CD-Rewritable) or phase-change type rewritable DVD (tradename: DVD-RW, DVD+RW, in this specification, rewritable DVD may sometimes be referred to as RW-DVD) have been used as rewritable optical recording media.

Such phase-change type CD-RW or RW-DVD utilizes a phase difference and a difference in reflectivity caused by a difference in the refractive index between an amorphous state and a crystalline state to detect recording information signals. A usual phase-change type CD-RW or RW-DVD has a structure comprising a substrate, and a lower protective layer, a phase-change type recording layer, an upper protective layer and a reflective layer, formed on the substrate, so that multiple interference of these layers can be utilized to control the difference in reflectivity and the phase difference and to provide interchangeability with CD or DVD. Further, recording on CD-RW or RW-DVD means recording by overwriting wherein recording and erasing are carried out simultaneously.

In the above recording by overwriting, the crystalline state is used as an unrecorded or erased state, and the amorphous state locally formed is used as record marks.

If the recording layer is locally heated to at least the melting point by a recording laser beam and then immediately quenched, amorphous marks will be formed irrespective of the state (crystalline or amorphous) of the recording layer before recording. Quenching is usually accomplished by instantaneously turning off the recording laser beam to dissipate the heat. On the other hand, if the recording layer is heated to a temperature of at least the crystalline temperature and lower than the melting point by a recording laser beam having a power weaker than during the recording, it becomes an erased crystalline state irrespective of the state (crystalline or amorphous) of the recording layer before recording. As described above, with a rewritable phase-change type medium, the heating and cooling process in the recording layer is controlled by a change in the power of the recording laser beam and in its intensity, to accomplish the overwriting. It is common that such a change in the intensity of the recording laser beam is carried out in a short time of not more than a few tens nsec.

Whereas, one of problems in using CD-RW or RW-DVD is that the recording velocity and the transfer rate are low.

The reference velocity (hereinafter referred to also as 1-time velocity) in recording/retrieving of CD is a linear velocity (in this specification, "a linear velocity" may simply be referred to as "linear speed") of from 1.2 to 1.4 m/s. However, for CD-ROM, a high velocity retrieving at a level of 40-times velocity at the maximum has been already realized, and a low velocity at a level of 1-time velocity is used only for retrieving of musics or images. Usually, in up to 16-times velocity retrieving, a constant linear velocity mode (CLV) inherent to CD is used, but in 24 to 40-times velocity retrieving, the transfer rate, access and seek times for the outer periphery data have been remarkably speeded up by an application of a constant angular velocity mode partly at the inner peripheral portion (P-CAV).

As a peripheral memory device for a computer, CD-RW has already accomplished 32-times velocity at the maximum by the P-CAV mode. On the other hand, write-once type CD-R has already accomplished 52-times velocity recording at the maximum and also for CD-RW, it is desired to further increase the transfer rate in recording.

On the other hand, the reference velocity (hereinafter referred to also as 1-time velocity) in retrieving of DVD is a linear velocity of 3.49 m/s, but with DVD-ROM, high velocity retrieving at a level of 16-times velocity at the maximum has already been realized, and a low velocity at a level of 1-time velocity is used only for retrieving of musics or images.

Speeding up in recording is in progress also for RW-DVD, but in the CLV mode, it is still at a level of 4-times velocity at best. On the other hand, again write-once type RW-DVD has accomplished 8-times velocity recording at the maximum, and also for RW-DVD, it is desired to further improve the transfer rate in recording.

Therefore, a rewritable phase-change medium and a recording method have been desired whereby recording can be carried out at a higher velocity.

However, a rewritable phase-change medium capable of recording up to a high linear velocity over 32-times velocity for CD or over 10-times velocity for RW-DVD, has not yet been realized.

A first reason for why such a rewritable phase-change medium can not be realized, is that it is difficult to simultaneously satisfy the archival stability of amorphous marks and erasing in a short time by high speed crystallization of amorphous marks.

The present inventors have already found a recording layer material comprising Sb as the main component. If such a material is used, overwriting at a recording linear speed of about 50 m/s will be possible.

A second reason for why CD-RW or RW-DVD overwritable at a high data transfer rate of at least 40 m/s has not yet been realized in spite of the fact that several phase change recording materials overwritable at such a high linear velocity have been proposed, is that the known conventional recording pulse strategy (pulse division method) has its limits.

Namely, in CD-RW standards Orange Book, Part 3, a recording pulse strategy as shown in FIG. 1, is specified. In a currently practically used recording device, IC for generating such a recording pulse strategy is employed. Accordingly, with such a device, it is obliged to carry out recording in a wide range of linear velocity ranging from 1-time velocity to 8- to 10-times velocity or to 8- to 32-times velocity by such a recording pulse strategy or by a recording pulse strategy having certain changes made thereto.

Also in standards for DVD-RW or DVD+RW as standards for rewritable DVD, a similar recording strategy is specified. A characteristic of such a recording strategy is that an amorphous mark having a nT mark length (T is the reference clock period) is divided into n-1 recording pulses and cooling pulses (off-pulses) for recording. Therefore, in such a recording strategy, an average repeating period for a pair of a recording pulse and a cooling pulse is made to be about 1T.

FIG. 1(a) represents an example of the mark length-modulation method used for a CD format and shows data signals having time lengths of from 3T to 11T, and FIGS. 1(b) and 1(c) show the practical recording laser powers generated on the basis of such data signals. Hereinafter, the recording pulse strategy wherein on and off of recording pulses are repeated based generally on the reference clock period T(100), as shown in FIG. 1(b), will be referred to as 1T strategy, and the recording pulse strategy wherein on and off of the recording pulses are repeated generally in periods 2T i.e. twice the reference clock period, will be referred to as 2T strategy. Pw represents a writing power to form an amorphous mark by melting and quenching the recording layer, Pe represents an erasing power to erase an amorphous mark by crystallization, and usually, a bias power Pb is substantially the same as a retrieving power Pr of a retrieving laser beam. Writing power (Pw) irradiation sections will be referred to as recording pulses, and bias power irradiation sections will be referred to as cooling pulses (the "cooling pulses" may sometimes be referred to as off-pulses). In the case of EFM+ modulation, data signals having time lengths of 14T are added to the above-mentioned data signals having time lengths of from 3 to 11T.

Here, in the above-mentioned recording strategies, a repeating period for a recording pulse and an off-pulse is basically constant as a reference clock period T or as a 2-times period 2T. The reference clock period T is made to have a high frequency in proportion to the linear velocity in high linear velocity recording.

At a reference velocity of 1-time velocity for CD, T=231 nsec, but at 40-times velocity, T=5.8 nsec, and at 48-times velocity, T=4.7 nsec. Accordingly, even in a case where the 2T strategy shown in FIG. 1(c) is used in high linear velocity recording at at least 40-times velocity, the time widths of divided recording pulses and off-pulses will be at most about 6 nsec by the above-mentioned change for high clock frequency corresponding to the high velocity recording.

On the other hand, at a reference velocity of 1-time velocity for DVD, T=38.2 nsec, but at 10-times velocity, T=3.82 nsec, at 12-times velocity, T=3.2 nsec, and at 16-times velocity, T=2.4 nsec. Accordingly, in high linear velocity recording at at least 10-times velocity, even if the 2T strategy as shown in FIG. 2(c) is used, the time widths of divided recording pulses and off-pulses will be at most about 4 nsec by the above-mentioned change for high frequency corresponding to such high velocity recording.

Whereas, by irradiation with a laser beam having a usual writing power, it takes from 1 to 2 nsec in rising or falling. Accordingly, at such a high frequency, the rise time or the fall time can not be neglected, and the lengths of recording pulse sections and the lengths of off-pulse sections will further substantially be shortened and will be substantially less than 5 nsec (in the case of CD-RW) or less than 3 nsec (in the case of RW-DVD). In such a case, heating for recording pulses tends to be inadequate, and the required writing power will be remarkably high. On the other hand, cooling for the off-pulse sections also tends to be inadequate, whereby a cooling rate required for the change into an amorphous state tends to be hardly obtainable. Further, for the high linear velocity recording, it is common to employ a material having a high erasing speed i.e. a high crystallization speed for the recording layer for CD-RW or RW-DVD. Accordingly, deficiency in the cooling rate for the above-mentioned off-pulse sections, tends to lead to recrystallization of the once-melted region. This tendency tends to be remarkable as recording becomes high linear velocity and high data transfer rate (high density).

Such a problem tends to be most remarkable with a phase change type rewritable optical recording medium (which may sometimes be referred to as "a rewritable phase change medium" in the present invention). However, in a case where mark length-modulation recording is carried out by controlling both the heating process and the cooling process by using divided recording pulses as shown in FIG. 1, as the clock frequency becomes high, the problems of delay in thermal response due to a heat capacity of the recording layer and the limit in response time of the laser diode optical output, tend to be increasingly remarkable in optical recording in general.

The present inventors have already realized overwriting recording at 20 times velocity or more for CD and at 5-times velocity or more for DVD, by the 2-T strategy wherein the repeating period of a recording pulse and an off pulse is set to be 2T (Proceedings of PCOS2000, The Society of Phase Change Recording, Nov. 3, 2000, Nov. 30-Dec. 1, 2000, p. 52-55, Proc. SPIE, The International Society for Optical Engineering, 2002, No. 4090, p. 135-143, Proc, SPIE. The International Society for Optical Engineering, 2000, No. 4342, p. 76-87, JP-A-2001-331936).

However, it has been found that even if such a division method of 2T base as reported in the above references, is employed, it is necessary, as mentioned above, to employ a material having a high crystallization speed for high linear velocity recording at a level of at least 32-times velocity for CD or at a level of at least 12-times velocity for DVD, while, if such a material is employed, the recrystallization phenomenon will be more serious due to deficiency of the cooling rate.

Such a problem is not limited to a phase change type rewritable optical recording medium, but is a common problem in a case where recording is carried out at a high data transfer rate (a high reference clock period, a high linear velocity) with a medium to which a recording method of controlling both the heating and cooling processes, is applied by means of divided recording pulses.

In such a situation as described above where the reference clock frequency becomes high, and the reference clock period T becomes generally less than 5 nsec, it is conceivable to reduce the recording pulse dividing number, as a natural extension. In reality, several division methods with n/3 have been disclosed (JP-A-2003-30836, WO02/089121).

DISCLOSURE OF THE INVENTION

However, the division method disclosed in JP-A-2003-30836 and WO02/089121, has a problem such that generation of pulses is not synchronized with the reference clock period. Further, independent parameters to define the recording pulse division method are imprecise or the number of parameters is so much that it is difficult to design a circuit for generating recording pulses. Further, there is a method such that only the concept is disclosed, and in its specific application, good results can not necessarily be obtained.

It is an object of the present invention to provide a practically useful optical recording method as such an optical recording method to be used for recording at a high data transfer rate such that the reference clock frequency is at least about 200 MHz (the reference clock period is at most about 5 nsec) and the linear velocity is about 40 m/s.

In order to solve such problems, in the present invention, a recording method by so-called divided recording pulses is employed wherein in a case where light is applied locally to a recording medium to form recording marks by a mark length modulation method, recording is carried out by dividing a record mark into plural recording pulses and cooling pulses.

Namely, the optical recording method according to the present invention is an optical recording method for recording mark length-modulated information on a recording medium by applying a recording laser beam locally to the recording medium, characterized in that when the record mark length of one record mark is represented by nT (where T is the reference clock period, and n is a natural number of at least 2), in order to form the record mark length of nT, m recording pulses $\alpha_i T$ ($1 \leq i \leq m$) and m off-pulses $\beta_i T$ ($1 \leq i \leq m$), represented by:

$$\alpha_1 T, \beta_1 T, \alpha_2 T, \beta_2 T, \ldots, \alpha_i T, \beta_i T, \ldots, \alpha_m T, \beta_m T$$

(where m is a natural number representing a pulse dividing number, $\alpha_i$ ($1 \leq i \leq m$) is a real number of larger than 0, $\beta_i$ ($1 \leq i \leq m-1$) is a real number of larger than 0, and $\beta_m$ is a real number of at least 0), are used, and a recording laser beam having a writing power $Pw_i$ is applied within a time of $\alpha_i T$ at any of $1 \leq i \leq m$, a recording laser beam having a bias power $Pb_i$ of $Pb_i < Pw_i$ and $Pb_i < Pw_{i+1}$, is applied within a time of $\beta_i T$ at any of $1 \leq i \leq m-1$, the front recording pulse $\alpha_1 T$ will rise as deviated for a time of $dT_{top}$ from the front position of the record mark having a length of nT ($dT_{top}$ being-positive, when the rising is delayed from the front position of the record mark having a length of nT), with respect to at least two record marks, the pulse dividing number m is at least 2, and with respect to all record marks with m being at least 2, $2.5 \leq n/m$, in a case where plural different record mark lengths are to be respectively formed by the same pulse dividing number m, $\alpha_1$ and/or $\alpha_m$ is changed to form such record mark lengths having different lengths respectively, provided that when the $\alpha_1$ is changed, $dT_{top}$ and/or $\beta_1$ is also changed, and when the $\alpha_m$ is changed, $\beta_{m-1}$ and/or $\beta_m$ is also changed.

Further, the optical recording device according to the present invention is an optical recording device for recording mark length-modulated information on a recording medium by applying a recording laser beam locally to the recording medium, characterized in that it is constructed so that when the record mark length of one record mark is represented by nT (where T is the reference clock period, and n is a natural number of at least 2), in order to form the record mark length of nT, m recording pulses $\alpha_i T$ ($1 \leq i \leq m$) and m off-pulses $\beta_i T$ ($1 \leq i \leq m$), represented by:

$$\alpha_1 T, \beta_1 T, \alpha_2 T, \beta_2 T, \ldots, \alpha_i T, \beta_i T, \ldots, \alpha_m T, \beta_m T$$

(where m is a natural number representing a pulse dividing number, $\alpha_i$ ($1 \leq i \leq m$) is a real number of larger than 0, $\beta_i$ ($1 \leq i \leq m-1$) is a real number of larger than 0, and $\beta_m$ is a real number of at least 0), are used, and a recording laser beam having a writing power $Pw_i$ is is applied within a time of $\alpha_i T$ at any of $1 \leq i \leq m$, a recording laser beam having a bias power $Pb_i$ of $Pb_i < Pw_i$ and $Pb_i < Pw_{i+1}$, is applied within a time of $\beta_i T$ at any of $1 \leq i \leq m-1$, the front recording pulse $\alpha_1 T$ will rise as deviated for a time of $dT_{top}$ from the front position of the record mark having a length of nT ($dT_{top}$ being positive, when the rising is delayed from the front position of the record mark having a length of nT), with respect to at least two record marks, the pulse dividing number m is at least 2, and with respect to all record marks with m being at least 2, $2.5 \leq n/m$, in a case where plural different record mark lengths are to be respectively formed by the same pulse dividing number m, $\alpha_1$ and/or $\alpha_m$ is changed to form such record mark lengths having different lengths respectively, provided that when the $\alpha_1$ is changed, $dT_{top}$ and/or $\beta_1$ is also changed, and when the $\alpha_m$ is changed, $\beta_{m-1}$ and/or $\beta_m$ is also changed.

According to the present invention, it is possible to provide an optical recording method or an optical recording device capable of recording at a high linear velocity and a high data transfer rate such that the scanning linear velocity of the recording laser beam against the recording layer during the recording is at least about 40 m/s or the clock frequency is at least about 200 MHz (clock period: at most 5 nse). Further, it is possible to provide a recording method or an optical recording device capable of carrying out good recording within a wide range of recording linear velocities. More specifically, it is possible to provide a high speed optical recording method or optical recording device applicable to a rewritable optical recording medium which has retrieving interchangeability with a readout-only medium specified in conventional CD-ROM or DVD (-ROM) standards.

EFFECTS OF THE INVENTION

Thus, according to the present invention, it is possible to provide an optical recording method or optical recording device applicable to recording at a high data transfer rate.

BRIEF DESCRIPTION OF THE DRAWINGS

FIG. 1(a) illustrates an example of a mark length modulation system to be used in a CD format and shows data signals having time lengths of from 3T to 11T, and FIG. 1(b) and FIG. 1(c) show practical recording laser powers to be generated on the basis of such data signals.

FIG. 2(a) shows a record mark having a length of nT to be formed, and FIG. 2(b) shows a timing chart for a recording pulse division method to form such a record mark.

FIG. 3(a) shows nT mark length signal (301) having a time width nT, and FIG. 3(b) to FIG. 3(e) show gate signals for controlling the respective recording pulses.

FIG. 4(a) shows a case where n=3L-1, FIG. 4(b) shows a case where n=3L, and FIG. 4(c) shows a case where n=3L+1.

FIG. 5(a) shows three mark lengths of 3L-1, 3L and 3L+1, and FIG. 5(b) shows a case where n=3L-1, FIG. 5(c) shows a case where n=3L, and FIG. 5(d) shows a case where n=3L+1.

FIG. 6(a) shows a case where n=3L, FIG. 6(b) shows a case where n=3L+1, and FIG. 6(c) shows a case where n=3L+2.

FIG. 7(*a*) shows three mark lengths of 3L, 3L+1 and 3L+2, and FIG. 7(*b*) shows a case where n=3L, FIG. 7(*c*) shows a case where n=3L+1, and FIG. 7(*d*) shows a case where n=3L+2.

FIG. 8(*a*) shows a case where n=4L−3, FIG. 8(*b*) shows a case where n=4L−2, FIG. 8(*c*) shows a case where n=4L−1, and FIG. 8(*d*) shows a case where n=4L.

FIG. 9(*a*) shows four mark lengths of 4L−3, 4L−2, 4L−1 and 4L, and FIG. 9(*b*) shows a case where n=4L−3, FIG. 9(*c*) shows a case where n=4L−2, FIG. 9(*d*) shows a case where n=4L−1, and FIG. 9(*e*) shows a case where n=4L.

FIG. 10 is a chart illustrating divided recording pulses for the respective mark lengths, used for "3T strategy" shown in Example 1.

FIG. 11 is a chart illustrating divided recording pulses for the respective mark lengths, used for "2T strategy" shown in Comparative Example 1.

FIG. 13 is a chart illustrating divided recording pulses for the respective mark lengths, used for "3T strategy" shown in Example 2.

FIG. 14 is a chart illustrating divided recording pulses for the respective mark lengths, used for "2T strategy" shown in Comparative Example 2.

FIG. 16 shows divided recording pulses for the respective mark lengths, used for "3T strategy" shown in Example 3.

FIG. 17 is a chart illustrating divided recording pulses for the respective mark lengths, used for "2T strategy" shown in Comparative Example 3.

FIG. 19 is a chart illustrating divided recording pulses for the respective mark lengths, used for "3T strategy" shown in Example 4.

FIG. 20 is a chart illustrating divided recording pulses for the respective mark lengths, used for "2T strategy" shown in Comparative Example 4.

FIG. 22(*a*) shows a case where n=3L−1, FIG. 22(*b*) shows a case where n=3L, and FIG. 22(*c*) shows a case where n=3L+1.

FIG. 23(*a*) shows three mark lengths of 3L−1, 3L and 3L+1, and FIG. 23(*b*) shows a case where n=3L−1, FIG. 23(*c*) shows a case where n=3L, and FIG. 23(*d*) shows a case where n=3L+1.

FIG. 24(*a*) shows a case where n=3L, FIG. 24(*b*) shows a case where n=3L+1, and FIG. 24(*c*) shows a case where n=3L+2.

FIG. 25(*a*) shows three mark lengths of 3L, 3L+1 and 3L+2, and FIG. 25(*b*) shows a case where n=3L, FIG. 25(*c*) shows a case where n=3L+1, and FIG. 25(*d*) shows a case where n=3L+2.

FIG. 26(*a*) shows a case where n=4L−3, FIG. 26(*b*) shows a case where n=4L−2, FIG. 26(*c*) shows a case where n=4L−1, and FIG. 26(*d*) shows a case where n=4L.

FIG. 27(*a*) shows four mark lengths of 4L−3, 4L−2, 4L−1 and 4L, and FIG. 27(*b*) shows a case where n=4L−3, FIG. 27(*c*) shows a case where n=4L−2, FIG. 27(*d*) shows a case where n=4L−1 and FIG. 27(*e*) shows a case where n=4L.

FIG. 28 is a chart illustrating divided recording pulses for the respective mark lengths, used for "3T strategy" shown in Example 5.

FIG. 29 is a chart illustrating divided recording pulses for the respective mark lengths, used for "3T strategy" shown in Example 6.

FIG. 31 is a chart illustrating divided recording pulses for the respective mark lengths, used for "3T strategy" shown in Example 7.

BEST MODE FOR CARRYING OUT THE INVENTION

Figure 1:
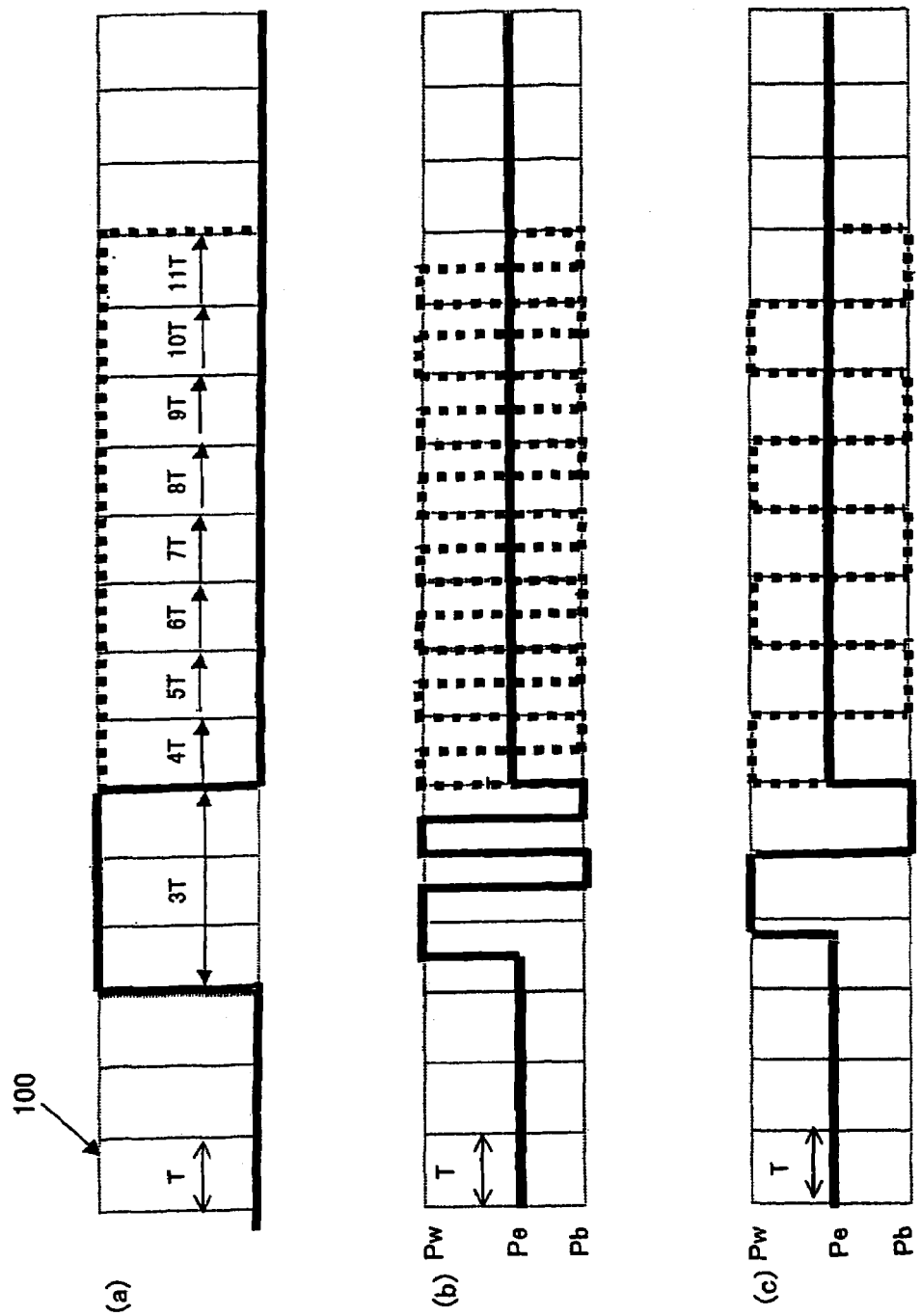
FIG. 1 is views illustrating recording pulse strategies shown in conventional CD-RW standards Orange Book Part 3.

Now, the best mode for carrying out the present invention (hereinafter referred to as the practical mode of the invention) will be described in detail. However, it should be understood that the present invention is by no means restricted to the following practical mode and can be practiced as variously modified within the scope of its gist.

(1) Optical Recording Method

Among optical recording methods to which the practical mode is applied, the most basic recording method is applied to a so-called optical recording method by divided recording pulses, wherein recording is carried out by dividing a record mark into plural recording pulses and cooling pulses in a case where the record mark is formed by a mark length modulation method by applying light locally to a recording medium. This most basic recording method will be referred to as recording pulse division method (I) as shown below.

Recording Pulse Division Method (I):

This is a pulse division method characterized in that when the record mark length of one record mark is represented by nT (where T is the reference clock period, and n is a natural number of at least 2), in order to form the record mark length of nT, m recording pulses $\alpha_i T$ ($1 \leq i \leq m$) and m off-pulses $\beta_i T$ ($1 \leq i \leq m$), represented by:

$$\alpha_1 T, \beta_1 T, \alpha_2 T, \beta_2 T, \ldots, \alpha_i T, \beta_i T, \ldots, \alpha_m T, \beta_m T$$

(where m is a natural number representing a pulse dividing number, $\alpha_i$ ($1 \leq i \alpha_m$) is a real number of larger than 0, $\beta_i$ ($1 \leq i \leq m-1$) is a real number of larger than 0, and $\beta_m$ is a real number of at least 0), are used, and a recording laser beam having a writing power $Pw_i$ is applied within a time of $\alpha_i T$ at any of $1 \leq i \leq m$, a recording laser beam having a bias power $Pb_i$ of $Pb_i < Pw_i$ and $Pb_i < Pw_{i+1}$, is applied within a time of $\beta_i T$ at any of $1 \leq i \leq m-1$, the front recording pulse $\alpha_1 T$ will rise as deviated for a time of $dT_{top}$ from the front position of the record mark having a length of nT ($dT_{top}$ being positive, when the rising is delayed from the front position of the record mark having a length of nT), with respect to at least two record marks, the pulse dividing number m is at least 2, and with respect to all record marks with m being at least 2, $2.5 \leq n/m$, in a case where plural different record mark lengths are to be respectively formed by the same pulse dividing number m, $\alpha_1$ and/or $\alpha_m$ is changed to form such record mark lengths having different lengths respectively, provided that when the $\alpha_1$ is changed, $dT_{top}$ and/or $\beta_1$ is also changed, and when the $\alpha_m$ is changed, $\beta_{m-1}$ and/or $\beta_m$ is also changed.

By carrying out optical recording in accordance with the recording method by such recording pulse division method (I), it becomes possible to carry out mark length modulation recording satisfactorily at a high data transfer rate at a reference clock frequency of at least about 200 MHz (reference clock period: at most about 5 nsec). More specifically, it becomes possible to carry out rewriting of information satisfactorily at a recording linear velocity of at least about 4-times velocity with RW-DVD or at least about 32-times velocity with CD-RW. Further, by carrying out optical recording in accordance with the above recording method, it becomes possible to carry out recording satisfactorily at a high data transfer rate particularly at a reference clock frequency of at least about 300 MHz (reference clock period: at most about 3 nsec). More specifically, by carrying out optical recording in accordance with the above recording method, it becomes possible to realize overwriting by good mark length modulation which was impossible to realize with a conventional recording strategy, at a recording linear velocity of at least about 8-times velocity with RW-DVD.

In the optical recording method to which the practical mode is applied, the method for controlling the energy of a recording laser energy beam will be generally referred to as a recording pulse strategy or a pulse strategy. Particularly, a method for forming an nT mark by pulse series with plural writing power levels divided into prescribed time lengths, will be referred to as a divided recording pulse strategy, a recording pulse division method, a pulse division method or a divided recording pulse generation method.

$Pw_i$ and $Pb_i$ are the intensities of recording laser beams where $1 \leq i \leq n$. Particularly, $Pw_i$ is referred to as a writing power, and $Pb_i$ is referred to as a bias power, an off power or a cooling power. In the practical mode, the power means the intensity of the laser energy unless otherwise specified.

Further, a section $\alpha_i T$ where a writing power $Pw_i$ is applied will be referred to as an on-pulse section or a recording pulse section, and the laser energy to be applied to the section $\alpha_i T$ with an intensity of $Pw_i$ will be referred to as an on-pulse or a recording pulse. By the application of $Pw_i$, the recording layer will be heated to at least the critical temperature Tcm required to form a record mark. More specifically, with a rewritable phase change medium, Tcm is the melting point of the recording layer.

On the other hand, a section $\beta_i T$ where a bias power $Pb_i$ is applied will be referred to as an off-pulse section or a cooling pulse section, and the laser energy to be applied to the section $\beta_i T$ with an intensity of $Pb_i$ will be referred to as an off-pulse or a cooling pulse.

And, at the $Pb_i$ irradiation section, heat is dissipated for cooling, from the recording layer heated at the preceding or subsequent recording pulse section $\alpha_i T$. More specifically, with a rewritable phase change medium, the cooling rate (the temperature decrease per unit time) required for forming an amorphous mark, is secured. For this purpose, $Pb_i$ at $1 \leq i \leq m-1$ is required to be lower than the writing power $Pw_i$ of at least the immediate preceding recording pulse and than the writing power $Pw_{i+1}$ of the immediate succeeding recording pulse. Specifically, it is required that $Pb_i < Pw_i$ and $Pb_i < Pw_{i+1}$. With a rewritable phase change medium for forming amorphous marks, the bias power is particularly set to be $Pb_i \leq 0.2 Pw_i$ and $Pw_i \leq 0.2 Pw_{i+1}$, so that heat dissipation can more effectively be carried out at a cooling pulse section.

In the present practical mode, the writing power $Pw_i$ and the bias power $Pb_i$ may be made to be variable depending upon the value of i. However, in order to make the recording method simple and more practical, it is preferred that $Pw_i$ and $Pb_i$ take constant values Pw and Pb, as a general rule. Especially when n is 6 or more, it is preferred that plural mark lengths taking the same dividing number m are formed by adjusting only the parameter for the time width of the recording pulse section $\alpha_i T$ or the cooling pulse section $\beta_i T$, so that $Pw_i$ and $Pb_i$ take constant values Pw and Pb irrespective of i and n. Even in such a case, $Pb_m$ may take a value different from $Pb_i = Pb$ at $1 \leq i \leq m-1$, to obtain good results.

In a case where the output power is generated at a high frequency higher by at least about one figure than the clock frequency, i.e. so-called high frequency superposition is carried out, in order to stabilize the operation of a laser diode, the writing power level is represented by an average power level. It is well known that the writing power level is represented by an average power level. Also in the present invention, the power variation due to high frequency superposition will be considered by averaging it.

In this specification, in a case where the writing power $Pw_i$ is required to be considered for every i ($1 \leq i \leq m$), an expression "$Pw_i$" will be used. On the other hand, in a case where the recording power $Pw_i$ is not required to be considered for every i ($1 \leq i \leq m$), or in a case where the writing power $Pw_i$ is considered to be constant irrespective of i ($1 \leq i \leq m$), an expression "Pw" will be used. Likewise, in a case where the bias power $Pb_i$ is required to be considered for every i ($1 \leq i \alpha_m$), an expression "$Pb_i$" will be used. On the other hand, in a case where the bias power $Pb_i$ is not required to be considered for every i ($1 \leq i \leq m$), or in a case where the bias power $Pb_i$ is considered to be constant irrespective of i ($1 \leq i \leq m$), an expression "Pb" will be used.

In the present practical mode, the recording laser intensity at sections other than $\alpha_i T$ and $\beta_i T$ is not particularly specified, but the recording laser intensity varies depending upon the recording medium used. For example, with an overwritable rewritable phase change medium, an erasing power Pe is applied. Namely, with an overwritable rewritable phase change medium wherein the crystalline state is an unrecorded or erased state, and an amorphous state is a record mark, the erasing power Pe is a temperature capable of heating the recording layer to a temperature of at least the crystallization temperature and at most the melting point. In such a case, Pe/Pw is usually at least 0.1, preferably at least 0.2. On the other hand, Pe/Pw is usually at most 0.6, preferably at most 0.4. Among the above range, Pe/Pw is more preferably a value within a range of from 0.1 to 0.6, particularly preferably within a range of from 0.2 to 0.4. If this ratio is smaller than the above range, the erasing power tends to be too low, whereby an amorphous mark not erased is likely to remain. On the other hand, if it is larger than the above range, the portion irradiated with Pe is, after being melted, likely to become amorphous again. Further, in such a case, the bias power $Pb_m$ at the cooling pulse section $\beta_m T$ at the last end is preferably set to be $Pb_m < Pw_m$ and $0 \leq Pb_m \leq Pe$.

A record mark (or simply a mark) in the present practical mode is recognized as a physical state which is locally formed in the recording layer and which is optically distinguishable from other portions. So long as it is optically distinguishable from other portions, one record mark may be continuously formed, or one record mark may be formed of plural marks physically separated so long as they are optically connected. In the case of an overwritable rewritable phase change recording medium, a record mark will be formed of an amorphous mark locally and spatially continuously formed, or plural amorphous marks separately formed, in a recording layer in an unrecorded or initial state.

In a case where the record mark is to be formed of plural marks physically separated, if the plural physical marks are formed closer to one another than a space of about 0.2 ($\lambda$/NA), such plural physical marks may be optically recognized as a single mark i.e. not as plural separated marks. Here, NA is the numerical aperture of an objective lens for focusing a retrieving laser, and $\lambda$ is the wavelength of the retrieving laser.

Accordingly, when one recording mark having a mark length nT to be formed of plural physical marks, the space between the plural physical marks is preferably set to be smaller than 0.2 ($\lambda$/NA).

Figure 2:
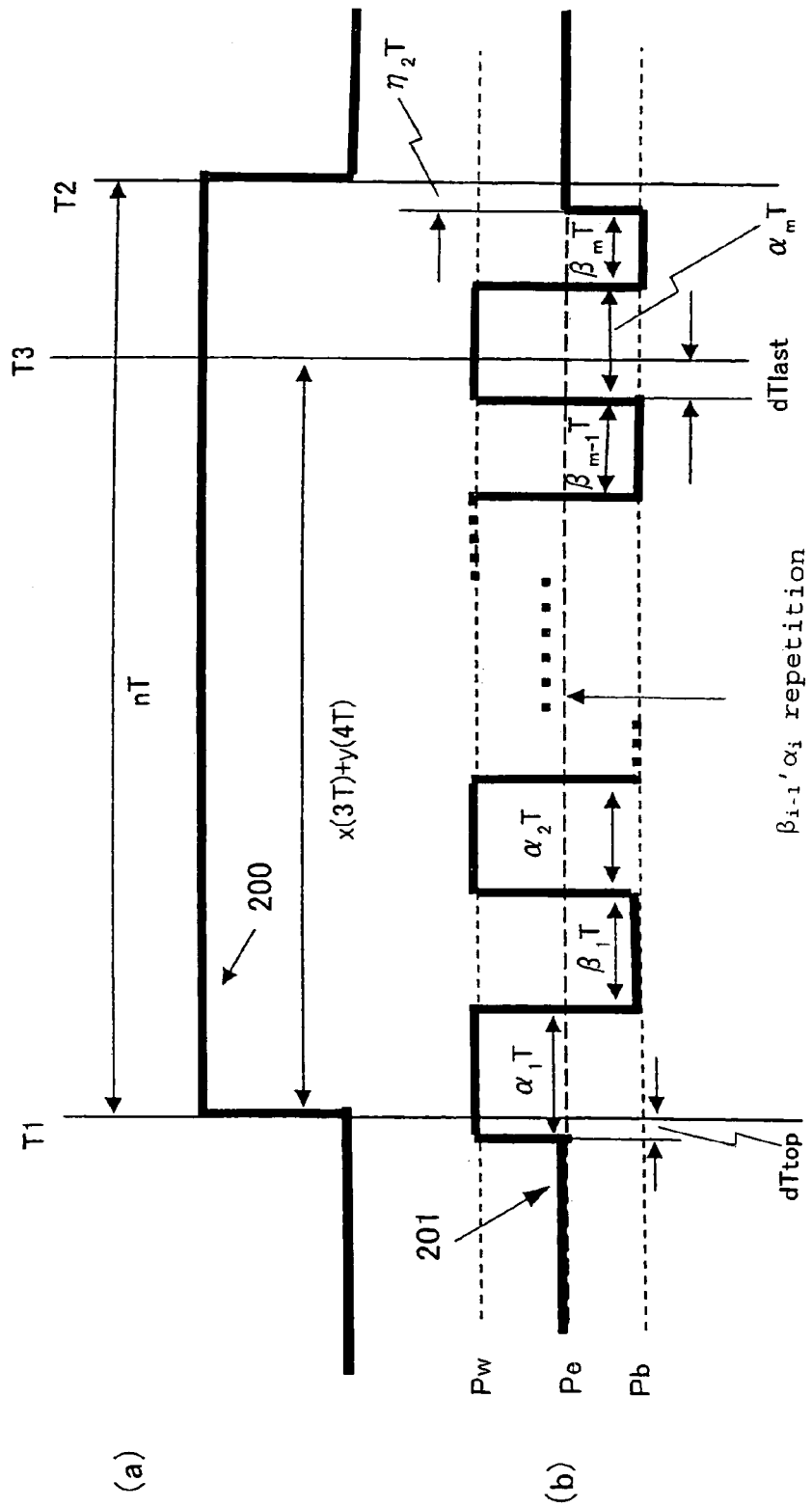
FIG. 2 is timing charts illustrating the relation of the respective recording pulses in a case where a pulse division method in the optical recording method is carried out to which practical modes are to be applied.

Now, with reference to the drawings, the optical recording method to which the present practical mode may be applied, will be described. FIG. 2 is timing charts illustrating an example of the relation of the respective recording pulses in a case where the pulse division method is carried out in the optical recording method to which the present practical mode may be applied. FIG. 2(a) shows a timing chart of a record mark having a record mark length of nT, to be formed. FIG. 2(b) shows a timing chart of the recording pulse division method to form this record mark.

In a recording device to carry out recording of information on an optical recording medium, an electronic circuit (an integrated circuit) to control irradiation timings of the respective laser beams of writing power Pw, bias power Pb and erasing power Pe, is designed on the basis of the timing charts shown in FIG. 2(b), such powers are set to be $Pb \leq Pe \leq Pw$, the writing power at the recording pulse section $\alpha_i T$ (i=an integer of from 1 to m) is constant with Pw, the bias power at the cooing pulse section $\beta_i T$ (i=an integer of from 1 to m) is constant with Pb, a laser beam irradiation power between marks and at sections other than $\alpha_i T$ (i=1 to m) and $\beta_i T$ (i=1 to m) is constant with an erasing power Pe.

In FIG. 2(a), 200 corresponds to a time length corresponding to a record mark having a length nT. FIG. 2(b) is waveform showing the change in time for irradiation with laser energies divided into plural recording pulse sections $\alpha_i T$ and cooling pulse sections $\beta_i T$, in order to form the nT mark length. 200 will rise at a time T1 (which will be referred to as the starting point or front position of the nT mark) as synchronized with the reference clock, and upon expiration of a time nT, will fall at a time T2 (which will be referred to as the terminal point or the rear end position of the nT mark) as synchronized with the reference clock. In the mark length modulation recording, n may take a plurality of integers. Further, the space between marks may likewise take a plurality of times nT. This will be referred to as a length between marks or a space length.

The timing (the starting point) at which the front recording pulse $\alpha_1 T$ will rise is taken as deviated for a time of $dT_{top}$ from the rising (T1) of the time width nT. In the optical recording method to which the present practical mode may be applied, $dT_{top}$ is regarded as taking a positive value when the timing is delayed from T1 (when the timing is delayed from the forward position of the record mark having a length of nT). In FIG. 2 and in the following description, for $dT_{top}$, a range of from $-2T$ to $2T$ is assumed, but the timely positional relation between FIG. 2(a) for signals of the time length nT mark and FIG. 2(b) for the practical divided recording pulses, is relative, and it is optional where to take the time T1. Further, $dT_{top}$ is assumed to have a value of from $-2T$ to $2T$, and it may naturally be $dT_{top}=0$ (a case where there is no timely deviation).

On the other hand, the timely deviation of the end point of $\beta_m T$ from T2 is $\eta_2 T$, and when it is delayed from T2, it takes a negative value. According to the above definition, $\Sigma(\alpha_i + \beta_i)T + dT_{top} + \eta_2 T = nT$. $\Sigma(\alpha_i + \beta_i)T$ is not necessarily accurately be nT, but usually, the difference from nT is preferably within a range of $\pm 2T$.

As opposed to the conventional recording method shown in FIG. 1, the optical recording method shown in FIG. 2 to which the present practical mode may be applied, has the following significance. Namely, in the division method disclosed in conventional CD-RW or RW-DVD standards, m is set to be m=n−1, m=n/2 or m=(n+1)/2. Namely, the average value of a repeating period comprising a recording pulse and an off pulse (in the present practical mode, the average value of such a repeating period comprising a pair of a recording pulse and an off (cooling) pulse, i.e. $(\alpha_i + \beta_i)T$, may sometimes be referred to as "an average period of divided (recording) pulses") is from about 1T or about 2T. Whereas, in the present practical mode, with respect to all record mark lengths wherein the recording pulse dividing number m is at least 2, n/m is adjusted to be at lest 2.5. When n is 6 or more, n/m is adjusted to be at least 2.5, preferably at least 3. On the other hand, n/m is usually at most 5, preferably at most 4.5, more preferably at most 4.

In the present practical mode, at least two record mark lengths are divided into at least two recording pulses for recording. Namely, at least two record mark lengths with m=2 or more, are present. In the mark length modulation recording, as n, plural and finite values are selected from natural numbers of at least 2, but from the above definition, a case where a value of at least 5 is contained as n, is substantially assumed. In a mark length modulation method which is commonly used for CD, n may take a natural number of from 3 to 11. Further, in a mark length modulation method used for DVD, n may take a natural number of from 3 to 11 and 14. Thus, in a practical mark length modulation method, a case where n contains a value of at least 5, is substantially assumed. Thus, the recording method to which the present practical mode may be applied, is applicable to recording by the above-mentioned practical mark length modulation method.

Further, n may take finite values by a coding theory. Further, it is not necessary to set the upper limit for the value of n. However, n is usually takes a value of at most 100, practically at most 50, more practically at most 20. The maximum value which n may take is designated by $n_{max}$. On the other hand, the minimum value of n ($n_{min}$) is usually 2 or 3.

Here, if $dT_{top}$ and $\eta_2$ are assumed to be 0, $\Sigma_i(\alpha_i+\beta_i)/m=n/m$. Accordingly, n/m is a value corresponding to the average length ($\alpha_i+\beta_i$), and (n/m)T will be a value corresponding to an average period of divided pulses. Accordingly, in the present practical mode, the repeating average period comprising a recording pulse and an off pulse (an average period of divided pulses) can be made to be about 3T.

About 3T means that in all mark lengths with m being at least 2, the individual value $(\alpha_i+\beta_i)T(1\leq i\leq m-1)$ will be at least 2.5T, preferably at least 3T. On the other hand, in the case of "about 3T", the individual value of $(\alpha_i+\beta_i)T$ $(1\leq i\leq m-1)$ will be usually at most 5T, preferably at most 4.5T, more preferably at most 4. Further, average value of individual $(\alpha_i+\beta_i)T(1\leq i\leq m-1)$ will be usually from 2.5T to 4.5T.

Here, the reason for excluding the case of $(\alpha_m+\beta_m)T$ is as follows. Namely, as will be described hereinafter, $\beta_mT$ may take a value substantially different from other $\beta_iT$, such that it may be 0. Therefore, there may be a case where $(\alpha_m+\beta_m)T$ may not necessarily be within a range of from 2.5T to 4.5T.

In this case, there is a characteristic that the number of different record mark lengths to be recorded by the same dividing number m, will be at least 3 on average. Namely, if n/m is about 3, the record mark lengths to be formed by the same dividing number m will necessarily be 3 on average.

In the description of the present practical mode, the conventional pulse division methods specified in FIGS. 1(b) and (c) will be referred to as "1T strategy" and "2T strategy" by paying attention to the repeating period of recording pulses. On the other hand, the pulse division method to which the present practical mode may be applied, will be referred to as "3T strategy", since the average period of the divided pulses here is about 3T.

If the reference clock period T is less than about 3 nsec, in the conventional "1T strategy", the average period of divided pulses will be less than about 3 nsec, and in the conventional "2T strategy", the average period of divided pulses will be shorter than 6 nsec. In such a case, the average value at recording pulse sections $\alpha_iT$ or the average value at off-pulse sections $\beta_iT$ will be at most about 1.5 nsec in "1T strategy", or at most about 3 nsec also in "2T strategy". This indicates that with respect to at least one i, in the conventional strategies, one of $\alpha_iT$ or $\beta_iT$ will be at most 3 nsec. Further, in the above description, even if any specific $\alpha_i$ or $\beta_i$ is made longer than the average value, such means that another $\beta_i$ or $\alpha_i$ will be further shortened. Therefore, one of $\alpha_iT$ or $\beta_iT$ will still be small all the same. And, if one of $\alpha_iT$ or $\beta_iT$ becomes at most about 3 nsec or further at most 2 nsec, there may be a case where in high speed recording, no adequate beam irradiation and cooling time will be secured.

On the other hand, in the optical recording method to which the present practical mode may be applied, n/m is made to be at least 2.5 for all record mark length with m being at least 2. Further, when n is at least 6, m is made to be at least 2, and n/m is made to be at least 2.5. Preferably, when n is at least 6, m is made to be at least 2, and n/m is made to be at least 3. On the other hand, the upper limit of n/m is preferably made to be at most 5.

By specifying m and n/m as described above, the repeating average period comprising a recording pulse and an off-pulse can be made to be about 3T, and the lengths of $\alpha_iT$ and $\beta_iT$ can be made to be sufficiently long. For example, recording pulse sections $\alpha_iT$ and off-pulse sections $\beta_iT$ can be taken sufficiently longer than 1T, and even if the reference clock period T becomes about 3 nsec, the average recording pulse width and cooling pulse width can be made to be at least about 2 nsec. Accordingly, heating of the recording layer can be carried out sufficiently, while supply of heat by the subsequent pulse can be suppressed to obtain a sufficient cooling effect. For this purpose, it is preferred that in a case where m is at least 2, the interval between the rising times of the adjacent recording pulses is at least 2.5T, more preferably at least 3T, and all $\beta_iT$ $(1\leq i\leq m-1)$ except for $\beta_mT$, is larger than 1T. Inversely, in the present practical mode, even if the reference clock period T becomes at most about 3 nsec, it is easily possible to make $\beta_iT$ $(1\leq i\leq m-1)$ larger than 1T.

If n/m is less than 2.5 at one of record mark lengths with m being at least 2, such is within the scope of the conventional strategy shown in FIG. 1, whereby the above-mentioned effect of the present invention will not be obtained at a part of the record marks, and the jitter, etc. tend to deteriorate. Therefore, it is important that n/m will be at least 2.5 for all record mark lengths with m being at least 2.

On the other hand, n/m is made to be usually at most 5, preferably at most 4.5 except for a case where a record mark with n=5 is to be formed by one record pulse. If n/m is larger than 5, intervals between the respective recording pulses tend to be so large that it may become difficult to form an optically continuous record mark.

In FIG. 2, it is preferred to synchronize the rising of $\alpha_iT$ and the falling of $\alpha_iT$ with the clock period so that at least all record mark lengths with m being at least 2, will take either 3T or 4T period, whereby there will be a merit such that the electrical circuit to generate divided recording pulses will be simplified. For this purpose, individual $(\alpha_i+\beta_i)T$ values within $1\leq i\leq m-1$ will basically be 3T or 4T $((\alpha_i+\beta_i)$ within $1\leq i\leq m-1$ will take a value of either about 3 or 4). And, based on the 3T or 4T period, the rising (or falling) of the front end $\alpha_1T$ and the rear end $\alpha_mT$, or the timing of the end point of $\beta_mT$ (the timing for switching from Pb to Pe), is preferably deviated to some extent. Here, $\alpha_iT$ and the reference clock period may be synchronized at the rising (the starting point) of $\alpha_iT$, or may be synchronized at the falling (the end point) of $\alpha_iT$.

Namely, on the basis of the starting point T1 of the time width nT corresponding to the nT mark length, recording pulses are preferably set to rise (or fall) as synchronized with 3T or 4T periods. They may all have 3T periods, but some of them may have 4T periods.

Here, $\alpha_1T$ is allowed to have a deviation of $dT_{top}$ from such synchronization timing T1. Further, when the rising time of $\alpha_mT$ is represented by T3, T3 is reached via x 3T periods and y 4T periods (where x and y are integers), from the rising time T1 of $\alpha_1 T$. However, as shown in FIG. 2(b), the rising timing of $\alpha_m T$ is allowed to have a deviation of $dT_{last}$ from such synchronization timing. And, the deviation from T3 is defined as $dT_{last}$. Here, $dT_{last}$ is to have a positive value when the rising is delayed from T3. In the optical recording method to which the present practical mode may be applied, taking such deviations corresponding to $dT_{top}$ and $dT_{last}$ into consideration, the limitation to $(\alpha_i+\beta_i)$ is expressed by "$(\alpha_i+\beta_i)$ takes a value or either about 3 or 4".

In the optical recording method to which the present practical mode may be applied, with respect to at least two, preferably at least 3, record mark lengths, m is at least 2, i.e. recording is carried out as divided into at least two recording pulses. If n/m is about 3 as mentioned above, record mark lengths to be formed by the same dividing number m will naturally be 3 on average. Accordingly, it is preferred to form at least three record marks having different lengths, respectively, by the same dividing number.

In the optical recording method to which the present practical mode may be applied, in order to form plural different record mark lengths respectively by the same pulse dividing number m, at least $\alpha_1$ and/or $\alpha_m$ is changed. Namely, mainly, the front recording pulse $\alpha_1 T$ or the rear end recording pulse $\alpha_m T$ is changed to form such record marks having different lengths respectively. And, when $\alpha_1$ is changed, $dT_{top}$ and/or $\beta_1$ is also changed, and when $\alpha_m$ is changed, $\beta_{m-1}$, and/or $\beta_m$ is also changed. In such a case, it is more preferred that $\alpha_i$ ($2 \leq i \leq m-1$) and $\beta_i$ ($2 \leq i \leq m-2$) other than "$\alpha_1$, $dT_{top}$, $\beta_1$" and/or "$\alpha_m$, $\beta_{m-1}$, $\beta_m$" which may be changed as described above, will take a constant value $\alpha_c$ and $\beta_c$ irrespective of i.

Preferred in the optical recording method to which the present practical mode may be applied, is to change at least $\alpha_1$ or $\alpha_m$ to form plural different record mark lengths by the same pulse dividing number m, respectively. And when the $\alpha_1$ is changed, $dT_{top}$ and/or $\beta_1$ is also changed, and when the $\alpha_m$ is changed, $\beta_{m-1}$ and/or $\beta_m$ is also changed. In such a case, it is more preferred that $\alpha_i$ ($2 \leq i \leq m-1$) and $\beta_i$ ($2 \leq i \leq m-2$) other than "$\alpha_1$, $dT_{top}$, $\beta_1$" or "$\alpha_m$, $\beta_{m-1}$, $\beta_m$" which may be changed as described above, take constant values $\alpha_c$ and $\beta_c$ irrespective of i.

More preferred in the optical recording method to which the present practical mode may be applied, is the following method. Namely, consideration is given on the basis of an optical recording method to be used for forming one record mark length A among plural different recording mark lengths to be formed by the same pulse dividing number m. And, in the optical recording method as such a basis, $\alpha_i$ or $\alpha_m$ is changed to form record mark lengths other than the above record mark length A in the above-mentioned plural different record mark lengths. By deciding such a mark length as the basis in plural different record mark lengths to be formed by the same pulse dividing number m, the number of independent parameters can be reduced. As a result, the design of the electronic circuit for controlling the laser beam, can be simplified.

Here, it is preferred that at least three different record mark lengths are formed by the same pulse dividing number m. By forming at least three record marks by the same dividing number m in such a manner, the number of independent parameters can further be reduced. As a result, the design of the electronic circuit for controlling the laser beam can further be simplified.

($dT_{top}$, $\alpha_1 T=T_{top}$, $\beta_1$) and ($\beta_{m-1}$, $\alpha_m T=T_{last}$, $\beta_m T=T_{c1}$) are parameters to be used for fine adjustment of the front and rear positions of a mark and the jitter, respectively, and correction of the mark length corresponding to nT is realized mainly by increase or decrease of such parameters relating to time. Further, in a case where $(\alpha_i+\beta_i)$ takes a value of either about 3 or 4, as mentioned above, $\beta_1 T$ is automatically set by $\beta_1 T=(3T \text{ or } 4T)-(T_{top}+dT_{top})$, and $\beta_{m-1} T$ is automatically set by $\beta_{m-1} T=(3T \text{ or } 4T)-\alpha cT+dT_{last}$. In such a case, adjustment at the front end of the mark is carried out by ($T_{top}$, $dT_{top}$), and adjustment at the rear end of the mark is carried out by ($T_{last}$, $dT_{last}$, $T_{c1}$)

In the above-mentioned reference (e.g. Proceedigns of PCOS2000, The Society of Phase Change Recording, Nov. 30, 2000, Nov. 30-Dec. 1, 2000, p. 52-55), the present inventors have proposed to primarily correct $\beta_1 T$ and $\beta_{m-1} T$ to $\beta_1' T$ and $\beta_{m-1}' T$, respectively, in order to effectively realize the difference in mark length by 1T between an even number length mark and an odd number length mark by the same dividing number m.

However, as a result of a further study, it has been found that by the correction of $\beta_1$ and $\beta_{m-1}$ only, it becomes impossible to effectively form plural different mark lengths by the same dividing number m. Particularly, it has been found that in a case where at least three different mark lengths are to be respectively formed by the same dividing number m, it becomes difficult to realize good recording characteristics in a case where only $\beta_1$, $\beta_{m-1}$ and further length of other off-pulse sections, are adjusted to form plural mark lengths by the same dividing number m and the writing power is varied to some extent.

In a conventional recording pulse division method, in a case where plural different mark lengths are formed by the same dividing number m solely by adjusting off-pulse sections $\beta_i T$ (mainly $\beta_1 T$, $\beta_{m-1} T$), the sum $\Sigma \alpha_i T$ of recording pulse sections imparted to form such marks will be the same for such mark lengths. Further, in the present practical mode, preferably, a case is assumed where the writing power Pw in the recording pulse sections at the time of forming one record mark, is constant (namely, the writing power Pw in each section from $\alpha_1 T$ to $\alpha_m T$, is constant). Accordingly, $\Sigma \alpha_i T$ being the same despite the mark lengths are different, means that the sum of recording energies for forming plural mark lengths by the same dividing number i.e. $Pw \times (\Sigma \alpha_i T)$ will be the same.

Whereas, recording devices (drives) to carry out recording on optical recording media, usually have some fluctuations in the output of the laser generation devices among the individual recording devices. This means either that the above-described writing power Pw is fluctuated among the recording devices, or even in the same device, the above writing power Pw fluctuates every time when recording is carried out. As a result of an extensive study by the present inventors, it has been found that in the recording energy irradiation method wherein the sum of the recording energies to be used for forming plural mark lengths by the above-mentioned same dividing number i.e. $Pw \times (\Sigma \alpha_i T)$ is constant, there is a problem that due to fluctuation of Pw among the above recording devices or due to fluctuation of Pw in each recording by the same device, the change rate $\Delta Tmark$ by Pw of each mark length by the same dividing number m will not be the same. Namely, when Pw fluctuates and $\Delta Pw$ changes, there will be no problem if the change rate $\Delta Tmark$ of each mark length is substantially the same, but if correction of only off pulse sections is carried out as a recording method (a method wherein $Pw \times (\Sigma \alpha_i T)$ is constant), the difference in $\Delta Tmark$ of each mark becomes distinct depending upon $\Delta Pw$. In such a case, particularly the jitter between marks (referred to as space jitter or land jitter) tends to be large.

Whereas, in the conventional 1T base recording pulse division method shown in FIG. 1, one recording pulse was added every time when the mark length changed by 1T, and accordingly, a rule was maintained such that as the mark length was long, the sum of recording energies was simply increased. Therefore, ΔTmark due to fluctuation of Pw among recording devices or fluctuation of Pw in every recording by the same device, was substantially constant, whereby this problem did not appear.

On the other hand, in the "3T strategy" recording pulse division method of the present invention, when the above Pw changes, ΔTmark is required to be substantially constant in plural mark lengths to be formed by the same dividing number m, and a special consideration is required.

Therefore, the present inventors have found that the following method is effective to make ΔTmark resulting from ΔPw among recording devices to be substantially constant among plural mark lengths to be formed by the same dividing number m. Namely, they have found that in a case where different mark lengths are to be formed by the same dividing number m, it is effective to certainly correct at least either one of $\alpha_m T$ or $\alpha_1 T$ to simply increase the sum of recording energies Pw×($\Sigma\alpha_i T$) together with the mark length.

Namely, in a case where a mark length is to be shortened, it is preferred to reduce at least one of $\alpha_m T$ and $\alpha_1 T$. On the other hand, in a case where the mark length is to be prolonged, it is preferred to increase at least one of $\alpha_m T$ and $\alpha_1 T$.

On the other hand, with respect to which one should be adjusted among recording pulses $\alpha_i T$ (1≦i≦m), it is most preferred to adjust the length of the last $\alpha_i T$ i.e. $\alpha_m T$ with the same m, in order to obtain the same function as an increase of one last $\alpha_i T$ every time when m increases or decreases. It is thereby possible to reduce the number of independent parameters, since the method for generating divided recording pulses from $\alpha_1 T$ to $\alpha_{m-1} T$ can be made to be constant.

Then, it is preferred to adjust $T_{top} = \alpha_1 T$. The reason as to why such adjustment of the front $\alpha_1$ and the last $\alpha_m$ is preferred, is such that by such adjustment, at least intermediate recording pulses $\alpha_i T$ (2≦i≦m-1) can be maintained to be constant, and $\alpha_i + \beta_i$ (2≦i≦m-1) can be made to have a value of either about 3 or 4.

And, in a case where the mark length is increased or decreased by ±1T against a reference mark length, firstly, it is preferred to increase or decrease $T_{last} = \alpha_m T$ by within about 1T. In a case where an increase or decrease of the mark length by at least 2T is to be carried out, in addition to this, it is preferred to increase or decrease $T_{top} = \alpha_1 T$ by within about 1T.

Further, by a study made by the present inventors, it has been found that in a case where $T_{top} = \alpha_1 T$ is changed, and $dT_{top}$ and/or $\beta_1 T$ is adjusted and $\alpha_m T$ is adjusted, it is effective to adjust $\beta_{m-1} T$ and/or $\beta_m T$ as well, thereby to attain low jitter at the mark ends in addition to correction of the mark length by 1T.

The change in length of $\alpha_1 T$ is not only generate a lengthwise extension of the melting region of the recording layer by $\alpha_1 T$ irradiation. Namely, along with the lengthwise extension of the melting region of the recording layer, the remaining heat effect will also be changed. Accordingly, if the length of $\alpha_1 T$ is changed, the recrystallization state of the front end of the mark tends to be changed. Therefore, in the present invention, in order to compensate such a change of the recrystallization state, $\beta_1 T$ will be adjusted. And, further preferably, $dT_{top}$ will also be finely adjusted.

Namely, when $\alpha_1 T$ is elongated, the above-mentioned remaining heat effect will increase, and accordingly, $\beta_1 T$ is also elongated to increase the cooling effect. And, if necessary, the length of $dT_{top}$ is adjusted to accurately control the forward end position of the mark. On the other hand, when $\alpha_1 T$ is shortened, the above-mentioned remaining heat effect will be reduced, and accordingly, $\beta_1 T$ is also shortened to reduce the cooling effect. However, if $\alpha_1 T$ and $\beta_1 T$ are shortened, there may be a case where the period of $(\alpha_1+\beta_1)T$ is required to be made substantially shorter than 3T. Therefore, it is preferred to carry out the adjustment to elongate $\alpha_1 T$.

Like in the case of changing the length of $\alpha_1 T$, the change in length of $\alpha_m T$ is not only generate the lengthwise extension of the melting region of the recording layer by $\alpha_m T$ irradiation. Namely, along with such a lengthwise extension of the melting region of the recording layer, the remaining heat effect will be also changed. Accordingly, if the length of $\alpha_m T$ is changed, the recrystallization state at the rear end of the mark tends to be changed. Therefore, in the present invention, to complement the change in the recrystallization state, $\beta_{m-1} T$ will also be adjusted. And further preferably, $\beta_m T$ will be adjusted.

Namely, when $\alpha_m T$ is elongated, the above-mentioned remaining heat effect will also be increased, and accordingly, $\beta_{m-1} T$ or $\beta_m T$ is elongated to increase the cooling effect. On the other hand, when $\alpha_m T$ is shortened, the above-mentioned remaining heat effect will be reduced, and accordingly, $\beta_{m-1} T$ or $\beta_m T$ will be shortened to reduce the cooling effect. However, when the operation to shorten $\beta_{m-1} T$ or $\beta_m T$ in the case where $\alpha_m T$ is to be shortened, is compared with the operation to elongate $\beta_{m-1} T$ or $\beta_m T$ in the case where $\alpha_m T$ is to be elongated, more important is an operation to shorten $\beta_{m-1} T$ or $\beta_m T$ in the case where $\alpha_m T$ is to be shortened. Therefore, in some cases, it is possible to omit an operation to elongate $\beta_{m-1} T$ or $\beta_m T$ in the case where $\alpha_m T$ is to be elongated.

In the present invention, when $\alpha_1$ is adjusted, $dT_{top}$ and/or $\beta_1$ is adjusted, and when $\alpha_m$ is adjusted, $\beta_{m-1}$ and/or $\beta_m$ is adjusted. However, in the case of forming at least three record mark lengths by the same dividing number m, if the above conditions are satisfied with respect to two record mark lengths, the effect may be obtained to some extent. Therefore, for example, the following control method will also be within the present invention. Namely, for example, two record mark lengths among at least three record mark lengths to be formed by the same dividing number m, are formed by reducing $\alpha_m$ and at the same time by adjusting $\beta_{m-1}$ and/or $\beta_m$ And, in a case where $\alpha_m$ is increased in order to form record mark lengths different from the above two record mark lengths, $\beta_{m-1}$ and $\beta_m$ may not be changed.

It has been found that it is thereby possible to certain carry out good high speed recording, particularly to carry out good recording within a wide linear velocity range like the after-mentioned CAV or P-CAV recording.

Further, by a study made by the present inventors, it has been found that in the case of imparting a difference in mark length corresponding to 1T by increasing or decreasing $\alpha_m$, the increasing or decreasing amount is preferably within a range of from 0 to 1 rather than accurately 1. Likewise, it has been found that in the case of imparting a difference in mark length corresponding to 1T by increasing or decreasing $\alpha_1$, the increasing or decreasing amount is preferably within a range of from 0 to 1 rather than accurately 1.

Figure 3:
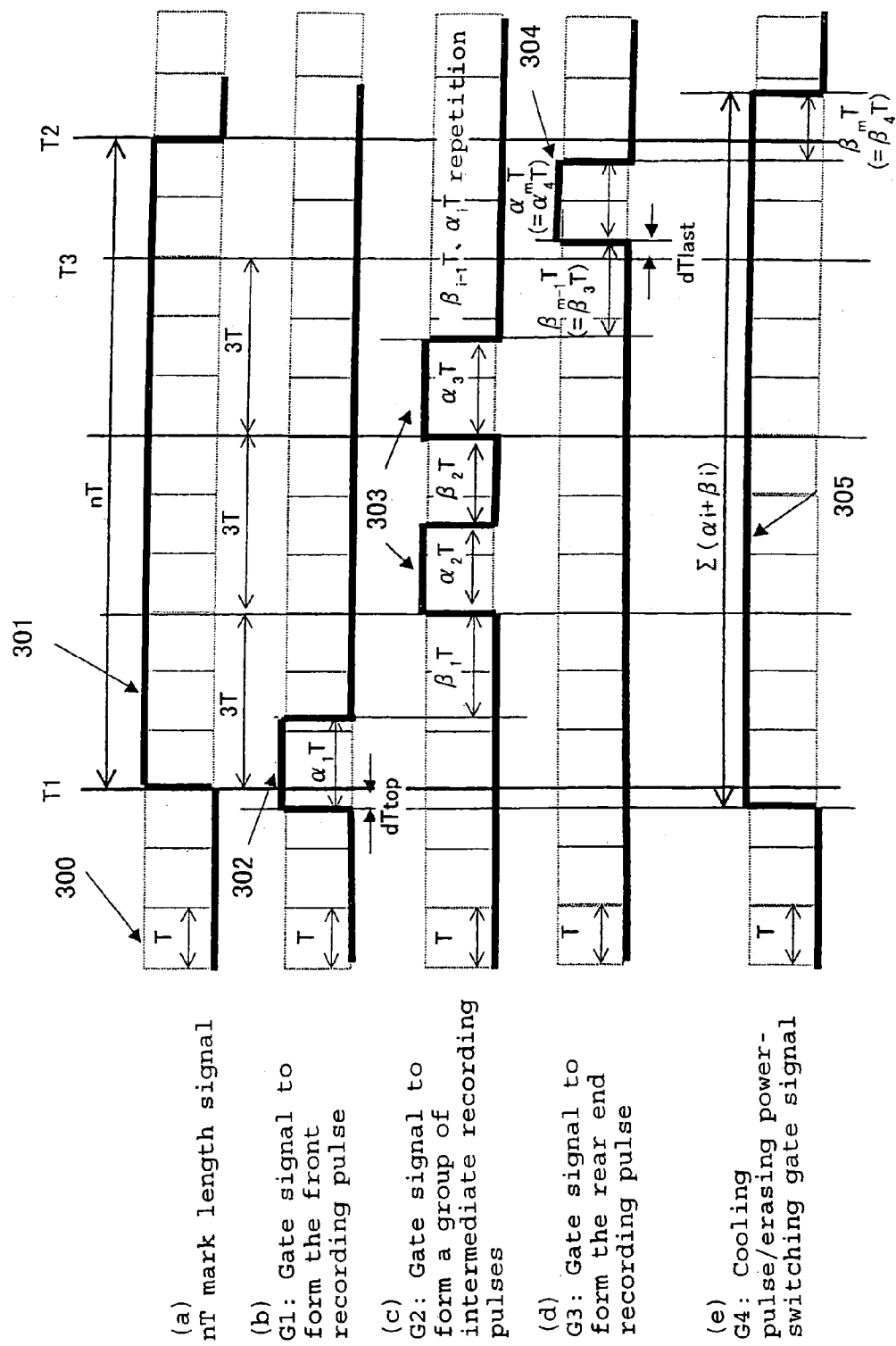
FIG. 3 is views illustrating specific examples of timing charts for logical circuits to carry out the recording pulse division method in the optical recording method, to which the practical modes are to be applied.

Now, in order to have practical divided recording pulse laser beams emitted from a laser diode as shown in FIG. 2, integrated circuit outputs of a theoretical level to generate gate signals by a timing chart as shown as an example in FIG. 3, are input to the laser driver circuit. And a large current to drive the laser is controlled to control the laser output from the laser diode thereby to control the writing power, whereby control of the divided recording pulse laser as shown in FIG. 2, can be accomplished.

FIG. 3 is a specific example of a timing chart of a (theoretical) circuit to generate a recording pulse division method in the optical recording method to which the present practical mode may be applied, and particularly an example wherein in a case where n=11 and m=4, the respective recording pulse and cooling pulse sections are set so that they will be synchronized with the reference clock (300) as far as possible. Namely, it is an example wherein $(\alpha_i+\beta_i)T$ at $1 \leq i \leq m-1$ will be about 3T period, but 4T period may be mixed in a part or whole thereof. In FIG. 3, formation (ON) or halt (OFF) of each pulse will be determined in correspondence with the switching of high and low binary levels of the logical level.

FIG. 3(a) shows an nT mark length signal (301) having a time width nT, which is formed by a combination of plural gates for controlling recording pulses shown at 302, 303, 304 and 305, respectively, in FIGS. 3(b) to (e). Namely, a gate signal G1 (302) to form the front recording pulse $\alpha_1T$, a gate signal G2 (303) to form a group of intermediate recording pulses $\alpha_iT$ ($2 \leq i \leq m-1$), and a gate G3 to form the rear end recording pulse $\alpha_mT$ (304), and a cooling pulse/erasing power-switching gate signal G4 (305) to form a cooling power pulse by defining sections to impart Pe and Pb, are separately formed, and they are combined. In G1, G2 and G3, a writing power is emitted at an ON level. Further, the ON section of the gate signal G4 is set to be a section of $\Sigma(\alpha_i+\beta_i)T$ starting from the rising of $\alpha_1T$ as the starting point (i.e. after a delay corresponding to $dT_{top}$ from T1).

The priority relation of such gate signals will be obtained by carrying out summation of logical signals for controlling the respective gates by letting ON/OFF of the gates correspond to theoretical 1 (High) and 0 (Low) levels. Specifically, the ON signals of G1, G2 and G3 have priority over the ON signal of G4, and even during the G4 ON period (during Pb irradiation), if G1, G2 or G3 becomes ON, Pw will be irradiated. Consequently, the gate signal G4 defines the timing of an OFF pulse section $\beta_iT$ at a section where each of G1, G2 and G3 becomes OFF. Further, in a case where all of G1, G2, G3 and G4 are OFF, Pe will be irradiated.

Figure 33:
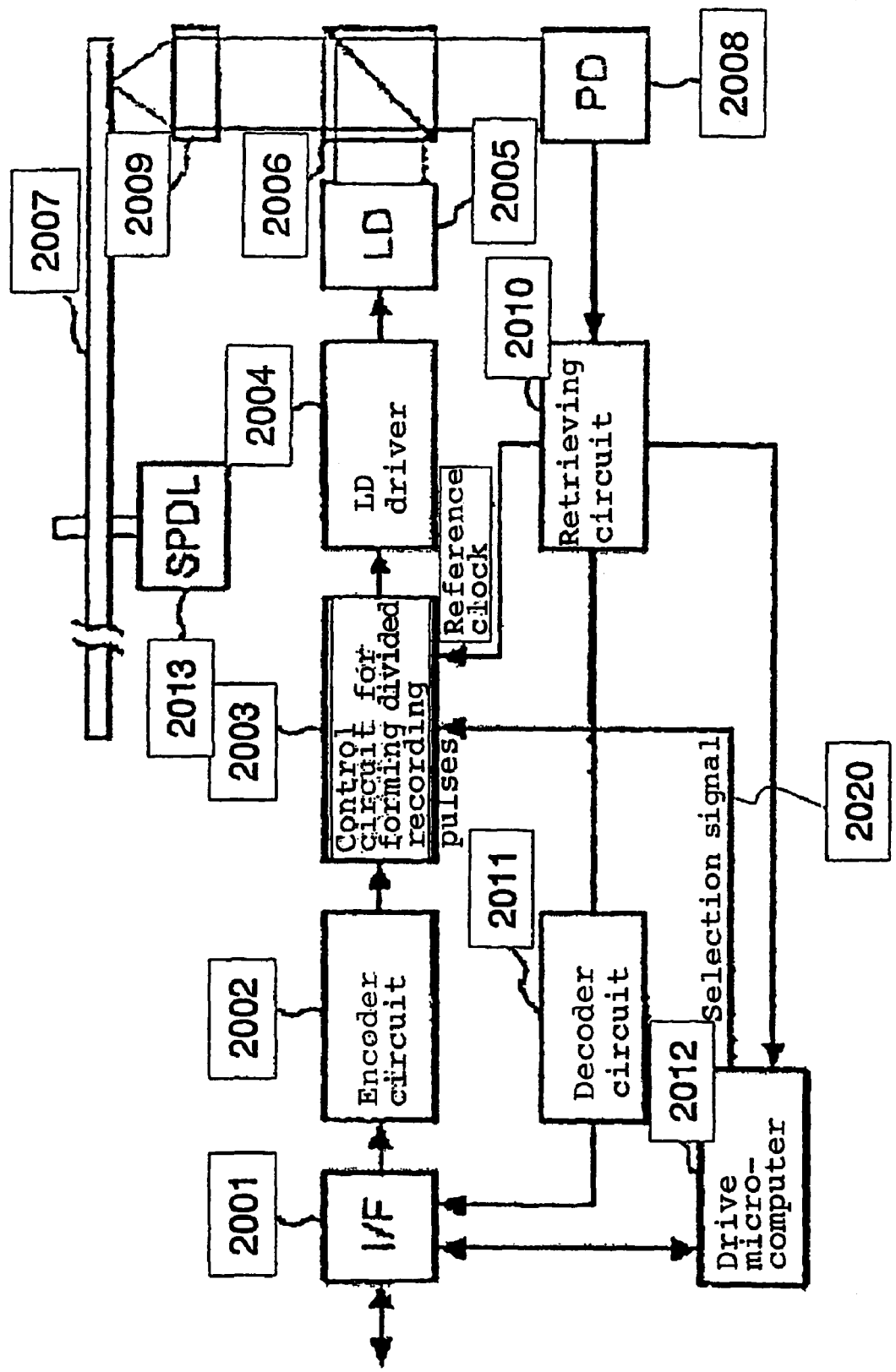
FIG. 33 is a structural illustration of one example of the optical recording device to carry out the optical recording method of the present invention.

FIG. 33 shows an example of an optical recording device to carry out the optical recording method of the present invention, and it is an example of a practical mode as an optical disk recording/retrieving device for recording data for computers.

In FIG. 33, 2001 is an interface (I/F) circuit to transfer data to and from a host computer not shown, 2002 is a encoder circuit for encoding data to be recorded, and 2003 is a control circuit for forming divided recording pulses, to form divided recording pulses based on the signals modified by the encoder circuit 2002. Further, 2004 is a LD driver for controlling the laser beam output based on the control signals of a logical level output from the divided recording pulses-forming circuit 2003, and 2005 is a semiconductor laser (LD) as a power source for the optical disk recording/retrieving device. Further, 2006 is a beam splitter which lets a laser beam from the above semiconductor laser 2005 output as emitted light on an optical disk 2007 as a recording medium and which separates reflected light from the optical disk and leads it to a photodetector 2008. 2009 is an object lens to focus the laser beam on the optical disk. Further, the photodetector 2008 is a component which receives the above-mentioned reflected light and converts it to an electric signal.

Further, 2010 is a retrieving circuit which detects a signal recorded on the optical disk from the electric signal output from the above-mentioned photodetector 2008 and which forms a reference clock (period T) for it. Further, 2011 is a decoder circuit to decode data recorded on the optical disk retrieved by the above retrieving circuit 2010, and 2012 is a microcomputer to control the entire optical disk recording/retrieving device. Further, 2013 is a spindle motor to rotate the above optical disk (recording medium) 2007. For the record data to be recorded on the optical disk (recording medium) 2007, a mark-modulation recording system is employed wherein parallel data encoded by the above encoder circuit 2002 is further converted to serial Non Return to Zero Inverted (NRZI) signals. The clock frequency at that time is the reference clock output from the above retrieving circuit 2010. Usually, at 2010, a wobble signal of a guide groove preliminarily formed on the optical disk, is detected, and the reference clock is extracted. Therefore, a reference clock corresponding to the recording linear velocity can be obtained.

According to the present invention, at the divided recording pulses-forming control circuit 2003, divided recording pulses to form the nT mark length, are formed by gate signals comprising plural partial pulses as shown in the example of timing charts in FIG. 3. And, a divided recording pulses-controlling signal Gs having gate signals G1, G2 and G3 relating to recording pulses among them, combined, and G4, are output. As a series of nT mark lengths are sequentially generated, the corresponding gate signals Gs and gate signals G4 defining the erasing power level between marks, are sequentially generated.

Further, in the timing charts in FIG. 3, gate signals to form four partial pulse groups G1, G2, G3 and G4, are used. However, in the formation of divided recording pulses in the present invention, if necessary, gate signals of a different combination may be employed.

On the other hand, in the generation of such four gate signals, it is possible to provide gate signals suitable for a plurality of recording media respectively, such as gate signals GA (G1A, G2A, G3A and G4A) to generate recording pulses optimized for a recording medium A and gate signals GB (G1B, G2B, G3B and G4B) to generate recording pulses optimized for a recording medium B, so that they may be selected by a selection signal 2020 from the control microcomputer 2012. Further, it is possible to selectively use gate signals to form divided recording pulses suitable for the respective recording linear velocities.

Figure 34:
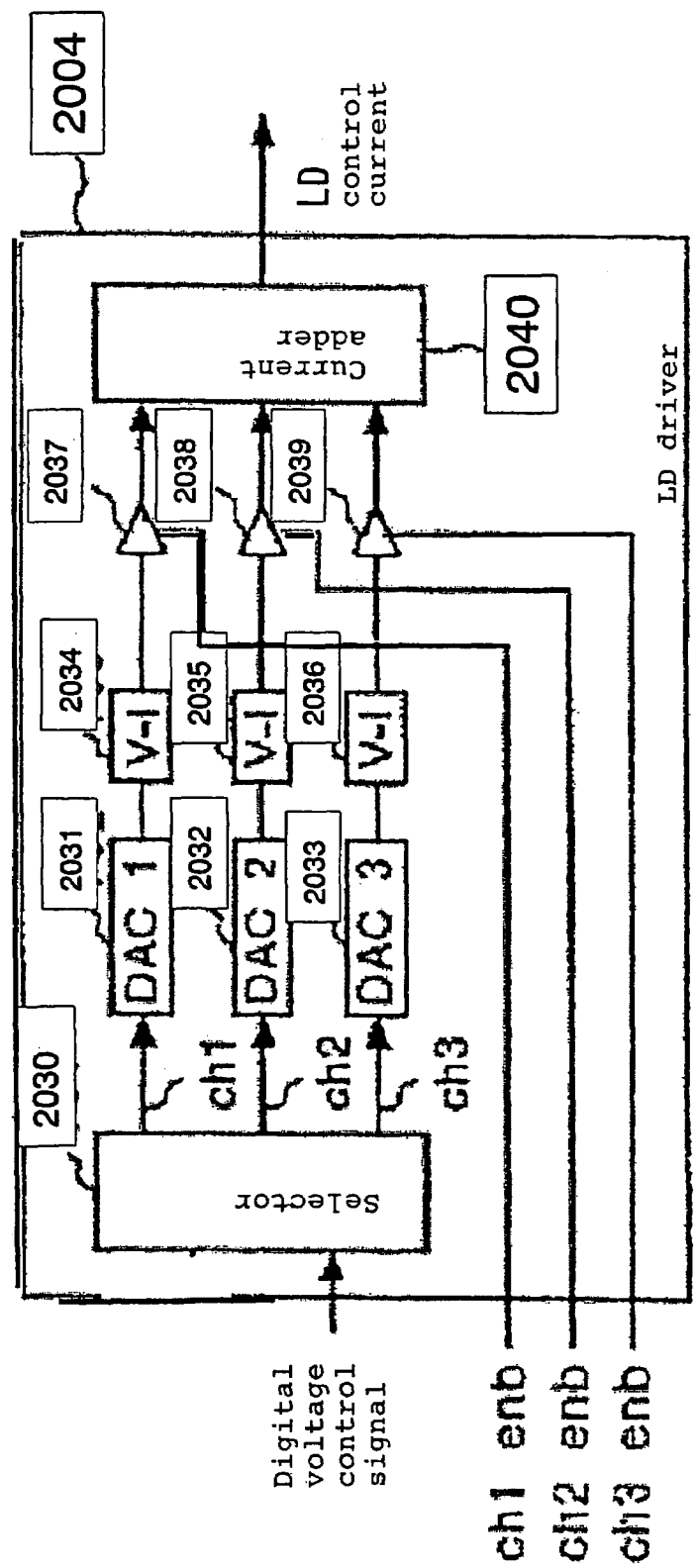
FIG. 34 is a structural illustration of one example of the LD driver in the optical recording device of the present invention.

The LD driver 2004 has a construction as shown in FIG. 34. A selector 2030 is one to output digital voltage-control signals to plural (here three) channels (output terminals). The digital voltage-control signals specified respectively for the three channels output from the selector 2030, show the degrees of electric currents for driving LD supplied from the respective channels (Ch1, Ch2 and Ch3). Based on the divided recording pulses optimum to an optical disk set by the above control microcomputer 2012, for example, to ch1, a voltage value corresponding to the bias power Pb will be output; to ch2, a voltage value corresponding to the erasing power Pe in combination with the bias power Pb, will be output; and to ch3, a voltage value corresponding to the writing power Pw in combination with the bias power Pb and the erasing power Pe, will be output. Such digital voltage outputs from the respective channels of the selector 2030 will then be input to digital analogue converter (hereinafter sometimes referred to as DAC)1, DAC2 and DAC3 (2031, 2032 and 2033, respectively) and converted to analogue voltages, and further converted to electric currents by the respective voltage/current (V/I) converters 2034, 2035 and 2036. Then, such currents of the respective channels will be led to a current adder 2040 via current amplifiers 2037, 2038 and 2039 provided with enable terminals to amplify the currents, respectively. As its output, a LD drive current will be obtained to control and drive the semiconductor laser 2005.

To the enable terminals of the current amplifiers 2037 and 2038 for the respective channels ch1 and ch2, two types of channel enable signals (ch1 enb, ch2 enb) formed from gate signals Gs and G4 from the respective divided recording pulses-forming control circuits, are input.

Further, the relation between the respective channel enable signals (gate signals) and the channel signals (the respective power levels) is shown in Table A.

Thus, a LD control signal for a desired current pattern can be obtained.

TABLE A

|  | ch1 enb (Gs) | ch2 enb (G4) |
| --- | --- | --- |
| ch1 (Pb) | ON | OFF |
| ch2 (Pe) | OFF | OFF |
| ch3 (Pw) | ON | ON |

Further, at the selector 2030, usually, in addition to the above ch1 and ch2, a channel ch3 to output a retrieving laser power level and a channel enable signal ch3 enb, are added. Further, when different writing power levels are to be used for G1, G2 and G3, respectively, they are, respectively, input to different channels.

A group of intermediate recording pulses $\alpha_i T$ ($2 \leq i \leq m-1$) can exist when m is at least 3, but their values preferably take a constant value $\alpha c T$ irrespective of i, whereby the gate G2 can be simplified. Further, $\alpha c$ may take a different value depending upon n, but it preferably takes a constant value irrespective of n, so that the circuit can be simplified.

The rear end position of a mark depends on the rising position of the last rear end recording pulse $\alpha_m T = T_{last}$ and the subsequent step of cooling the recording layer temperature. Further, the rear end position of a mark depends on the values of the writing power $Pw_m$, the bias power $Pb_m$, $\beta_{m-1}$, $\alpha_m$ and $\beta_m$, at the divided pulse period $(\alpha_m + \beta_m)T$ at the rear end of the mark. In the optical recording method to which the present practical mode may be applied, the values of the rear end recording pulse section $\alpha_m T = T_{last}$ and OFF pulse section $\beta_m T = T_{c1}$ will give a substantial influence over the cooling rate of the recording layer.

The falling (the end point) of $T_{last}$ is the starting position (the starting point) of $T_{c1}$. The rising (the starting point) of $T_{last}$ is again defined by a deviation from the reference clock T3 by $dT_{last}$, whereby $dT_{last}$ is positive when the deviation is a delay from T3. The after-mentioned $dT_{last+}$ and $dT_{last-}$ are defined in the same manner.

$dT_{last}$ is usually at least $-1.5T$, preferably at least $-T$, more preferably at least $-0.5T$. On the other hand, $dT_{last}$ is usually at most $1.5T$, preferably at most $T$, more preferably at most $0.5T$. If the time from the rising (the starting point) of $\alpha_{m-1}T$ to T3, is 3T or 4T, $\beta_{m-1}T$ will automatically be set by $\beta_{m-1}T = (3T \text{ or } 4T) - \alpha c T + dT_{last}$.

Firstly, $T_{last}$ is increased or decreased by about 1T, more preferably within a range of from 0 to 1T, to increase or decrease the mark length by 1T; $T_{c1}$ is used for adjustment to lower the jitter; and $dT_{last}$ is used for fine adjustment to accurately obtain the mark length difference corresponding to 1T. With respect to the adjustment of $T_{c1}$ and the adjustment of $dT_{last}$, there may be a case where either one of them will suffice. Further, as mentioned above, $\beta_{m-1}$ may automatically be set by the period 3T or 4T, $T_{last}$ or $dT_{last}$. In such a case, the number of independent parameters can be reduced.

On the other hand, the position of the front end of the mark will be determined substantially by the rising position of the writing power laser beam at the front recording pulse $\alpha_1 T = T_{top}$, and its jitter is determined by the powers $Pw_1$ and $Pb_1$ at $\alpha_1 T$ and $\beta_1 T$ and further by the duty ratio of $\alpha_1 T$ to $\beta_1 T$. Further, the rising position of $\alpha_1 T = T_{top}$ depends also on the deviation of $dT_{top}$, based on the clock period, whereby $dT_{top}$ is positive when the deviation is a delay from T1.

$dT_{top}$ is usually at least $-1.5T$, preferably at least $-T$, more preferably at least $-0.5T$. On the other hand, $dT_{top}$ is usually at most $1.5T$, preferably at most $T$, more preferably at most $0.5T$. If the time from T1 to the rising (the starting point) of $\beta_2 T$ is 3T or 4T, $\beta_1 T$ is automatically set by $\beta_1 T = (3T \text{ or } 4T) - (T_{top} + dT_{top})$.

Firstly, $T_{top}$ is increased or decreased by about 1T, more preferably within a range of from 0 to 1T, to increase or decrease the mark length by 1T. And, $\beta_1$ is used for adjustment to lower the jitter. Further, $dT_{top}$ is used for fine adjustment to accurately obtain the mark length difference corresponding to 1T.

With respect to adjustment of $\beta_1$ and the adjustment of $dT_{top}$, there may be a case where either one of them will suffice. Further, as mentioned above, $\beta_1$ may automatically be set by the period 3T or 4T, $T_{top}$ or $dT_{top}$. In such a case, the number of independent parameters can be reduced.

It has already been mentioned that in a case where the dividing number m is at least 3, it is possible to simplify the pulse-generating circuit by making $\alpha_i T$ with i=2 to m-1 to have a constant value $\alpha c$ ($\alpha c T = T_{mp}$), in the group of intermediate recording pulses present between the front pulse and the rear end pulse. Further, it has already been mentioned also that $(\alpha_i + \beta_i)T$ preferably takes only a value of either 3T or 4T, whereby the pulse-generating circuit can be simplified. Here, "a constant value" is meant to allow a deviation which unavoidably results from the practical performance of e.g. the electronic circuit. Namely, a deviation to some extent may result so long as the effect of the present practical mode to enable good recording, can be obtained. For example, a deviation at a level of $\pm 0.2T$ is contained in the allowable deviation unavoidably resulting from the practical performance of e.g. the electronic circuit.

By the above construction, the design of the control circuits (the theoretical circuit and the laser driver circuit) to control generation of laser beams (pulse beams) for recording pulses and off-pulses of the recording pulse strategy, can be more simplified.

In the optical recording method to which the present practical mode may be applied, the pulse widths are defined on the basis of the time widths at the logical circuit levels as shown in FIG. 3. Namely, the time width of $\alpha_i T$ is defined by the time (the half value width) for the logical level voltage or current output to have reached from one level to one half of the other level in the power level transition between Pw and Pb or in the logical level transition corresponding to the power level transition between Pw and Pe, in the divided pulses-forming logical circuits like the timing charts shown in FIG. 3. Each of the Pe→Pw transition and the Pb→Pw transition is a transition between the binary levels as logical levels, and there is no distinction in the definition of the half value width. Here, the logical levels are levels corresponding to binary voltages between a low level (usually 0 V) and a high level (usually from 3.5 to 5 V), for example, in TTL.

The actual output laser waveform has a delay at a level of from 1 to 2 nsec and involves an overshoot or undershoot, and the change with time of the writing power will not take such a simple square waveform as shown in FIG. 2. However, in the recording pulse division method in the optical recording method to which the present practical mode may be applied, an irradiation energy necessary for recording can be secured by increasing the writing power $Pw_i$, although there may be a problem in the rising/falling of the recording laser beam, so long as the recording pulse sections $\alpha_i T$ (i=1 to m) are at least about 2 nsec. Even in such a case, the rising and falling of the recording laser beam pulses may be made to be less than 2 nsec, more preferably less than 1.5 nsec, more preferably less than 1 nsec, whereby the required writing power Pw may be suppressed.

Further, the rising or falling time of the actual writing power is usually the time required for a transition of from 10% to 90% of the difference from one level to the other level when the power undergoes transition between the power levels of Pe or Pb, and Pw. The sum of the rising and falling times is usually smaller than $\alpha_i T$, preferably at most 80% of $\alpha_i T$, more preferably at most 50% of $\alpha_i T$.

In the recording pulse division method in the optical recording method to which the present practical mode may be applied, even if there is a deviation between the time width of a logical level and the actual response of the writing power, if such a deviation is a delay at a level of the above-mentioned rising and falling times, there will be no problem, and it is possible to obtain good characteristics of the respective parameters defining the after-mentioned recording pulse division method (defining by logical levels) within the preferred variable ranges. Inversely, it is an important feature of the optical recording method to which the present practical mode may be applied, that even with a laser diode output which necessarily involves such a delay or overshoot, mark length modulation recording by divided recording pulses will be possible with a clock period of less than about 5 nsec.

On the other hand, also with respect to off-pulse sections $\beta_i T$ (i=1 to m-1), if they are respectively at least 2 nsec, the cooling effect can be secured by lowering the bias power Pb to the same level as the retrieving laser power Pr or to 0 unless such brings about a trouble to other system such as a tracking servo.

In order to further obtain a higher cooling effect, it is preferred to make $\Sigma_i(\alpha_i)$ smaller than 0.5 n with respect to the time lengths of all record marks. More preferably, $\Sigma_i(\alpha_i)$ is at most 0.4 n. Namely, the sum $\Sigma_i(\alpha_i T)$ of recording pulse sections is made to be shorter than $\Sigma_i(\beta_i T)$ to make the off-pulse sections long in each mark. Particularly preferably, with respect to all i in the case where i=2 to m-1, $\alpha_i T \leq \beta_i T$, and in at least the second or subsequent recording pulse row, $\beta_i T$ is made longer than $\alpha_i T$.

In the present practical mode, $\beta_m$ may be made to be 0, so that the last off-pulse section $T_{c1}=\beta_m T$ may not be irradiated with the bias power laser beam. However, usually, in order to avoid heat accumulation at the rear end portion of the mark, it is preferred to provide $\beta_m T$. $\beta_m$ is a real number of at least 0. The upper limit of $\beta_m$ is usually at most 10.

Specifically, $\beta_m T$ is usually at least 2 nsec, preferably at least 3 nsec. Here, the pulse time width of $\beta_m T$ may be defined in the same manner as the above $\alpha_i T$. Namely, with respect to the power level transition between Pw and Pb and the power level transition between Pb and Pe, the period from the time when the power level corresponding to one half of Pw-Pb is reached to the time when the power level corresponding to one half of Pe-Pb is reached, may be taken as the pulse time width of $\beta_m T$. And, this pulse time width may be substituted by a theoretical level time width.

In the recording method to which the present practical mode may be applied, the values of $\alpha_i$ (i=1 to m) and $\beta_i$ (i=1 to m-1) are suitably set depending upon the values of recording pulse sections $\alpha_i T$ (i=1 to m), off-pulse sections $\beta_i T$ (i=1 to m-1), etc., and they are respectively larger than 0, preferably at least 0.1, more preferably at least 0.5 and on the other hand, preferably at most 3, more preferably at most 2. Especially, with respect to $\alpha_i$ (i=1 to m), if the recording pulse section $\alpha_i T$ is long, heat tends to be accumulated in the molten region, whereby quenching to form an amorphous mark tends to be hindered. Accordingly, its upper limit is preferably set to be at most 2. On the other hand, with respect to $\beta_i$ (i=1 to m-1), in order to secure the cooling effect sufficiently, it is preferably set to be at least 1.

The effect of enlarging the off-pulse section is particularly remarkable at the first off-pulse section $\beta_1 T$ which presents a large influence to the shape of the front end of the mark and at the last off-pulse section $\beta_m T$ which presents a large influence to the shape of the rear end of the mark.

In the present practical mode, the power $Pw_i$ of the recording laser beam to be applied to the recording pulse sections $\alpha_i T$ (i=1 to m) and the power $Pb_i$ of the recording laser beam to be applied to the off-pulse sections $\beta_i T$ (i=1 to m-1) are set to be $Pb_i<Pw_i$ and $Pb_i<Pw_{i+1}$. However, irrespective of i and n, in one recording pulse section or off-pulse section, Pw or Pb is preferably set to have a constant value. In order to obtain a large cooling effect, it is preferred that with respect to the time lengths of all record marks, Pw and Pb are set to be $0 \leq Pb<Pw$, more preferably $0 \leq Pb/Pw \leq 0.2$, more preferably $0 \leq Pb/Pw \leq 0.1$. Further, the bias power Pb may be set to be equal to the power Pr of the laser beam applied for retrieving. As a result, the design of the divided pulse circuit required for pulse division will be simplified.

Parameters $\alpha_i$ (i=1 to m) and $\beta_i$ (i=1 to m-1) relating to the pulse widths can preferably be specified at a high resolving power of at least $\frac{1}{16}T$. More preferably, they can be specified at a laser beam resolving power of at least $\frac{1}{20}T$, more preferably at least $\frac{1}{32}T$. At a low resolving power of less than $\frac{1}{8}T$, there may be a case where parameter values relating to optimum pulse widths capable of good recording, may not be found.

In such a case, with respect to the time length of a specific one record mark, different two or more values may be employed as $Pb_i$ and/or $Pw_i$ depending upon i. For example, the writing powers $Pw_1$ and $Pw_m$ at the front recording pulse section $\alpha_1 T$ and last recording pulse section $\alpha_m T$ may be set to have values different from the writing power $Pw_i$ (i=2 to m-1) at the intermediate recording pulse sections $\alpha_i T$ (i=2 to m-1), whereby it will be possible to accurately control the mark shapes at the front end and rear end portions of the mark. In such a case, the writing power $Pw_i$ at the intermediate recording pulse sections $\alpha_i T$ (i=2 to m-1) is preferably set to have all the same power value, whereby setting of the divided pulse circuit will be simplified. Also with respect to the bias power $Pb_i$ at the off-pulse sections $\beta_i T$ (i=1 to m-1), it is likewise preferred to have the same power value for all i, and only the bias power $Pb_m$ at $\beta_m T$ is preferably made to have a value different from other Pb complementarily. Further, in order to satisfactorily record marks having plural mark lengths with m being 1, among at least two record marks having different n, $Pw_i$ and/or $Pb_i$ may have different values for the same i. Even in such a case, Pb is preferably set to be constant.

The bias power Pb is preferably set to have the same value as the retrieving power Pr of the retrieving laser beam required for retrieving. For CD-RW, it usually has a value of at most 2 mW, preferably at most 1.5 mW, more preferably at most 1 mW, further preferably at most 0.5 mW. So long as there will be no trouble for focusing or tracking servo, it is preferably set to be as close as possible to 0, whereby the quenching effect of the recording layer will be enhanced at the Pb irradiation sections (off-pulse sections). Further, the values of Pw, Pe and Pb are not necessarily required to be constant in a direct current fashion. For example, the operation may be stabilized by applying a laser by superimposing a high frequency, for example, with a period of at most about $\frac{1}{10}$ of the clock period T. In such a case, Pw, Pe and Pb will be average values thereof.

In the present practical mode, it is primarily possible to realize accurate control of mark lengths and low jitter solely by control of time parameters (relating to pulse widths) i.e. $T_{top} = \alpha_1 T$, $dT_{top}$, $\beta_1 T$, $T_{last} = \alpha_m T$, $dT_{last}$ and $\beta_m T = T_{c1}$. Therefore, only when there is some restriction to setting of the above time parameters, it is preferred to finely adjust $Pw_1$, $Pw_m$ or $Pb_m$ independently for simplification of the circuit. Such a restriction may specifically be a case where the resolving power to set the parameter values relating to pulse widths, is so rough that good recording can not be done solely by pulse width setting.

More specifically, with respect to $\alpha_i T$ and $\beta_i T$, it is desirable that the set values may be optimized by every time unit finer than $\frac{1}{8}T$, preferably $\frac{1}{10}T$. However, from the nature of the electronic circuit, usually, from 0.01 to 0.2 nsec is the setting limit in many cases. For example, in a case where 0.2 nsec is the limit, if the reference clock period is shorter than 2 nsec i.e. ten times the limit, the recording quality (such as jitter) may sometimes be inadequate solely by the control of the time widths of the recording pulses or cooing pulses. In such a case, it may sometimes be effective to stepwise change the writing power intensity or the cooling power intensity in the period of $\alpha_1 T$, $\alpha_m T$ or $\beta_m T$ complementarily within the period of the above $\alpha_1 T$, $\alpha_m T$ or $\beta_m T$ or to adjust it to have a value different from the writing power intensity or cooling power intensity at other $\alpha_i T$ or $\beta_i T$.

With the "3T strategy" in the optical recording method to which the present practical mode may be applied, it is preferred to maintain the periodicity of the dividing number m to n. Namely, as the case of maintaining "the periodicity of the dividing number m to n", a case where m is increased by 1 every time when n is increased by 3, and a case where m is increased by 1 when n is increased by 4, are conceivable. They will hereinafter be referred to as "n/3 strategy" and "n/4 strategy", respectively. Here, if the same designation method is employed, "1T strategy" in FIG. 1(b) and "2T strategy" in FIG. 1(c), with attention drawn to the repeating period of recording pulses, may be referred to as "n/1 strategy" and "n/2 strategy", respectively.

In the following, with respect to the "n/3 strategy" and "n/4 strategy", specific methods will be described by paying attention to the periodicity. However, in the following, when n=2, 3 or 4, and in some cases, when n=5, such a periodical increase or decrease of the dividing number or the rule for the periodical changes of parameters ($\alpha_i$, $\beta_i$, $dT_{top}$ and $dT_{last}$) in FIG. 5, may not be followed in many cases.

When n=5, m may take either 1 or 2. Thus, only when m=1, n/m=5, and when m=2, n/m=2.5. Namely, when n is at least 5, the minimum value of n/m may take 2.5. However when n is at least 6, n/m is preferably made to be about 3. Specifically, it is made to have a value within a range of $2.5 < n/m \leq 4.5$. Further, when the reference clock period is less than about 2 nsec, setting m=1, and when the reference clock period is more than that, there may be a case where m=2 is preferred. In a case where a 5T mark (n=5) is to be formed with m=2, in order to accurately form the difference in mark length from other record mark lengths with m=2, it is also effective to set the value of Pw or Pb to be a value different from other mark lengths with m=2.

Further, when n=2, 3 or 4, m is set to be 1. If such a short mark (2T mark, 3T mark or 4T mark) is divided into two or more recording pulses for recording, it becomes difficult to make the width of the recording pulse sections or the cooling pulse sections larger than 2T on average. Accordingly, if the reference clock period is shortened as intended by the optical recording method to which the present practical mode may be applied, either the time length of the recording sections or the time length of the cooling sections, tends to be inadequate.

When the dividing number m is 1, $\alpha_1$ and $\beta_1$ will serve concurrently as $\alpha_m$ and $\beta_m$, respectively. Accordingly, as values different from other n, it is necessary to adjust the mark length, the jitter at the front end of the mark and the jitter of the rear end solely by $\alpha_1$ and $\beta_1$. When n=2, 3 and 4, different mark lengths are, respectively, formed by adjusting mainly $\alpha_1$ and $\beta_1$ as parameters for pulse widths, but especially with respect to these mark lengths, it is more effective to form the different mark lengths respectively by complementarily employing $Pw_1$ or $Pb_1$ which is different from the writing power Pw or bias power Pb for other mark lengths.

Now, as a specific example of "n/3 strategy", recording pulse division method (II) will be described below.

Recording Pulse Division Method (II):

A recording method may be mentioned wherein m=1 for mark lengths with n=2, 3 and 4, m=2 for mark lengths with n=5, 6 and 7, m=3 for mark lengths with n=8, 9 and 10, m=4 for mark lengths with n=11, 12 and 13, and m=5 for mark lengths with n=14, 15 and 16. Namely, in the "n/3 strategy", the same dividing number m applies to each set of three different mark lengths. The values of n/m calculated for n=2 to 16 as divided for every three n with the same m, will be sequentially (2, 3, 4), (2.5, 3, 3.5), (2.67, 3, 3.3), (2.75, 3, 3.25) and (2.8, 3, 3.2). Also when n is 17 or more, likewise, m=L for a set of n=3L−1, 3L and 3L+1 (where L is a natural number).

In such a case, the average value of n/m in all mark lengths becomes just 3. Further, the average value of n/m in cases where m is at least 2, becomes just 3. Further, in mark lengths with n being at least 5 (m being at least 2) individual n/m also becomes at least 2.5, whereby $\alpha_i + \beta_i$ can be made to be also at least 2.5. Further, also in mark lengths with n=5, 8, 11 and 14 where n/m is less than 3, n/m can be made larger than about 2.7 except for the case of n=5 (m=2). Thus, the repeating period for $\alpha_i T$ can be made to have a value close to about 3.

Further, the following recording pulse division method (III) may be mentioned as a method wherein the periodicity for every 3 relating to n, is applied only to n=6 or more, whereby n/m can be made to be at least 3 with respect to all n being 6 or more, and $\alpha_i + \beta_i$ can be certainly be made to be at least 3.

Recording Pulse Division Method (III):

A recording method may be mentioned wherein m=1 for mark lengths with n=2, 3 and 4, m=2 for mark lengths with n=5, 6, 7 and 8, m=3 for mark lengths with n=9, 10 and 11, m=4 for mark lengths with n=12, 13 and 14, and m=5 for mark lengths with n=15, 16 and 17. For n being 6 or more, the same dividing number m applies to each set of three different mark lengths. The values of n/m calculated for n=2 to 17 as divided for each set with the same m, will be sequentially (2, 3, 4), (2.5, 3, 3.5, 4), (3, 3.3, 3.67), (3, 3.3, 3.67), and (3, 3.3, 3.67). Also when n=18 or more, likewise, m=L for a set of n=3L, 3L+1 and 3L+2 (where L is a natural number).

The merit of (III) over the "n/3 strategy" (II) is that $α_i+β_i$ can be made to be at least 3 for n being 6 or more, and, as described hereinafter, the number of independent parameters can be reduced, and it is easy to synchronize the rising and falling of the recording pulses with the reference clock.

On the other hand, as a specific example of "n/4 strategy", recording pulse division method (IV) may be mentioned.

Recording Pulse Division Method (IV):

A recording method may be mentioned wherein m=1 for mark lengths with n=2, 3 and 4, m=2 for mark lengths with n=5, 6, 7 and 8, m=3 for mark lengths with n=9, 10, 11 and 12, and m=4 for mark lengths with n=13, 14, 15 and 16. Namely, in the "n/4 strategy", the same dividing number m applies to each set of four different mark lengths, except for the case of n=2, 3 and 4. The values of n/m calculated for n=2 to 16 as divided for each set with the same m, will be sequentially (2, 3, 4), (2.5, 2, 3.5, 4), (3, 3.3, 3.67, 4) and (3.25, 3.5, 3.75, 4). Also when n is 17 or more, likewise, m=L for a set of n=4L−3, 4L−2, 4L−1 and 4L.

The merit of "n/4 strategy" over the "n/3 strategy" is that except for the case of n=2 or 5, with respect to all n, n/m can be made to be at least 3, and individual $α_i+β_i$ can be made to be 3 or 4, whereby $α_iT$ and $β_iT$ can certain be made to be values larger than 1T. Further, $α_iT$ and $β_iT$ can be made to be values larger than about 1.5T, whereby the method can be applied even to a case where the reference clock frequency is higher (the reference clock period is shorter).

In the following, each recording pulse division method will be described with reference to a more specific preferred mode with a view to reducing the number of independent parameters and to synchronizing the rising and falling of the recording pulses to the reference clock. The following description is further directed to a method applicable to the theoretical circuit shown in FIG. 3 wherein divided recording pulses are generated as divided into three portions i.e. the front recording pulse $α_iT=T_{top}$, a group of intermediate recording pulses $α_iT=αcT=T_{mp}$ (2≦i≦m−1, αc being a constant value irrespective of such i) and the rear end recording pulse $α_mT=T_{last}$.

Figure 4:
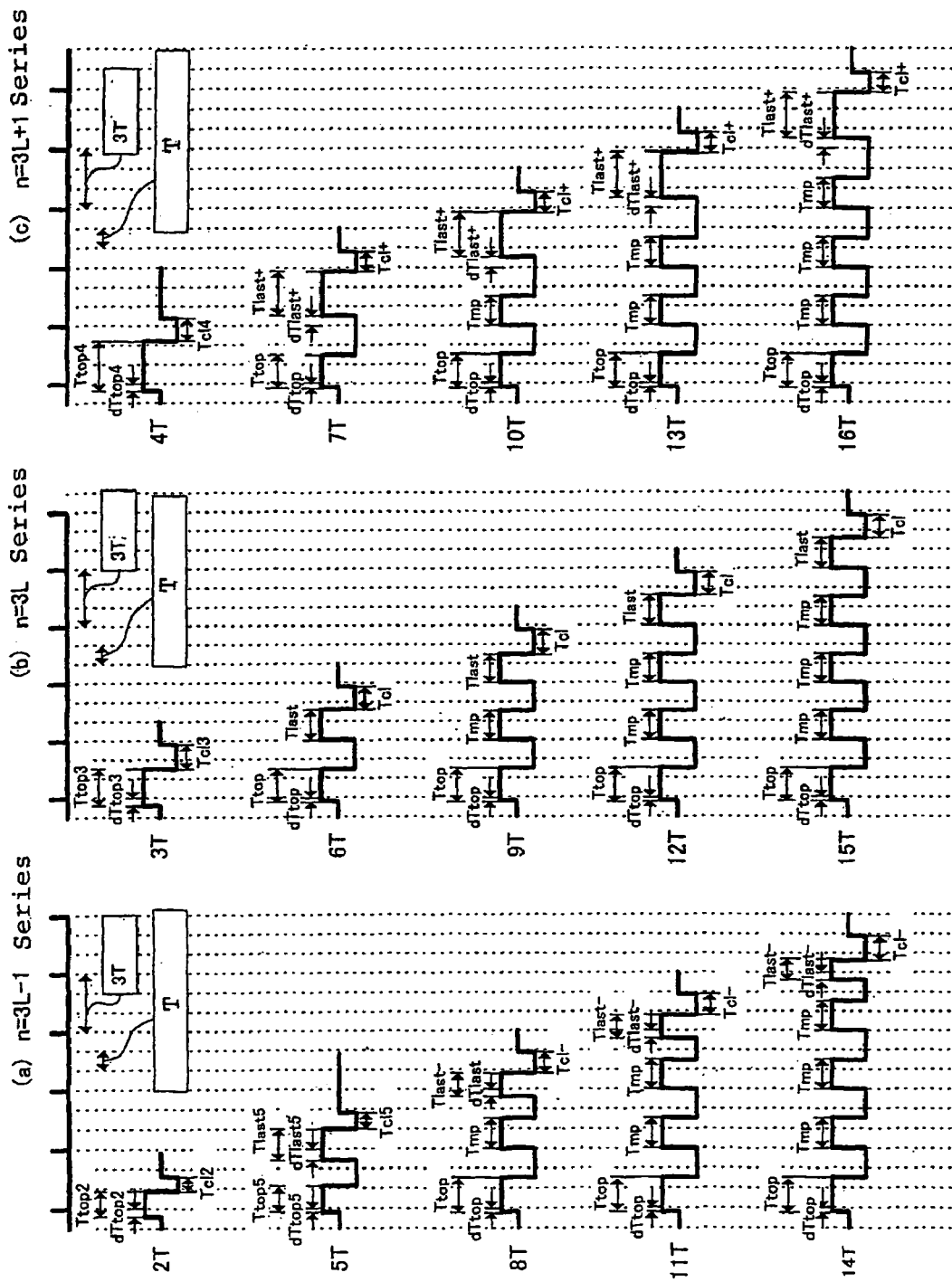
FIG. 4 is views illustrating specific examples of timing charts wherein recording pulse division method (IIa) is applied to mark lengths with n=2 to 16.

FIG. 4 shows a specific example of timing charts, wherein the recording pulse division method (II) is applied to mark lengths with n=2 to 16. And, the rising or falling position of each recording pulse is synchronized with the reference clock as far as possible. At the same time, the respective parameters at plural mark lengths are changed regularly as far as possible taking the periodicity relating to n into consideration. In FIG. 4, especially when m is 2 or more, three mark lengths with n=3L−1 (FIG. 4(a)), n=3L (FIG. 4(b)) and n=3L+1 (FIG. 4(c)) (where L being an integer of L≧2) are taken as one set, and m is increased or decreased by 1 when L is increased or decreased by 1. And, on the basis of the optical recording method (recording pulse division method) to be used for forming a record mark length with n=3L, a mark length difference of ±1T is realized in principle by means of constant parameters irrespective of L. Specifically, three record mark lengths with n=3L−1, n=3L and n=3L+1 to be formed by the same dividing number m=L (L≧2), are taken as one set, and on the basis of an optical recording method (recording pulse division method) to be used for forming the record mark length with n=3L, at least $α_m$ is decreased or increased to form the record mark length with n=3L−1 or n=3L+1, respectively. And, for each of the n=3L series, the n=3L−1 series and the n=3L+1 series, independent parameters not depending on L are determined. In this way, the number of independent parameters can be reduced to a large extent. This specific example will be hereinafter referred to as recording pulse division method (IIa).

Figure 5:
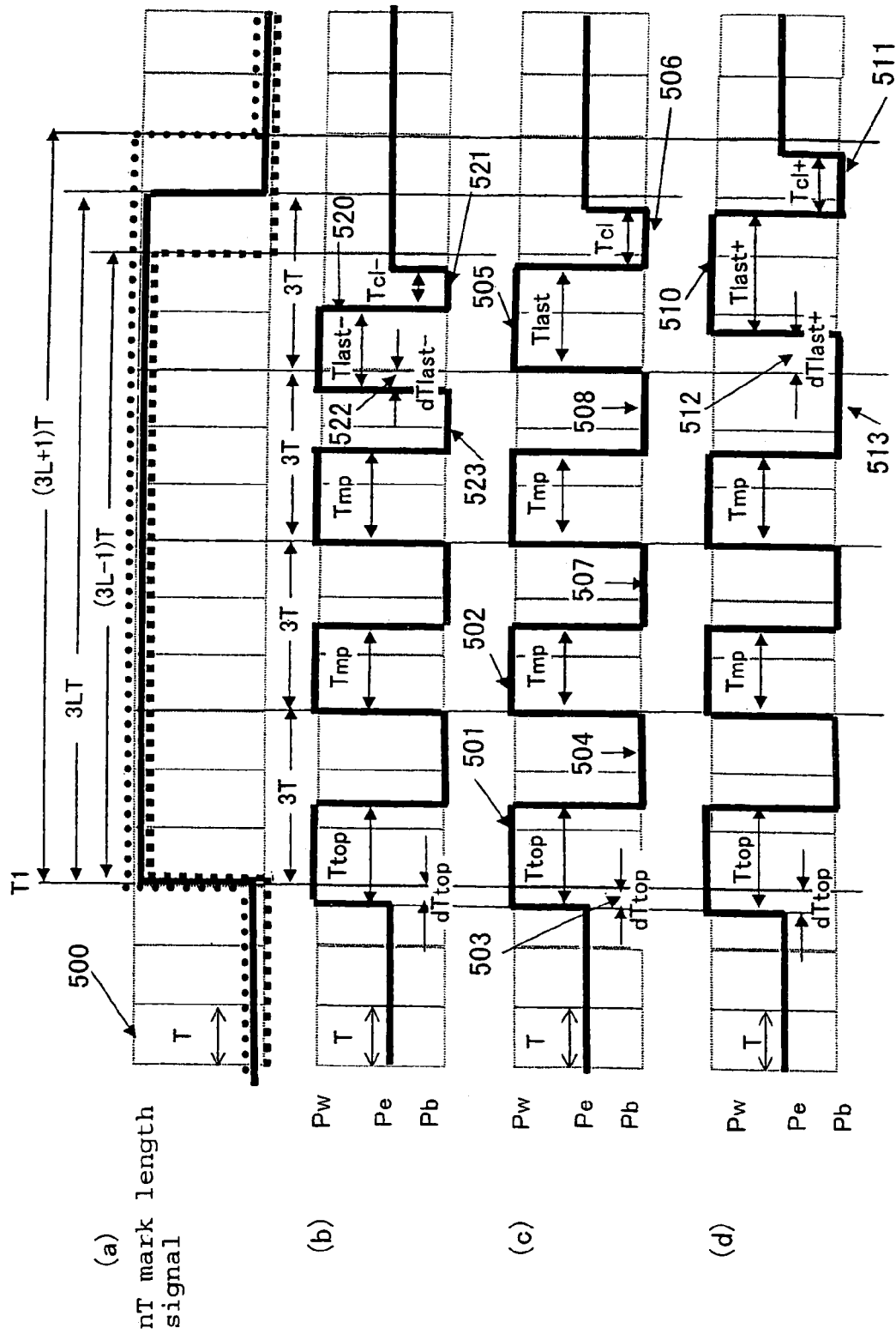
FIG. 5 is views illustrating the periodic parameter changes wherein three mark lengths with n=3L-1, n=3L and n=3L+1 are taken as one set, in a case where L=4 in FIG. 4.

FIG. 5 shows a specific example of a case where L=4. it will be described in detail by paying attention to the periodic change of parameters in FIG. 4 wherein three mark lengths with n=3L−1, n=3L and n=3L+1 (L being an integer of L≧2) are taken as one set.

Firstly, the recording pulse width is basically of a constant value i.e. $T_{mp}=αcT$. And, as a rule, recording pulses are generated as synchronized with the reference clock period T with a period of 3T. And, every time when n is increased by 3 (every time when the mark length is increased by 3T, or every time when L is increased by 1), one set of an intermediate recording pulse with a time length of $T_{mp}$ and the subsequent off-pulse, will be added with a period of 3T. As shown in FIG. 5(a), the reference clock period T is represented by one box section 500, and the nT mark has its front position at time T1 which is one point synchronized with the reference clock.

And as shown in FIG. 5(c), when n=3L, $T_{top}=α_1T$ (501) will be generated with a time deviation of $dT_{top}$ (503) from T1. In this Fig., $dT_{top}$ is of a positive value when the deviation is a delay from T1. $dT_{top}$ defines a deviation time in synchronization from the front position (T1) of the nT mark at the front position of $T_{top}$ and is utilized for accurate adjustment of the front position of the mark. Usually, the front recording pulse has no residual heat from the preceding recording pulse. Accordingly, it is preferred to set $T_{top}≧T_{mp}$, so that the heating effect equivalent to the heating in the subsequent $T_{mp}$ section can be obtained. In such a case, $β_1T$ (504) will be determined by $β_1T=3T−(T_{top}+dT_{top})$ and is not an independent parameter.

After $T_{top}$, recording pulses will be generated with a period of 3T as synchronized with the reference clock in the order of m-2 pieces of $T_{mp}$ (502) and $T_{last}=α_mT$ (505), and finally, an off-pulse of $T_{c1}=β_mT$ (506) will be generated. Thus, an off-pulse section $β_iT$ (2≦i≦m−2) will be 3T−$T_{mp}$= (3−αc)T=βcT (507). Further, $β_{m-1}T$ (508) is again determined by $β_{m-1}T=3T−T_{mp}$ and is not an independent parameter. $T_{mp}$ will be generated repeatedly as synchronized with the reference clock period every 3T period, as mentioned above. Of course, when n=5, 6 or 7, no intermediate recording pulse section $T_{mp}$ will be formed. Further, it is possible to add a deviation of $dT_{last}$ at the starting point of $T_{last}$, as the case requires. However, it is preferred to set $dT_{last}=0$.

On the other hand, as shown in FIG. 5(d), in the case of n=3L+1, again, $T_{top}=α_1T$ will be generated with a time deviation of $dT_{top}$ from T1. Further, after $T_{top}$, recording pulses will be generated in the order of m−2 pieces of $T_{mp}$ and $T_{last}$, and finally, $T_{c1}$ will be generated. Here, $T_{last}$ and $T_{c1}$ are independent parameters which may take values $T_{last+}$ (510) and $T_{c1+}$ (511) different from the case of n=3L. Further, $T_{last+}$ (510) may have the synchronization deviated from the reference clock by adding a correction value $dT_{last+}$ (512). By $T_{last+}$, $T_{c1+}$ and $dT_{last+}$, a mark length longer by 1T than the case of n=3L, will be formed. Usually, it is preferred that $T_{last+} \geq T_{last}$ and $0 < (T_{last+} - T_{last}) \leq T$. Further, $\beta_{m-1}$ (513) is determined by $\beta_{m-1}T = 3T - T_{mp} + dT_{last+}$ and thus is not an independent parameter. Namely, adjustment by $dT_{last+}$ means that adjustment of $\beta_{m-1}T$ is carried out.

As shown in FIG. 5(b), when n=3L−1, again, $T_{top} = \alpha_1 T$ will be generated with a time deviation of $dT_{top}$ from T1. Further, after $T_{top}$, recording pulses will be formed in the order of m−2 pieces of $T_{mp}$ and $T_{last}$, and finally, $T_{c1-}$ will be generated. Here, $T_{last}$ and $T_{c1}$ are independent parameters which can take values $T_{last-}$ (520) and $T_{c1-}$ (521) different from the case of n=3L. Further, $T_{last}$ (520) may be able to have synchronization deviated from the reference clock by adding a correction value $dT_{last-}$ (522). By $T_{last-}$, $T_{c1-}$ and $dT_{last-}$, a mark length shorter by 1T than the case of n=3L will be formed. Usually, it is preferred that $T_{last} \geq T_{last-}$, and $0 < (T_{last} - T_{last-}) \leq T$. Further, $\beta_{m-1}T$ (523) is determined by $\beta_{m-1}T = 3T - T_{mp} + dT_{last-}$, and thus is not an independent parameter. Namely, adjustment of $dT_{last-}$ means that adjustment of $\beta_{m-1}T$ is carried out.

However, n=5 is desired to have a degree of freedom to determine $dT_{top}$, $T_{top}$, $T_{last}$, $dT_{last}$ and $T_{c1}$ different from other cases of n=3L−1. Therefore, in order to make it clear that they are independent parameters, in FIG. 4, they are identified by $dT_{top5}$, $T_{top5}$, $T_{last5}$, $dT_{last5}$ and $T_{c15}$, respectively. With the 5T mark length, n/m=2.5, whereby as is different from other mark lengths with n=3L−1, the repeating period of recording pulses will be small at about 2.5T. Therefore, with the 5T mark length, it will be sometimes difficult to realize low jitter and accurate mark length by the same parameters as for other mark length with n=3L−1.

When n=2, 3 or 4, m=1. Therefore, by a pair of a recording pulse section $T_{top}$ and an off-pulse section $\beta_1 T = T_{c1}$, mark lengths with n=2, 3 and 4 will be, respectively, formed, and at the same time, low mark end jitter will be realized. Each case is defined by three parameters of $dT_{top}$, $T_{top}$ and $T_{c1}$. And, the respective parameters are to be set independently of $dT_{top}$, $T_{top}$ and $T_{c1}$ in other mark lengths. Namely, as shown in FIG. 4, the 2T mark length is formed by $dT_{top2}$, $T_{top2}$ and $T_{c12}$; the 3T mark length is formed by $dT_{top3}$, $T_{top3}$ and $T_{c13}$; and the 4T mark length is formed by $dT_{top4}$, $T_{top4}$ and $T_{c14}$; to provide the different mark lengths.

In summary of the forgoing, the number of independent parameters in the recording pulse division method (IIa) defined in FIG. 4 is nine parameters totaling three each at n=2, 3 and 4 ($dT_{top2}$, $T_{top2}$, $T_{c12}$, $dT_{top3}$, $T_{top3}$, $T_{c13}$, $dT_{top4}$, $T_{top4}$, $T_{c14}$), five parameters at n=5 ($dT_{top5}$, $T_{top5}$, $T_{last5}$, $dT_{last5}$, $T_{c15}$) and eleven parameters at n=6 or more ($dT_{top}$, $T_{top}$, $T_{mp}$, $T_{last}$, $T_{c1}$, $T_{last+}$, $T_{c1+}$, $dT_{last+}$, $T_{last-}$, $T_{c1-}$, $dT_{last-}$). The number of parameters is 9+5+11=25 in total. Further, usually, either one of $dT_{last+}$ and $T_{c1+}$ may be $dT_{last+}=0$ or $T_{c1+}=T_{c1}$, whereby the number of independent parameters may be reduced by one. Likewise, either one of $dT_{last-}$ and $T_{c1-}$ may be $dT_{last-}=0$ or $T_{c1-}=T_{c1}$, whereby the number of independent parameters may be reduced by one. Namely, independent parameters at n=6 or more may be made to be nine parameters ($dT_{top}$, $T_{top}$, $T_{mp}$, $T_{last}$, $T_{c1}$, $T_{last+}$, $dT_{last+}$, $T_{last-}$, $dT_{last-}$), or nine parameters ($dT_{top}$, $T_{top}$, $T_{mp}$, $T_{last}$, $T_{c1}$, $T_{last+}$, $T_{c1+}$, $T_{last-}$, $T_{c1-}$).

It is preferred that some or all of five parameters at n=5 ($dT_{top5}$, $T_{top5}$, $T_{last5}$, $dT_{last5}$, $T_{c15}$) are the same as the parameters at n=3L−1 in the case of n=6 or more ($dT_{top}$, $T_{top}$, $T_{last-}$, $dT_{last-}$, $T_{c1}$), whereby the number of independent parameters can further be reduced.

The merit of the recording pulse division method (IIa) is that by adjustment of the rear end recording pulse section $\alpha_m T = T_{last}$ and the preceding or subsequent section ($\beta_{m-1}T$, $\beta_m T = T_{c1}$), three mark lengths with n=3L−1, 3L and 3L+1 may, respectively, be formed. Here, adjustment of $\beta_{m-1}T$ is carried out via adjustment of $dT_{last}$. And, eleven parameters at n=6 or more ($dT_{top}$, $T_{top}$, $T_{mp}$ $T_{last}$, $T_{c1}$, $T_{last+}$, $T_{c1+}$, $dT_{last+}$, $T_{last-}$) $T_{c1-}$ $dT_{last-}$) being constant irrespective of L, means that except for the case of n=5, in three record mark lengths with n=3L−1, 3L and 3L+1 (L≧2), the respective ($\alpha_m$, $\beta_{m-1}$, $\beta_m$) values are constant irrespective of L. Further, if five parameters at n=5 ($dT_{top5}$, $T_{top5}$, $T_{last5}$, $dT_{last5}$, $T_{c15}$) are the same as the parameters in the case of n=3L−1 in the case of L≧3, in all cases of L≧2, the respective ($\alpha_m$, $\beta_{m-1}$, $\beta_m$) values in the three record mark lengths with n=3L−1, 3L and 3L+1 (L≧2), will be constant irrespective of L.

Figure 22:
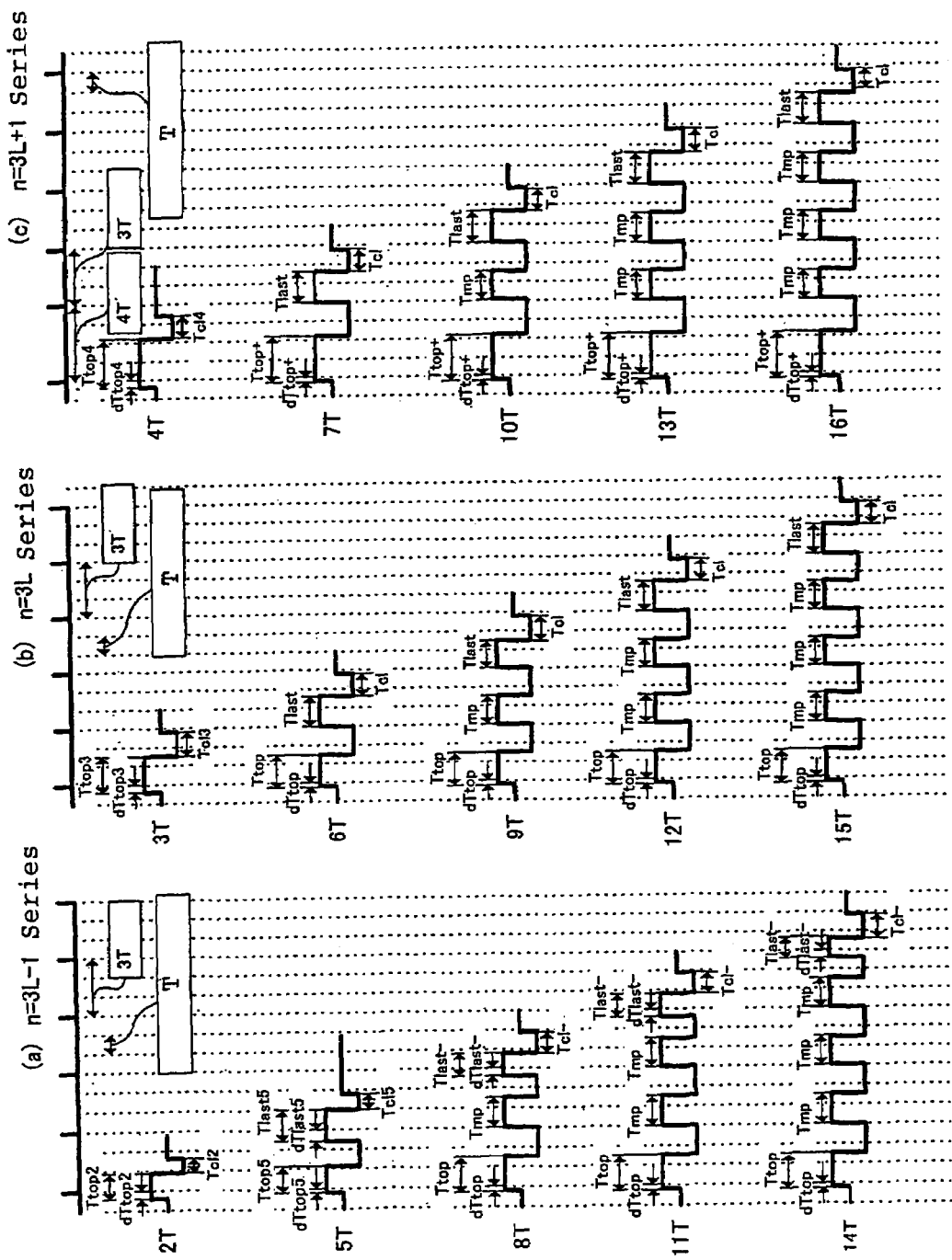
FIG. 22 is views illustrating specific examples of timing charts wherein recording pulse division method (IIb) is applied to mark lengths with n=2 to 16.

FIG. 22 is another example of the recording pulse division method (II). In FIG. 22, especially when m is 2 or more, three mark lengths with n=3L−1, 3L and 3L+1 (L being an integer of L≧2) are taken as one set, and it is so designed that if L is increased or decreased by 1, m is increased or decreased by 1. And, on the basis of the optical recording method to be used for forming a record mark length with n=3L, a mark length difference of ±1T is, in principle, realized by means of constant parameters irrespective of L. Specifically, three record mark lengths with n=3L−1, 3L and 3L+1 to be formed by the same dividing number m=L (L≧2) are taken as one set; and on the basis of an optical recording method to be used for forming the record mark length with n=3L, at least $\alpha_m$ is decreased in such an optical recording method to form the record mark length with n=3L−1, and further, on the basis of an optical recording method to be used for forming the record mark length with n=3L, at least $\alpha_1$ is increased in such an optical recording method to form the record mark length with n=3L+1. And, in each of the n=3L series, the n=3L−1 series and the n=3L+1 series, independent parameters not depending on L are determined. In this way, the number of independent parameters can be reduced to a large extent. This specific example will hereinafter be referred to as recording pulse division method (IIb).

Figure 23:
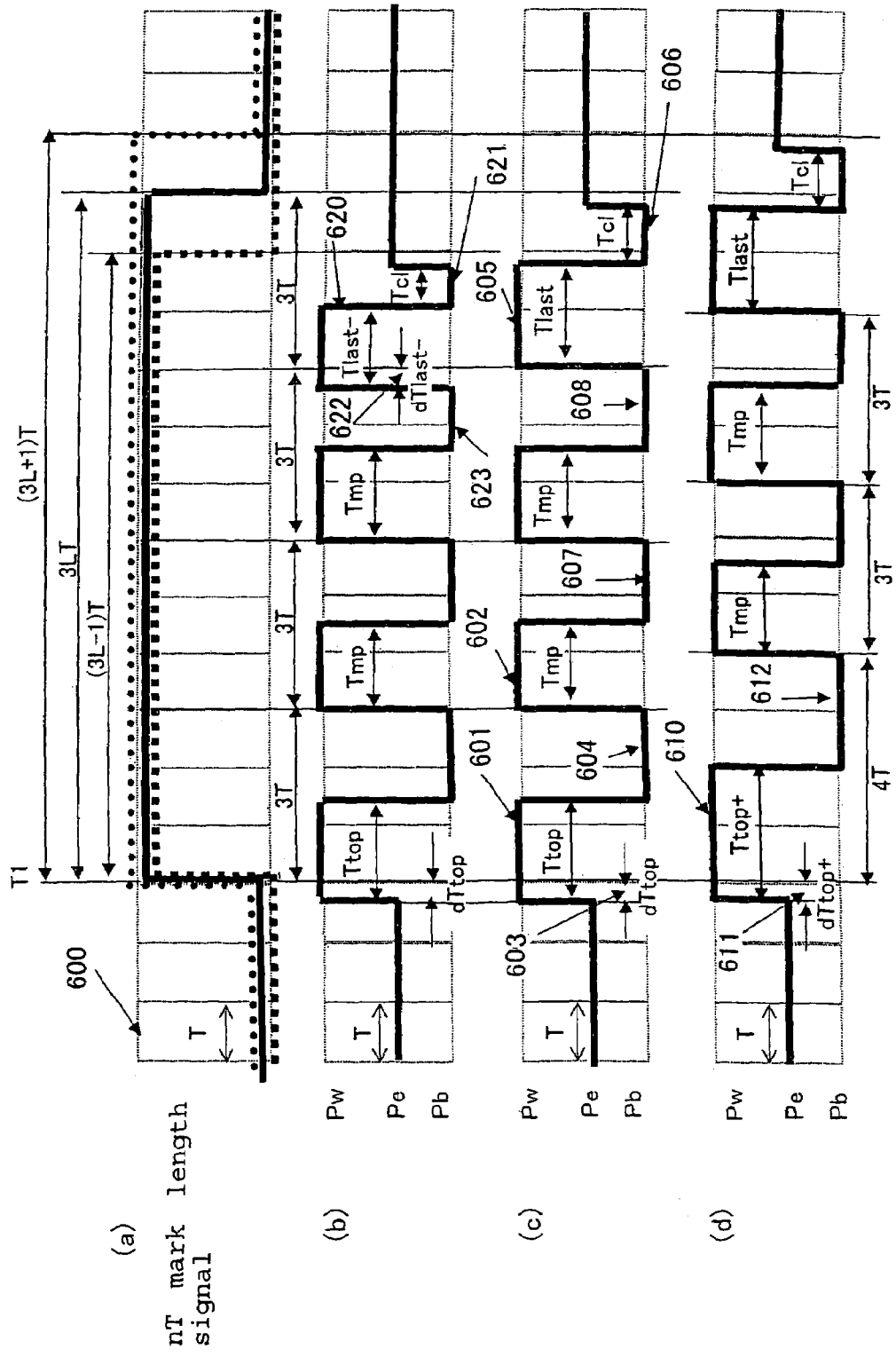
FIG. 23 is views illustrating periodic parameter changes wherein three mark lengths with n=3L−1, n=3L and 3=3L+1 are taken as one set, in a case where L=4 in FIG. 22.

With reference to FIG. 23 showing an example of the case of L=4, a detailed description will be made by paying attention particularly to the periodic parameter changes wherein three mark lengths with n=3L−1, 3L and 3L+1 (L being an integer of ≧2) in FIG. 22 are taken as one set.

Firstly, the recording pulse width basically has a constant value of $T_{mp} = \alpha cT$. And, as a rule, recording pulses will be generated as synchronized with the reference clock period T with a period of 3T. And every time when n is increased by 3 (every time when the mark length is increased by 3T, every time when L is increased by 1), one set of an intermediate recording pulse with a time length of $T_{mp}$ and the subsequent off-pulse, will be added with a period of 3T. The reference clock period T is represented by one box section 600 in FIG. 23(a), and the nT mark has, at its forefront, time T1 as one point synchronized with the reference clock.

And, when n=3L (FIG. 23(c)), $T_{top} = \alpha_1 T$ (601) will be generated with a time deviation of $dT_{top}$ (603) from T1. In this Fig., $dT_{top}$ has a positive value when the deviation is a delay from T1. $dT_{top}$ defines a deviation time in synchronization from the front position (T1) of the nT mark at the front position of $T_{top}$ and is used for accurate adjustment of the front end position of the mark. Usually, the front recording pulse has no residual heat from the preceding recording pulse, whereby it is preferred to set $T_{top} \geq T_{mp}$, so that a heating effect equal to the heating in the subsequent $T_{mp}$ section can be obtained. In this case, $\beta_1 T$ (604) is determined by $\beta_1 T=3T-(T_{top}+dT_{top})$ and thus is not an independent parameter.

After $T_{top}$, recording pulses will be generated with a period of 3T, as synchronized with the reference clock in the order of m-2 pieces of $T_{mp}$ (602) and $T_{last}=\alpha_m T$ (605) and finally an off-pulse of $T_{c1}=\beta_m T$ (606) will be generated. Thus, the off-pulse sections $\beta_i T$ ($2 \leq i \leq m-2$) will be $3T-T_{mp}=(3-\alpha_c)T=\beta cT$ (607). Further, in such a case, also $\beta_{m-1}T$ (608) is determined by $\beta_{m-1}T=3T-T_{mp}$, and thus is not an independent parameter. Further, it is possible to optionally add a deviation of $dT_{last}$ at the starting point of $T_{last}$, but it is preferred that $dT_{last}=0$.

As mentioned above, $T_{mp}$ will be repeatedly generated with a period of 3T as synchronized with the reference clock period. Of course, when n=5, 6 or 7, no intermediate recording pulse section $T_{mp}$ will be generated.

On the other hand, when n=3L+1 (FIG. 23(*d*)), again, $T_{top}=\alpha_1 T$ will be generated with a time deviation of $dT_{top}$ from T1, but $T_{top}$ and $dT_{top}$ may take the values $T_{top+}$ (610) and $dT_{top+}$ (611) different from the case of n=3L.

Further, after $T_{top+}$, recording pulses will be generated in the order of m-2 pieces of $T_{mp}$ and $T_{last}$, and finally $T_{c1}$ will be generated. Mainly by adjusting $T_{top}$ to have a value $T_{top+}$ different from n=3L and correcting it with $dT_{top+}$, a mark length longer by 1T than n=3L will be formed. At that time, $\alpha_2 T$ will rise with a period of 4T from T1. Usually, it is preferred to set $T_{top+}>T_{top}$, and $0<(T_{top+}-T_{top}) \leq T$. Accordingly, $\beta_1 T$ (612) is determined by $\beta_1 T=4T-(T_{top+}+dT_{top+})$ and thus is not an independent parameter. Namely, adjustment of $dT_{top+}$ and $T_{top+}$ means that adjustment of $\beta_1 T$ is carried out.

In a case where $T_{top}$ is increased or decreased in such a manner, by increasing or decreasing the period from T1 to the rising of $\alpha_2 T$ by 1T, generation of the subsequent recording pulses can be maintained to be synchronized with the reference clock period with a deviation of 1T. Further, in a case where $T_{top}$ is to be decreased, the time from T1 to the rising of $\alpha_2 T$ will be 2T, whereby adequate cooling time $\beta_1 T$ can not be maintained. Therefore, in a case where a mark length difference of 1T is to be imparted by changing $T_{top}$, it is preferred to increase it by 1T.

When n=3L-1 (FIG. 23(*b*)), again, $T_{top}=\alpha_1 T$ is generated with a time deviation of $dT_{top}$ from T1. Further, after $T_{top}$, recording pulses will be generated in the order of m-2 pieces of $T_{mp}$ and $T_{last}$, and finally $T_{c1}$ will be generated. Here, $T_{last}$ and $T_{c1}$ are independent parameters which may take the values $T_{last-}$ (620) and $T_{c1-}$ (621), respectively, which are different from the case of n=3L. Further, $T_{last-}$ (620) may have the synchronization deviated from the reference clock by adding a correction value $dT_{last-}$ (622). By $T_{last-}$, $T_{c1-}$ and $dT_{last-}$, a mark length shorter by 1T than the case of n=3L, is formed. Usually, it is preferred to set $T_{last} \geq T_{last-}$ and $0<(T_{last-} T_{last-}) \leq T$. Further, $\beta_{m-1}T$ (623) is determined by $\beta_{m-1}T=3T-T_{mp}+dT_{last}$ and thus is not an independent parameter. Namely, adjustment of $dT_{last-}$ means that adjustment of $\beta_{m-1}T$ is carried out.

However, n=5 preferably has a degree of freedom to determine $dT_{top}$, $T_{top}$, $T_{last}$, $dT_{last}$ and $T_{c1}$ which are, respectively, different from other cases of n=3L-1. Therefore, in order to make it clear that they are respectively independent parameters, in FIG. 22, they are identified by $dT_{top5}$, $T_{top5}$, $T_{last5}$, $dT_{last5}$ and $T_{c15}$, respectively. With the 5T mark length, n/m=2.5, and as is different from other mark lengths with n=3L-1, the repeating period of the recording pulses will be small at about 2.5T. Therefore, with the 5T mark length, there may be a case where it is difficult to realize low jitter and an accurate mark length by the same parameters as for other mark lengths with n=3L-1.

When n=2, 3 or 4, m=1. Therefore, by a pair of a recording pulse section $T_{top}$ and an off-pulse section $\beta_1 T=T_{c1}$, mark lengths with n=2, 3 and 4 are respectively formed, and at the same time low mark end jitter is realized. Each case is defined by three parameters of $dT_{top}$, $T_{top}$ and $T_{c1}$. And, the respective parameters are to be set independently of $dT_{top}$, $T_{top}$ and $T_{c1}$ in any other mark lengths. Namely, as shown in FIG. 4, the 2T mark length is formed by $dT_{top2}$, $T_{top2}$ and $T_{c12}$, the 3T mark length is formed by $dT_{top3}$, $T_{top3}$ and $T_{c13}$, and the 4T mark length is formed by $dT_{top4}$, $T_{top4}$ and $T_{c14}$, to provide different mark lengths, respectively.

In summary of the foregoing, the number of independent parameters in the recording pulse division method (IIb) defined in FIG. 22 is nine parameters totaling three each at n=2, 3 and 4 ($dT_{top2}$, $T_{top2}$, $T_{c12}$, $dT_{top3}$, $T_{top3}$, $T_{c13}$, $dT_{top4}$, $T_{top4}$, $T_{c14}$), five parameters at n=4 ($dT_{top5}$, $T_{top5}$, $T_{last5}$, $dT_{last5}$, $T_{c15}$) and ten parameters at n=6 or more ($dT_{top}$, $T_{top}$, $T_{last}$, $T_{c1}$, $dT_{top+}$, $T_{top+}$, $T_{last-}$, $T_{c1-}$, $dT_{last-}$). Namely, the number of parameters is 9+5+10=24 in total.

Further, at the time of forming a mark length with n=3L-1 by m=2 or more, it is possible to set $dT_{last-}$ to be 0 or $T_{c1-}=T_{c1}$. Namely, either $dT_{last}$ or $T_{c1}$ at n=3L-1 is made to have a value different from the case of n=3L, whereby good results can be obtained in many cases. In such a case, independent parameters at n=6 or more may be made to be nine ($dT_{top}$, $T_{top}$, $T_{mp}$, $T_{last}$, $T_{c1}$, $dT_{top+}$, $T_{top+}$, $T_{last-}$, $T_{c1-}$) or nine ($dT_{top}$, $T_{top}$, $T_{mp}$, $T_{last}$, $T_{c1}$, $dT_{top+}$, $dT_{top+}$, $dT_{last-}$, $T_{last-}$).

It is preferred that five parameters at n=5 ($dT_{top5}$, $T_{top5}$, $T_{last5}$, $dT_{last5}$, $T_{c15}$) are the same as some or all of independent parameters at n=3L-1 (L$\geq$3) ($dT_{top}$, $T_{top}$, $T_{last-}$, $dT_{last-}$, $T_{c1-}$), whereby the number of independent parameters can further be reduced.

The merit of the recording pulse division method (IIb) resides in that three record mark lengths with n=3L-1, 3L and 3L+1 at the same dividing number m=L (L$\geq$2) are taken as one set, and on the basis of an optical recording method to be used for forming the record mark length with n=3L, the record mark length with n=3L-1 is formed by adjusting the rear end recording pulse section $\alpha_m T=T_{last}$ and the preceding or subsequent section ($\beta_{m-1}T$, $\beta_m T=T_{c1}$).

Further, another merit of the recording pulse division method (IIb) resides in that three record mark lengths with n=3L-1, 3L and 3L+1 at the same dividing number m=L (L$\geq$2), are taken as one set, and on the basis of the optical recording method to be used for forming the record mark length with n=3L, the record mark length with n=3L+1 is formed by adjusting the front recording pulse section $\alpha_1 T=T_{top}$ and the subsequent section $\beta_1 T$ in the above optical recording method.

Further, adjustment of $\beta_{m-1}T$ is carried out via adjustment of $dT_{last}$, and adjustment of $\beta_1 T$ is carried out via adjustment of $T_{top}=\alpha_1 T$ and $dT_{top}$.

And, ten parameters at n=6 or more ($dT_{top}$, $T_{top}$, $T_{mp}$, $T_{last}$, $T_{c1}$, $dT_{top+}$, $T_{top+}$, $T_{last-}$, $T_{c1-}$, $dT_{last-}$) being constant irrespective of L, means that except for the case of n=5, in the three record mark lengths with n=3L-1, 3L and 3L+1 (L$\geq$2), the respective ($\alpha_1$, $dT_{top}$, $\beta_1$, $\alpha_m$, $\beta_{m-1}$, $\beta_m$) values are constant irrespective of L. Further, if five parameters at n=5 ($dT_{top5}$, $T_{top5}$, $T_{last5}$, $dT_{last5}$, $T_{c15}$) are the same as the parameters in the case of n=3L-1 when n=6 or more, in all cases of L$\geq$2, in three record mark lengths with n=3L-1, 3L and 3L+1 (L$\geq$2), the respective ($\alpha_1$, $dT_{top}$, $\beta_1$, $\alpha_m$, $\beta_{m-1}$, $\beta_m$) values are constant irrespective of L.

Further, in the recording pulse division method (IIa) or (IIb), it is possible to adjust the mark length with n=3L−1 by reducing $\alpha_1$ instead of reducing $\alpha_m$. However, there may be a case where by reducing $\alpha_1$, $\alpha_1+\beta_1$ becomes shorter than 3. In such a case, it is preferred to reduce $\alpha_m$.

Figure 6:
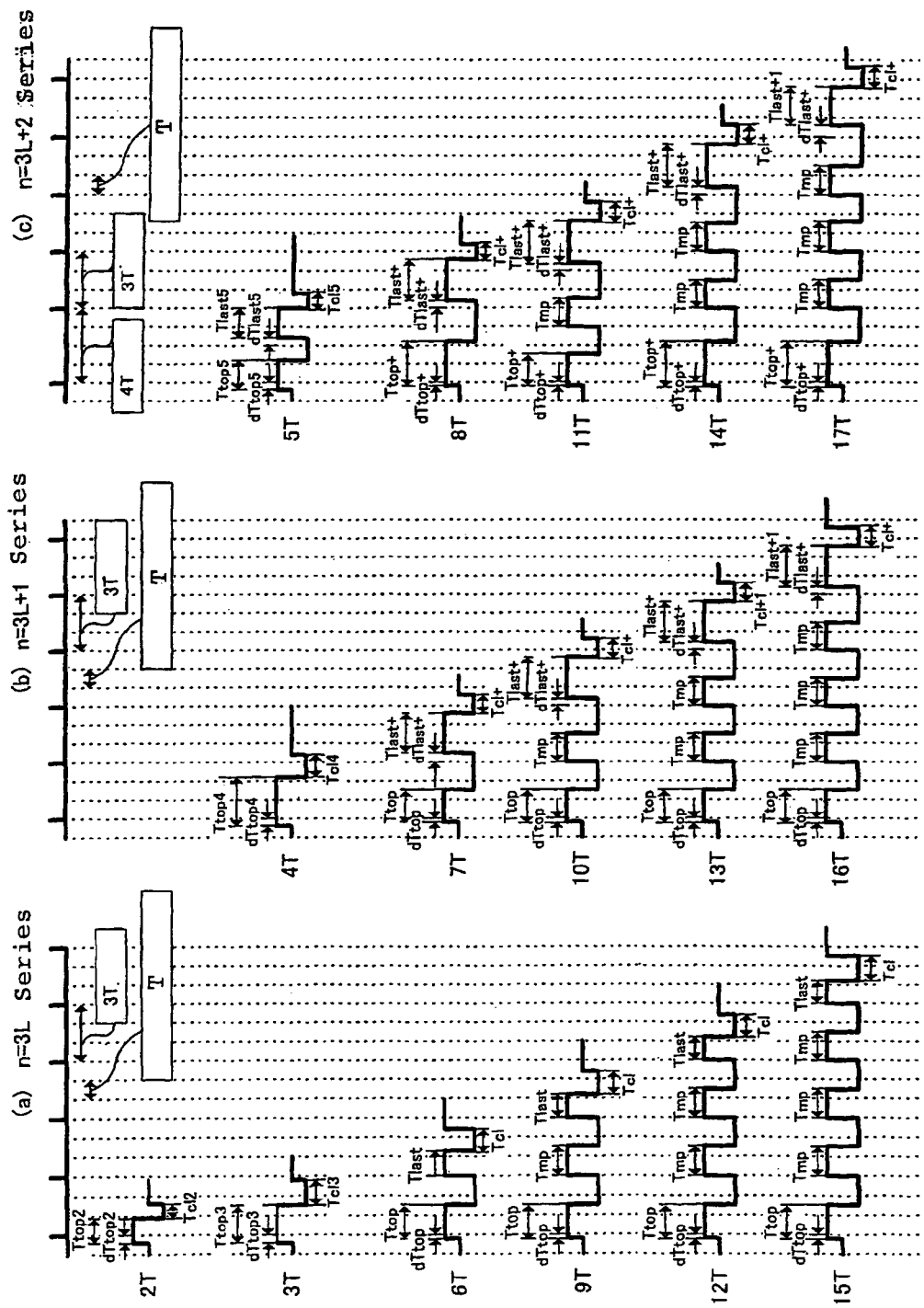
FIG. 6 is views illustrating specific examples wherein recording pulse division method (IIIa) is applied to mark lengths with n=2 to 17.

FIG. 6 is a specific example wherein the recording pulse division method (III) is applied to mark lengths with n=2 to 17. And, the rising or falling position of each recording pulse is synchronized with the reference clock as far as possible. At the same time, the respective parameters in plural mark lengths are changed as regularly as possible taking the periodicity relating to n into consideration. In the following, this specific example will be referred to as recording pulse division method (IIIa).

When n is 6 or more, three mark lengths with n=3L, n=3L+1 and n=3L+2 (L being an integer of L≧2) are taken as one set. And, on the basis of an optical recording method (recording pulse division method) to be used for forming the record mark length with n=3L, mark length differences of plus 1T and plus 2T are, in principle, realized by means of constant parameters irrespective of L. Specifically, three record mark lengths with n=3L, n=3L+1 and n=3L+2 to be formed by the same dividing number m=L (L≧2) are taken as one set, and on the basis of an optical recording method (recording pulse division method) to be used for forming the record mark length with n=3L, at least $\alpha_m$ is increased in such an optical recording method to form the record mark length with n=3L+1, and further, on the basis of an optical recording method (recording pulse division method) to be used for forming the record mark length with n=3L+1, at least $\alpha_1$ is increased in such an optical recording method to form the record mark length with n=3L+2. And, in each of the n=3L series, the n=3L+1 series, and the n=3L+2 series, independent parameters irrespective of L are determined. In this way, the number of independent parameters can be reduced to a large extent.

Figure 7:
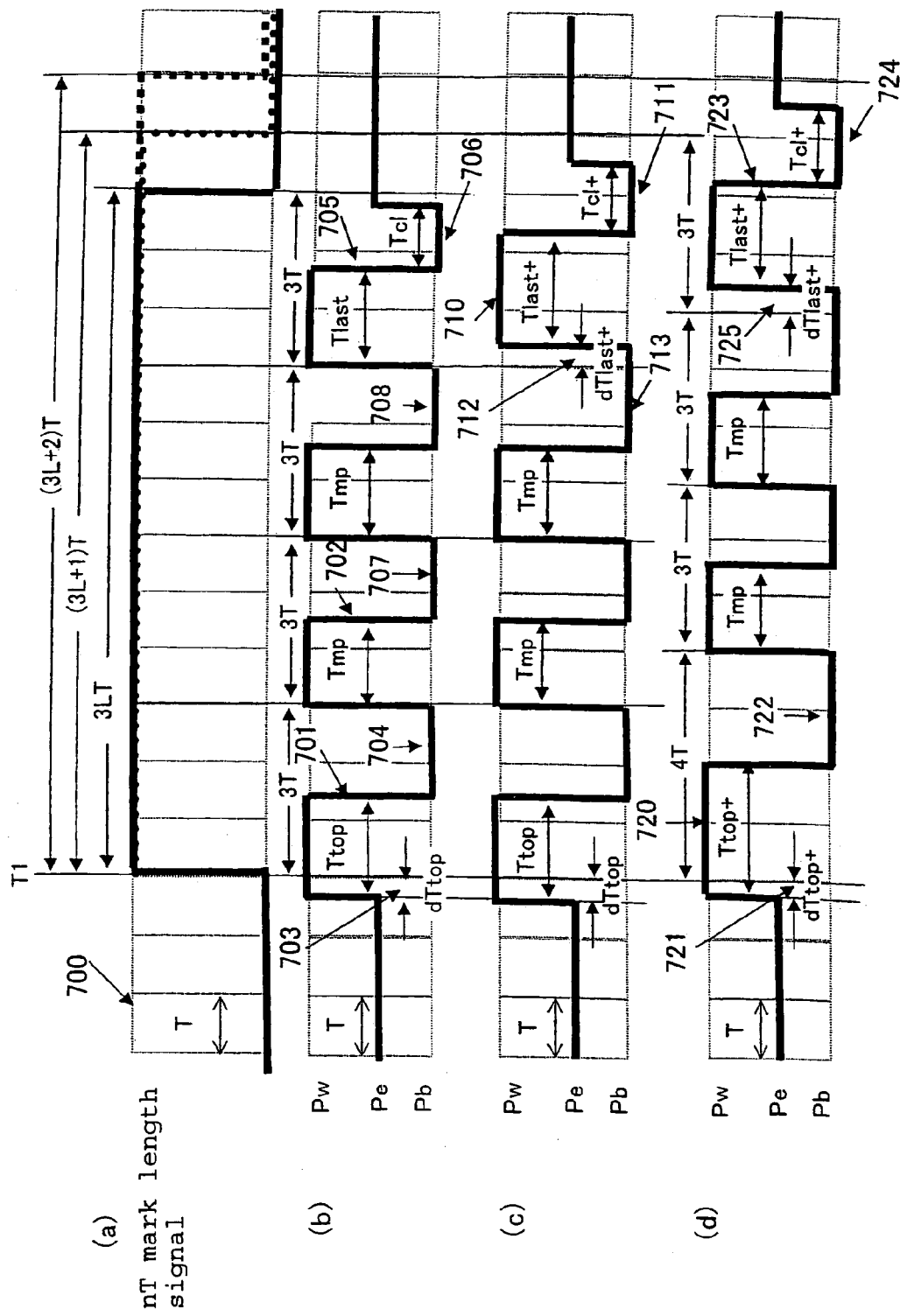
FIG. 7 is views illustrating periodical parameter changes wherein three mark lengths with n=3L, n=3L+1 and n=3L+2 are taken as one set, in a case where L=4 in FIG. 6.

FIG. 7 is an example where L=4. A detailed description will be made by paying attention to periodical parameter changes in FIG. 6 wherein three mark lengths with n=3L, n=3L+1 and n=3L+2 (L being an integer of L≧2) are taken as one set.

Firstly, the recording pulse width basically has a constant value of $T_{mp}=\alpha cT$. And, as a rule, the recording pulses will be generated as synchronized with the reference clock period T with a period of 3T. And, every time when n is increased by 3 (every time when the mark length is increased by 3T, every time when L is increased by 1), one set of an intermediate recording pulse with a time length of $T_{mp}$ and the subsequent off-pulse is added with a period of 3T. As shown in FIG. 7(a), the reference clock period T is represented by one box section 700, and the nT mark has, at its forward end, time T1 as one point synchronized with the reference clock.

And, as shown in FIG. 7(b), when n=3L, $T_{top}=\alpha_1T$ (701) will be generated with a time deviation of $dT_{top}$ (703) from T1. In this Fig., $dT_{top}$ has a positive value when the deviation is a delay from T1. $dT_{top}$ defines a deviated time in synchronization from the front position (T1) of the nT mark at the front position of $T_{top}$ and is used for accurate adjustment of the front end position of the mark. Usually, the front recording pulse has no residual heat from the preceding recording pulse, and it is preferred to set $T_{top}≧T_{mp}$, so that a heating effect equivalent to the heating in the subsequent $T_{mp}$ section will be obtained. In such a case, $\beta_1T$ (704) is determined by $\beta_1T=3T-(T_{top}+dT_{top})$ and thus is not an independent parameter.

After $T_{top}$, recording pulses will be generated with a period of 3T as synchronized with the reference clock in the order of m-2 pieces of $T_{mp}$ (702) and $T_{last}=\alpha_mT$ (705) and finally an off-pulse with $T_{c1}=\beta_mT$ (706) will be generated. Therefore, the off-pulse section $\beta_iT$ (2≦i≦m−2) will be $3T-T_{mp}=(3-\alpha c)T=\beta cT$ (707). Further, $\beta_{m-1}T$ (708) is again determined by $\beta_{m-1}T=3T-T_{mp}$ and thus is not an independent parameter. As mentioned above, $T_{mp}$ will be repeatedly generated with a period of 3T as synchronized with the reference clock period. Of course, when n=5, 6, 7 or 8, no intermediate recording pulse section $T_{mp}$ will be generated. Further, it is optionally possible to add a deviation of $dT_{last}$ at the starting point of $T_{last}$, but it is preferred to set $dT_{last}=0$.

On the other hand, as shown in FIG. 7(c), when n=3L+1, again, $T_{top}=\alpha_1T$ will be generated with a time deviation of $dT_{top}$ from T1. Further, after $T_{top}$, recording pulses will be generated in the order of m-2 pieces of $T_{mp}$ and $T_{last}$, and finally, $T_{c1}$ will be generated. Here, $T_{last}$ and $T_{c1}$ are independent parameters which may take values $T_{last+}$ (710) and $T_{c1+}$ (711), respectively, which are different from the case of n=3L. Further, the synchronization may be deviated from the reference clock by adding a correction value of $dT_{last+}$ (712). By $T_{last+}$, $T_{c1+}$ and $dT_{last+}$, a mark length longer by 1T than the case of n=3L will be formed. Usually, it is preferred to set $T_{last+}≧T_{last}$, so that $0<(T_{last+}-T_{last})≦T$. Further, $\beta_{m-1}T$ (713) is determined by $\beta_{m-1}T=3T-T_{mp}+dT_{last+}$ and thus is not an independent parameter. Namely, adjustment of $dT_{last}$+means that adjustment of $\beta_{m-1}T$ is carried out.

As shown in FIG. 7(d), when n=3L+2, again, $T_{top}=\alpha_1T$ will be generated with a time deviation of $dT_{top}$ from T1. However, $T_{top}$ and $dT_{top}$ may take values $T_{top+}$ (720) and $dT_{top+}$ (721), respectively, which are different from other cases of 3L and 3L+1. Further, after $T_{top+}$, recording pulses will be generated in the order of m-2 pieces of $T_{mp}$ and $T_{last}$, and finally, $T_{c1}$ will be generated. Here, $T_{last}$ and $T_{c1}$ may take the same values $T_{last+}$ (723), $T_{c1+}$(724) and correction value $dT_{last+}$ (725) as in the case of n=3L+1. Mainly by adjusting $T_{top}$ to have a value $T_{top+}$ different from n=3L+1 and correcting it with $dT_{top+}$, a mark length longer by 1T than n=3L+1 will be formed. At that time, $\alpha_2T$ will rise with a period of 4T from T1. usually, it is preferred to set $T_{top+}>T_{top}$, so that $0<(T_{top+}-T_{top})≦T$. Accordingly, $\beta_1T$ (722) is determined by $\beta_1T=4T-(T_{top+}+dT_{top+})$ and thus, is not an independent parameter. Namely, adjustment of $dT_{top+}$ and $T_{top+}$ means that adjustment of $\beta_1T$ is carried out.

In a case where $T_{top}$ is increased in this manner, by increasing or decreasing the period from T1 to the rising of $\alpha_2T$ by 1T, it is possible to maintain the synchronization of generation of the subsequent recording pulses with the reference clock period with a delay of 1T. Further, if $T_{top}$ is decreased, the time from T1 to the rising of $\alpha_2T$ will be 2T, whereby there will be a case where no adequate cooling time $\beta_1T$ can be maintained. Accordingly, in a case where a mark length difference of 1T is to be produced by changing $T_{top}$, it is preferred to increase it by 1T.

It is desirable that n=5 has a degree of freedom to determine $dT_{top}$, $T_{top}$, $T_{last}$, $dT_{last}$ and $T_{c1}$, respectively, which are different from other cases of n=3L+2. Therefore, in order to make it clear that they are respectively independent parameters, in FIG. 6, they are identified by $dT_{top5}$, $T_{top5}$, $T_{last5}$, $dT_{last5}$ and $T_{c15}$. With the 5T mark length, n/m=2.5, and as is different from other mark lengths with n=3L+2, the repeating period of recording pulses becomes small at about 2.5T. Therefore, with the 5T mark length, it may sometimes be difficult to realize low jitter and an accurate mark length by the same parameters as other mark lengths with n=3L+2.

When n=2, 3 or 4, m=1. Therefore, by means of a pair of a recording pulse section $T_{top}$ and an off-pulse section $\beta_1 T=T_{c1}$, mark lengths with n=2, 3 and 4 will, respectively, be formed, and at the same time, low mark end jitter will be realized. Each case will be defined by three parameters of $dT_{top}$, $T_{top}$ and $T_{c1}$. And, the respective parameters may be set independently of $dT_{top}$, $T_{top}$ and $T_{c1}$ in any other mark lengths. Namely, as shown in FIG. 6, the 2T mark length will be formed by $dT_{top2}$, $T_{top2}$ and $T_{c12}$, the 3T mark length will be formed by $dT_{top3}$, $T_{top3}$ and $T_{c13}$, and the 4T mark length will be formed by $dT_{top4}$, $T_{top4}$ and $T_{c14}$, to provide the different mark lengths, respectively.

In summary of the foregoing, the number of independent parameters in the recording pulse division method (IIIa) as defined in FIG. 6, is nine parameters totaling three each at n=2, 3 and 4 ($dT_{top2}$, $T_{top2}$, $T_{c12}$, $dT_{top3}$, $T_{top3}$, $T_{c13}$, $dT_{top4}$, $T_{top4}$, $T_{c14}$), five parameters at n=5 ($dT_{top5}$, $T_{top5}$, $T_{last5}$, $dT_{last5}$, $T_{c15}$) and ten parameters at n=6 or more ($dT_{top}$, $T_{top}$, $T_{mp}$, $T_{last}$, $T_{c1}$, $T_{last+}$, $dT_{last+}$, $T_{c1+}$, $dT_{top+}$, $T_{top+}$). Namely, the number of parameters is 9+5+10=24 in total.

Further, at the time of forming a mark length with n=3L+2 by m=2 or more, $T_{last+}$ and $T_{c1+}$ may have values $T_{last+2}$ and $T_{c1+2}$ which are different from the case of the mark length with n=3L+1. By separately setting $T_{last+2}$ and $T_{c1+2}$ as independent parameters, better jitter may sometimes be obtained. On the other hand, $dT_{last+}$ and $dT_{last+2}$ may be made to be 0, or $T_{c1+}=T_{c1}$, and $T_{c1+2}=T_{c1}$. Namely, either $dT_{last}$ or $T_{c1}$ at n=3L+1 or 3L+2, is made to have a value different from the case of n=3L, whereby good results may be obtained in many cases. In such a case, independent parameters at n=6 or more may be made to be nine ($dT_{top}$, $T_{top}$, $T_{mp}$, $T_{last}$, $T_{c1}$, $T_{last+}$, $T_{c1+}$, $dT_{top+}$, $T_{top+}$) or ($dT_{top}$, $T_{top}$, $T_{mp}$, $T_{last}$, $T_{c1}$, $T_{last+}$, $dT_{last+}$, $dT_{top+}$, $T_{top+}$).

It is preferred that five parameters at n=5 ($dT_{top5}$, $T_{top5}$, $T_{last5}$, $dT_{last5}$, $T_{c15}$) are the same as some or all of the independent parameters at n=3L+2 (L≧2) ($dT_{top+}$, $T_{top+}$, $T_{last+}$, $dT_{last+}$, $T_{c1+}$), whereby the number of independent parameters can further be reduced.

The merit of the recording pulse division method (IIIa) resides in that three record mark lengths with n=3L, 3L+1 and 3L+2 at the same dividing number m=L (L≧2), are taken as one set, and on the basis of an optical recording method to be used for forming a record mark length with n=3L, a record mark length with n=3L+1 is formed solely by adjusting the rear end recording pulse section $\alpha_m T=T_{last}$ and the preceding or subsequent section ($\beta_{m-1}T$, $\beta_m T=T_{c1}$) in such an optical recording method.

Another merit of the recording pulse division method (IIIa) resides in that three record mark lengths with n=3L, 3L+1 and 3L+2 at the same dividing number m=L (L≧2), are taken as one set, and on the basis of an optical recording method to be used for forming a record mark length with n=3L+1, a record mark length with n=3L+2 is formed by adjusting the front recording pulse section. $\alpha_1 T=T_{top}$ and the subsequent section $\beta_1 T$ in such an optical recording method.

Further, adjustment of $\beta_{m-1}T$ is carried out via adjustment of $dT_{last}$, and adjustment of $\beta_1 T$ is carried out by adjustment of $T_{top}=\alpha_1 T$ and $dT_{top}$.

And, ten parameters at n=6 or more ($dT_{top}$, $T_{top}$, $T_{mp}$, $T_{last}$, $T_{c1}$, $T_{last+}$, $dT_{last+}$, $T_{c1+}$, $dT_{top+}$, $T_{top+}$) being constant irrespective of L is nothing but in the three record mark lengths with n=3L, 3L+1 and 3L+2 (L≧2), the respective ($\alpha_1$, $dT_{top}$, $\beta_1$, $\alpha_m$, $\beta_{m-1}$, m) values are constant irrespective of L.

Figure 24:
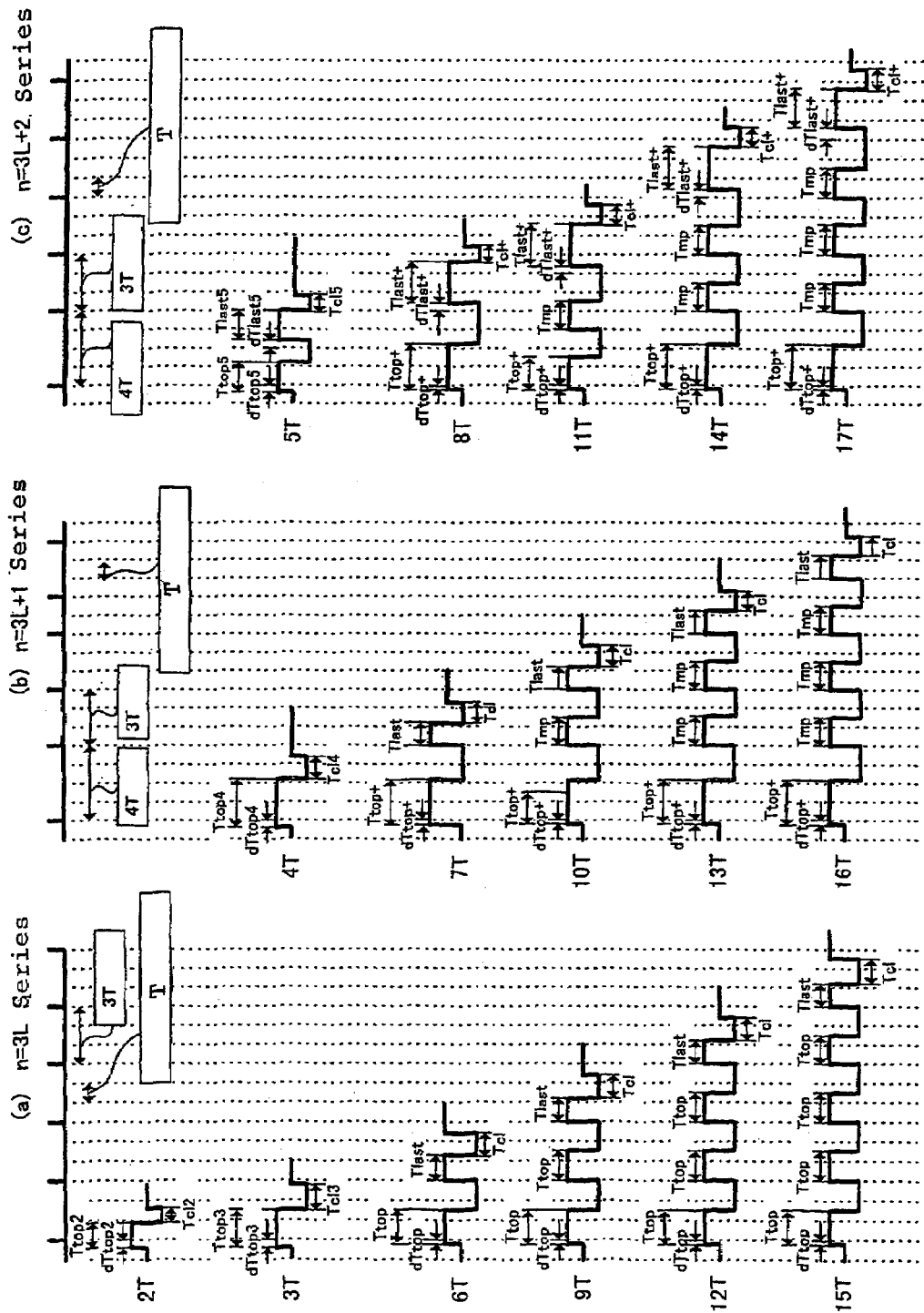
FIG. 24 is views illustrating specific examples wherein recording pulse division method (IIIb) is applied to mark lengths with n=2 to 17.

FIG. 24 shows another example of the recording pulse division method (III). In the following, this specific example will be referred to as recording pulse division method (IIIb).

When n=6 or more, three mark lengths with n=3L, 3L+1 and 3L+2 (L being an integer of L≧2) are taken as one set. And, on the basis of an optical recording method to be used for forming the record mark length with n=3L, mark length differences of plus 1T and plus 2T are realized, in principle, by means of constant parameters irrespective of L. Specifically, three record mark lengths with n=3L, 3L+1 and 3L+2 to be formed by the same dividing number m=L (L≧2) are taken as one set; and on the basis of an optical recording method to be used for forming the record mark length with n=3L, at least $\alpha_1$ is increased in such an optical recording method to form the record mark length with n=3L+1, and further, on the basis of an optical recording method to be used for forming the record mark length with n=3L+1, at least $\alpha_m$ is increased in such an optical recording method to form the record mark length with n=3L+2. And, in each of the n=3L series, the n=3L+1 series and the n=3L+2 series, independent parameters not depending on L will be determined. In this way, the number of independent parameters can be reduced to a large extent.

Figure 25:
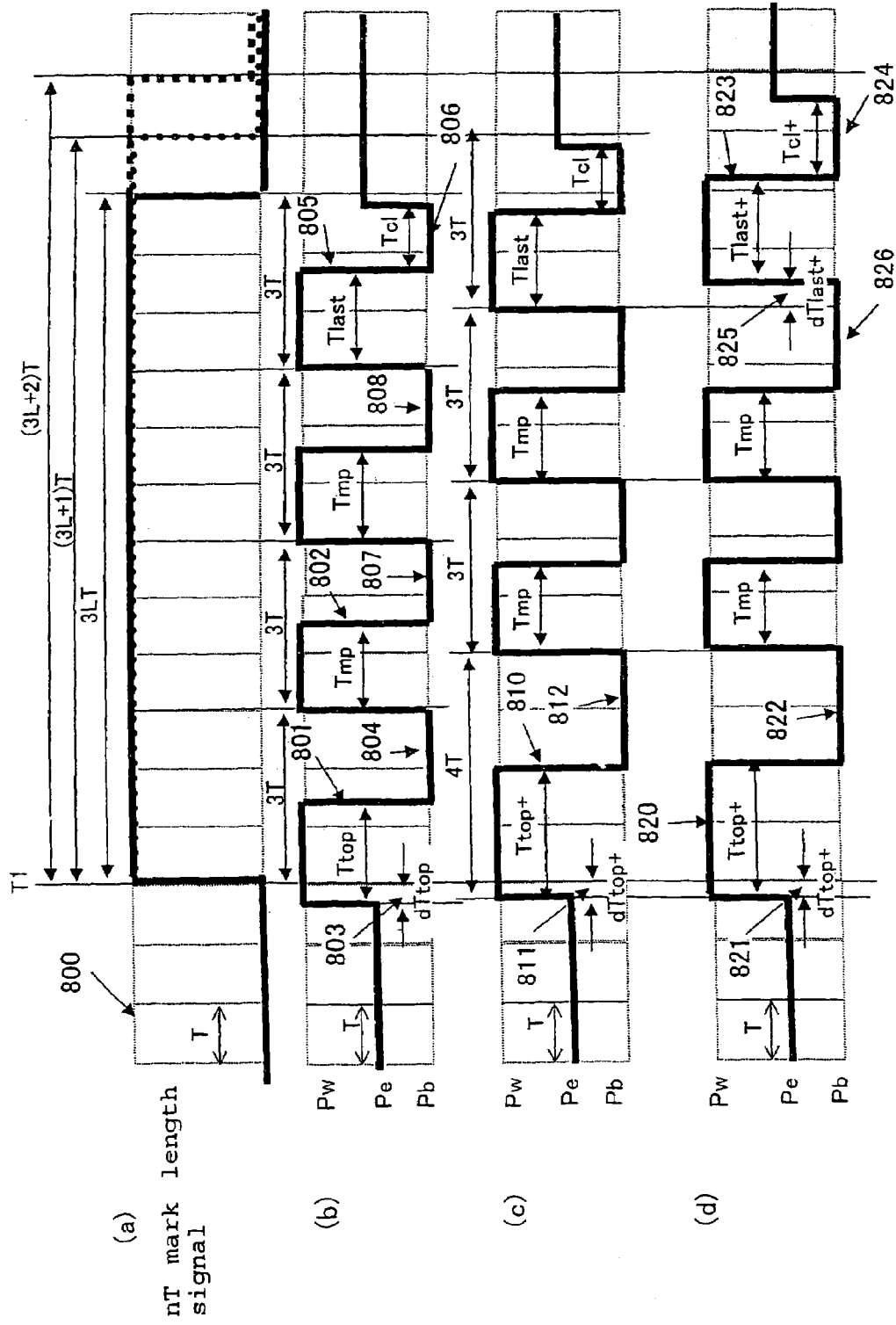
FIG. 25 is views illustrating periodic parameter changes wherein three mark lengths with n=3L, n=3L+1 and n=3L+2 are taken as one set, in a case where L=4 in FIG. 24.

Referring to FIG. 25 showing an example wherein L=4, a detailed description will be made by paying attention to periodic parameter changes in FIG. 24 wherein three mark lengths with n=3L, 3L+1 and 3L+2 (L being an integer of L≧2) are taken as one set.

Firstly, the recording pulse width basically has a constant value of $T_{mp}=\alpha cT$. And, as a rule, recording pulses will be generated with a period of 3T as synchronized with the reference clock period T. And, every time when n is increased by 3, (every time when the is mark length is increased by 3T, or every time when L is increased by 1), one set of an intermediate recording pulse of $T_{mp}$ and the subsequent off-pulse will be added with a period of 3T. The reference clock period T is represented by one box section 800 in FIG. 25(a), and the nT mark has, at its front, time T1 as one point synchronized with the reference clock.

And, when n=3L (FIG. 25(b)), $T_{top}=\alpha_1 T$ (801) will be generated with a time deviation of $dT_{top}$ (803) from T1.

In this Fig., $dT_{top}$ has a positive value when the deviation is a delay from T1. $dT_{top}$ defines a deviated time in synchronization from the front position (T1) of the nT mark at the front position of $T_{top}$ and is used for accurate adjustment of the front end position of the mark. Usually, the front recording pulse has no residual heat from the preceding recording pulse, and it is accordingly preferred to set $T_{top} \geqq T_{mp}$, so that a heating effect equivalent to the heating in the subsequent $T_{mp}$ section can be obtained. In such a case, $\beta_1$ (804) is determined by $\beta_1 T=3T-(T_{top}+dT_{top})$ and thus is not an independent parameter.

After $T_{top}$, recording pulses will be generated with a period of 3T as synchronized with the reference clock in the order of m-2 pieces of $T_{mp}$ (802) and $T_{last}=\alpha_m T$ (805), and finally, an off-pulse of $T_{c1}=\beta_m T$ (806) will be generated. Therefore, the off-pulse section $\beta_i T$ (2≦i≦m-2) will be $3T-T_{mp}=(3-\alpha c)T=\beta cT$ (807). Further, $\beta_{m-1}T$ (808) is also determined by $\beta_{m-1}T=3T-T_{mp}$ and thus is not an independent parameter. Further, it is optionally possible to add a deviation of $dT_{last}$ at the starting point of $T_{last}$, but it is preferred to set $dT_{last}=0$.

As mentioned above, $T_{mp}$ will be repeatedly generated every 3T period as synchronized with the reference clock period. Of course, when n=5, 6, 7 or 8, no intermediate recording pulse section $T_{mp}$ is generated.

On the other hand, when n=3L+1 (FIG. 25(c)), again, $T_{top}=\alpha_1 T$ will be generated with a time deviation of $dT_{top}$ from T1, but $T_{top}$ and $dT_{top}$ may take the values $T_{top+}$ (810) and $dT_{top+}$ (811) which are different from other cases of 3L.

Further, after $T_{top+}$, recording pulses will be generated in the order of m-2 pieces of $T_{mp}$ and $T_{last}$, and finally, $T_{c1}$ will be generated. A mark length longer by 1T than n=3L will be formed mainly by adjusting $T_{top}$ to have a value $T_{top+}$ different from n=3L and correcting it with $dT_{top+}$. At that time, $\alpha_2 T$ will rise with a period of 4T from T1. Usually, it is preferred to set $T_{top+} > T_{top}$, so that $0 < (T_{top+} - T_{top}) \leq T$. Accordingly, $\beta_1 T$ (812) is determined by $\beta_1 T = 4T - (T_{top+} + dT_{top+})$ and thus is not an independent parameter. Namely, adjustment of $dT_{top+}$ and $T_{top+}$ means that adjustment of $\beta_1 T$ is carried out.

When n=3L+1 (FIG. 25(*d*)), again, $T_{top} = \alpha_1 T$ will be generated with a time deviation of $dT_{top}$ from T1, but $T_{top}$ and $dT_{top}$ will take the same value $T_{top+}$ (820) and $dT_{top+}$ (821) as in the case of n=3L+1. At that time, $\alpha_2 T = T_{mp}$ will rise with a period of 4T from T1. Accordingly, $\beta_1 T$ (822) is determined by $\beta_1 T = 4T - (T_{top+} + dT_{top+})$ and thus is not an independent parameter. Namely, adjustment of $T_{top+}$ and $dT_{top+}$ means that adjustment of $\beta_1 T$ is carried out.

After m-2 pieces of $T_{mp}$ including $\alpha_2 T$ are generated, a recording pulse of $T_{last}$ will be generated, and finally, a cooling pulse of $T_{c1}$ will be generated. Here, $T_{last}$ and $T_{c1}$ may take values $T_{last+}$ (823) and $T_{c1+}$ (824) which are different from the case of n=3L+1. Further, the synchronization may be deviated from the reference clock by adding a correction value $dT_{last+}$ (825). By $T_{last+}$, $T_{c1+}$ and $dT_{last+}$, a mark length longer by 1T than the case of n=3L+1 will be formed. Usually, it is preferred to set $T_{last+} > T_{last}$, so that $0 < (T_{last+} - T_{last}) \leq T$. Further, $\beta_{m-1} T$ (826) is determined by $\beta_{m-1} T = 3T - T_{mp} + dT_{last+}$ and thus is not an independent parameter. Namely, adjustment of $dT_{last+}$ means that adjustment of $\beta_{m-1} T$ is carried out.

It is desirable that n=5 has a degree of freedom to determine $dT_{top}$, $T_{top}$, $T_{last}$, $dT_{last}$ and $T_{c1}$ which are different from other cases of n=3L+2. Accordingly, in order to make it clear that they are independent parameters, in FIG. 24, they will be identified by $dT_{top5}$, $T_{top5}$, $T_{last5}$, $dT_{last5}$ and $T_{c15}$. With the 5T mark length, n/m=2.5, and as is different from mark lengths with other n=3L+2, the repeating period of the recording pulses will be small at a level of 2.5T. Therefore, with the 5T mark, it may sometimes be difficult to realize low jitter and an accurate mark length with the same parameters as other mark lengths with n=3L+2.

When n=2, 3 or 4, m=1. Therefore, by means of a pair of a recording pulse section $T_{top}$ and an off-pulse section $\beta_1 T = T_{c1}$, mark lengths with n=2, 3 and 4 will, respectively, be formed and at the same time, low mark end jitter will be realized. Each case will be defined by three parameters of $dT_{top}$, $T_{top}$ and $T_{c1}$. And, the respective parameters are to be set independently of $dT_{top}$, $T_{top}$ and $T_{c1}$ in any other mark lengths. Namely, as shown in FIG. 24, the 2T mark length will be formed by $dT_{top2}$, $T_{top2}$ and $T_{c12}$, the 3T mark length will be formed by $dT_{top3}$, $T_{top3}$ and $T_{c13}$, and the 4T mark length will be formed by $dT_{top4}$, $T_{top4}$ and $T_{c14}$, to provide different mark lengths respectively.

In summary of the foregoing, the number of independent parameters in the recording pulse division method (IIIb) as defined in FIG. 24, is nine parameters totaling three each at n=2, 3 and 4 ($dT_{top2}$, $T_{top2}$, $T_{c12}$, $dT_{top3}$, $T_{top3}$, $T_{c13}$, $dT_{top4}$, $T_{top4}$, $T_{c14}$), five parameters at n=5 ($dT_{top5}$, $T_{top5}$, $T_{last5}$, $dT_{last5}$, $T_{c15}$) and ten parameters at n=6 or more ($dT_{top}$, $T_{top}$, $T_{mp}$, $T_{last}$, $T_{c1}$, $dT_{top+}$, $T_{top+}$, $T_{last+}$, $dT_{last+}$, $T_{c1+}$). Namely, the number of parameters is 9+5+10=24 in total.

Further, at the time of forming a mark length with n=3L+2 by m=2 or more, $T_{top+}$ and $dT_{top+}$ may be made to have values $T_{top+\ 2}$ and $dT_{top+\ 2}$ which are different from the case of the mark length with n=3L+1. By separately setting $T_{top+\ 2}$ and $dT_{top+\ 2}$ as independent parameters, there may be a case where better jitter can be obtained. On the other hand, it is also possible to set $dT_{last+}$ to be 0 or $T_{c1+} = T_{c1}$. Namely, either $dT_{last}$ or $T_{c1}$ at 3L+2 is made to have a value different from the cases of n=3L and 3L+1, whereby good results may be obtained in many cases. In such a case, independent parameters at n=6 or more may be made to be nine ($dT_{top}$, $T_{top}$, $T_{mp}$, $T_{last}$, $T_{c1}$, $dT_{top+}$, $T_{top+}$, $T_{last+}$, $T_{c1+}$) or nine ($dT_{top}$, $T_{top}$, $T_{mp}$, $T_{last}$, $T_{c1}$, $dT_{top+}$, $T_{top+}$, $dT_{last+}$, $T_{last+}$).

It is preferred that five parameters at n=5 ($dT_{top5}$, $T_{top5}$, $T_{last5}$, $dT_{last5}$, $T_{c15}$) are the same as some or all of the independent parameters at n=3L+2 (L≧3) ($dT_{top+}$, $T_{top+}$, $T_{last+}$, $dT_{last+}$, $T_{c1+}$), whereby the number of independent parameters can further be reduced.

The merit of the recording pulse division method (IIIb) resides in that three record mark lengths with n=3L, 3L+1 and 3L+2 at the same dividing number m=L (L≧2) are taken as one set, and on the basis of an optical recording method to be used for forming the record mark length with n=3L, a record mark length with n=3L+1 is formed by adjusting the front recording pulse section $\alpha_1 T = T_{top}$ and the subsequent section $\beta_1 T$ in such an optical recording method.

Another merit of the recording pulse division method (IIIb) resides in that three record mark lengths with n=3L, 3L+1 and 3L+2 at the same dividing number m=L (L≧2) are taken as one set, and on the basis of an optical recording method to be used for forming the record mark length with n=3L+1, a record mark length with n=3L+2 is formed by adjusting the rear end record pulse section $\alpha_m T = T_{last}$ and the preceding or subsequent section ($\beta_{m-1} T$, $\beta_m T = T_{c1}$).

Further, adjustment of $\beta_{m-1} T$ is carried out via adjustment of $dT_{last}$, and adjustment $\beta_1 T$ is carried out via adjustment of $T_{top} = \alpha_1 T$ and $dT_{top}$.

And, ten parameters at n=6 or more ($dT_{top}$, $T_{top}$, $T_{mp}$, $T_{last}$, $T_{c1}$, $T_{last+}$, $dT_{last+}$, $T_{c1+}$, $dT_{top+}$, $T_{top+}$) being constant irrespective of L means that in three record mark lengths with n=3L, 3L+1 and 3L+2 (L≧2), the respective ($\alpha_1$, $dT_{top}$, $\beta_1$, $\alpha_m$, $\beta_{m-1}$, $\beta_m$) values are constant irrespective of L.

Figure 8:
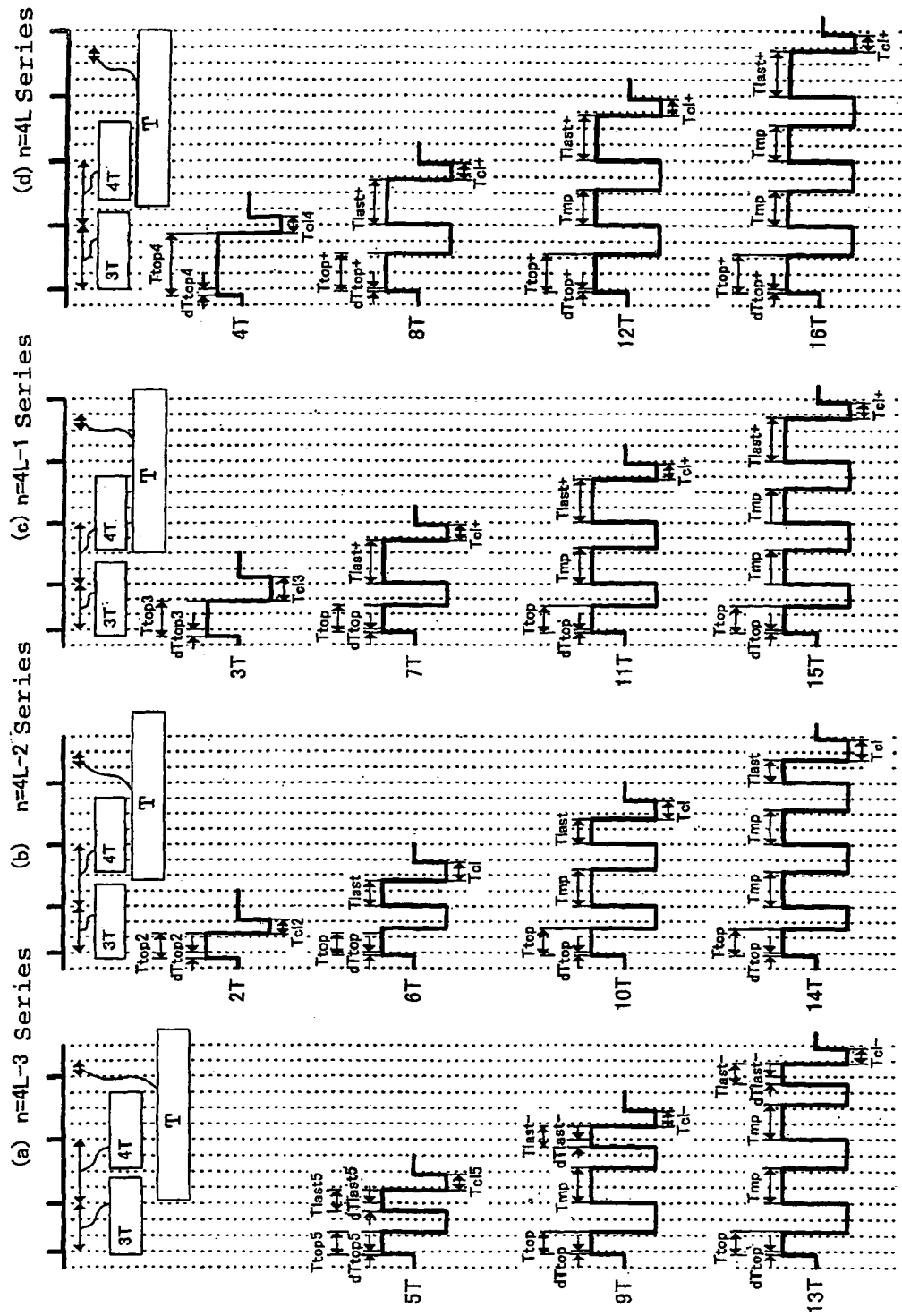
FIG. 8 is views illustrating specific examples of the timing charts wherein recording pulse division method (IVa) is applied to mark lengths with n=2 to 16.

FIG. 8 is a specific example of timing charts wherein the recording pulse division method (IV) is applied to mark lengths with n=2 to 16. And, the rising or falling position of each recording pulse is synchronized with the reference clock as far as possible. At the same time, the respective parameters in plural mark lengths are changed as regularly as possible taking the periodicity relating to n into consideration. In FIG. 8, four mark lengths with n=4L−3, n=4L−2, n=4L−1 and n=4L (L being an integer of L≧2) by m being 2 or more, are taken as one set, and if L is increased or decreased by 1, m is increased or decreased by 1. And, as a rule, on the basis of an optical recording method (recording pulse division method) to be used for forming the record mark length with n=4L−2, mark length differences of plus 2T and minus 1T are realized in principle by means of constant parameters irrespective of L.

Specifically, four record mark lengths with n=4L−3, n=4L−2, n=4L−1 and n=4L to be formed by the same dividing number m=L (L≧2) are taken as one set, and on the basis of an optical recording method (recording pulse division method) to be used for forming the record mark length with n=4L−2, at least $\alpha_m$ is increased or decreased in such an optical recording method to form recording mark length with n=4L−1 and n=4L−3, respectively, and further on the basis of an optical recording method (recording pulse division method) to be used for forming the record mark length with n=4L−1, at least $\alpha_1$ is increased in such an optical recording method to form a record mark length with n=4L. And, in each of the n=4L−3 series, the n=4L−2 series, the n=4L−1 series and the n=4L series, independent parameters not depending on L will be determined. In such a way, the number of independent parameters can be reduced to a large extent. In the following, this specific example will be referred to as recording pulse division method (VIa).

Figure 9:
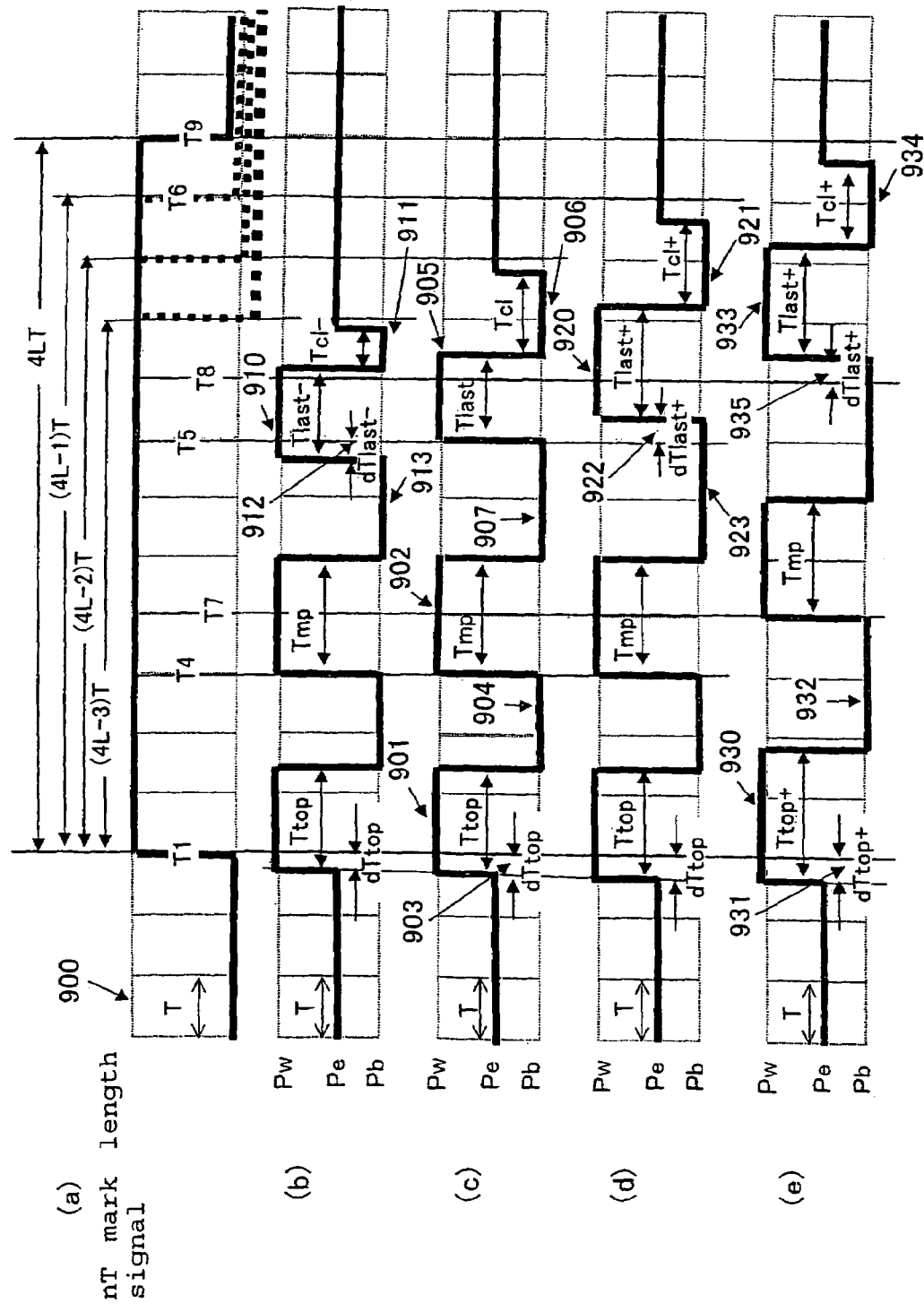
FIG. 9 is views illustrating periodical parameter changes wherein four mark lengths with n=4L−3, n=4L−2, n=4L−1 and n=4L are taken as one set, in a case where L=3 in FIG. 8.

FIG. 9 is an example of the case where L=3. A detailed description will be made by paying attention to periodic parameter changes in FIG. 8 wherein four mark lengths with n=4L−3, n=4L−2, n=4L−1 and n=4L (L being an integer of L≧2) are taken as one set.

Firstly, the recording pulse width basically has a constant value of $T_{mp}=\alpha cT$. And, as a rule, the recording pulses will be generated with a period of 3T or 4T, as synchronized with the reference clock period T. And, every time when n is increased by 4 (every time when the mark length is increased by 4T, or every time when L is increased by 1), one set of an intermediate recording pulse of $T_{mp}$ and the subsequent off-pulse will be added with a period of 4T. The reference clock period T is represented by one box section 900 in FIG. 9(*a*), and the nT mark has, at its front, time T1 as one point synchronized with the reference clock.

And, as shown in FIG. 9(*c*), when n=4L−2, $T_{top}=\alpha_1T$ (901) will be generated with a time deviation of $dT_{top}$ (903) from T1. In this Fig., $dT_{top}$ takes a positive value when the deviation is a delay from T1.

$dT_{top}$ defines a deviated time in synchronization from the front position (T1) of the nT mark in the front position of $T_{top}$ and is used for accurate adjustment of the forward end position of the mark. Usually, the front recording pulse has no residual heat from the preceding recording pulse, and it is preferred to set $T_{top}\geq T_{mp}$, so that a heating effect equivalent to heating in the subsequent $T_{mp}$ section can be obtained. In such a case, $\beta_1T$ (904) is determined by $\beta_1T=3T-(T_{top}+dT_{top})$ and thus is not an independent parameter.

After $T_{top}$, recording pulses will be generated in such an order that first $T_{mp}$ (902) will be generated at T4 with a period of 3T as synchronized with the reference clock, thereafter the period becomes 4T, and finally $T_{last}=\alpha_mT$ (905) will be generated at T4, and finally an off-pulse of $T_{c1}=\beta_mT$ (906) will be formed. Accordingly, an off-pulse section $\beta_iT$ ($2\leq i\leq m-2$) will be $4T-T_{mp}=(4-\alpha_c)T=\beta cT$, but will not appear in the example shown in FIG. 9. Further, in this case, $\beta_{m-1}T$ (907) can be made to be $4T-T_{mp}=(4-\alpha_{m-1})T$. This recording pulse division method is different from the recording pulse division methods (IIa) and (IIIa) in that if L is increased by one, $T_{mp}$ will be repeatedly generated every 4T period as synchronized with the reference clock period. Of course, when n=5, 6, 7 or 8, no intermediate recording pulse section $T_{mp}$ will be generated. Further, it is optionally possible to add a deviation of $dT_{last}$ at the starting point of $T_{last}$, but it is preferred to set $dT_{last}=0$.

As shown in FIG. 9(*b*), when n=4L−3, $T_{top}=\alpha_1T$ will be generated with a time deviation of $dT_{top}$ from T1. Further, after $T_{top}$, recording pulses will be generated in such an order that first $T_{mp}$ will be generated at T4 in a period of 3T, as synchronized with the reference clock, thereafter the period becomes 4T and $T_{last}=\alpha_mT$ will be generated at T5, and finally, an off-pulse of $T_{c1}=\beta_mT$ will be generated. Here, $T_{last}$ and $T_{c1}$ are parameters which may take the values $T_{last-}$ (910) and $T_{c1-}$ (911), respectively, which are different from the case of n=4L−2. Further, $T_{last-}$ (910) may have the synchronization deviated from the reference clock by adding a correction value $dT_{last-}$ (912). By $T_{last-}$, $T_{c1-}$ and $dT_{last-}$, a mark length shorter by 1T than the case of n=4L−2, will be formed. Usually, it is preferred to set $T_{last}\geq T_{last-}$, so that $0<(T_{last}-T_{last-})\leq T$. Further, in this case, $\beta_{m-1}T$ (913) is determined by $\beta_{m-1}T=4T-T_{mp}+dT_{last-}$ and thus is not an independent parameter. Namely, adjustment of $dT_{last-}$ means that adjustment of $\beta_{m-1}T$ is carried out.

On the other hand, as shown in FIG. 9(*d*), when n=4L−1, $T_{top}=\alpha_1T$ will be generated with a time deviation of $dT_{top}$ from T1. Further, after $T_{top}$, recording pulses will be generated in such an order that first $T_{mp}$ will be generated at T4 with a period of 3T, as synchronized with the reference clock, thereafter the period becomes 4T and finally $T_{last}=\alpha_mT$ will be generated at T5, and finally an off-pulse of $T_{c1}=\beta_mT$ will be generated. Here, $T_{last}$ and $T_{c1}$ are independent parameters which may take the values $T_{last+}$ (920) and $T_{c1+}$ (921), respectively, which are different from the case of n=4L−2. Further, $T_{last+}$ (920) may have the synchronization deviated from the reference clock by adding a correction value $dT_{last-}$ (922). By $T_{last+}$, $T_{c1+}$ and $dT_{last+}$, a mark length longer by 1T than the case of n=4L−2, will be formed. Usually, it is preferred to set $T_{last+}\geq T_{last}$, so that $0<(T_{last+}-T_{last})\leq T$. Further, $\beta_{m-1}T$ (923) is determined by $\beta_{m-1}T=4T-T_{mp}+dT_{last+}$ and thus is not an independent parameter. Namely, adjustment of $dT_{last+}$ means that adjustment of $\beta_{m-1}T$ is carried out.

As shown in FIG. 9(*e*), when n=4L, with respect to $T_{top}$, again, $T_{top}=\alpha_1T$ will be generated with a time deviation of $dT_{top}$ from T1, but $T_{top}$ and $dT_{top}$ may take the values $T_{top+}$ (930) and $dT_{top+}$ (931), respectively, which are different from other cases of 4L−3, 4L−2 and 4L−1.

Further, after $T_{top+}$, recording pulses will be generated with a period of 4T in the order of m-2 pieces of $T_{mp}$ and $T_{last}$, and finally $T_{c1}$ will be generated, but $T_{last}$ and $T_{c1}$ may take the same value $T_{last+}$ (933), $T_{c1}+$(934) and a correction value of $dT_{last+}$ (935) as in the case of n=4L−1. Mainly by adjusting $T_{top}$ to a value $T_{top+}$ different from n=4L−1 and correcting it with $dT_{top+}$, a mark length longer by 1T than n=4L−1 will be formed. Usually, it is preferred to set $T_{top+}>T_{top}$, so that $0<(T_{top+}-T_{top})\leq T$. Accordingly, $\beta_1T$ (934) is determined by $\beta_1T=4T-(T_{top+}+dT_{top+})$ and thus is not an independent parameter. Namely, adjustment of $T_{top+}$ and $dT_{last}$+means that adjustment of $\beta_1T$ is carried out.

However, it is desirable that n=5 has a degree of freedom to determine $dT_{top}$, $T_{top}$, $T_{last}$, $dT_{last}$ and $T_{c1}$, respectively, which are different from other cases of n=4L−3. Therefore, in order to make it clear that they are independent parameters, in FIG. 8, they are identified by $dT_{top5}$, $T_{top5}$, $T_{last5}$, $dT_{last5}$ and $T_{c15}$. With the 5T mark length, n/m=2.5, and as is different from other mark lengths with n=4L−3, the repeating period of the recording pulses will be small at a level of 2.5T. Therefore, with the 5T mark length, there may be a case where it is difficult to realize low jitter and an accurate mark length by the same parameters as other mark length with n=4L−3.

When n=2, 3 or 4, m=1. Therefore, by means of a pair of a recording pulse section $T_{top}$ and an off-pulse section $\beta_1T=T_{c1}$, mark lengths with n=2, 3 and 4 will, respectively be formed, and at the same time, low mark end jitter will be realized. Each case is defined by three parameters of $dT_{top}$, $T_{top}$ and $T_{c1}$. And, the respective parameters are to be set independently of $dT_{top}$, $T_{top}$ and $T_{c1}$ in any other mark lengths. Namely, as shown in FIG. 8, the 2T mark length will be formed by $dT_{top2}$, $T_{top2}$ and $T_{c12}$, the 3T mark length will be formed by $dT_{top3}$, $T_{top3}$ and $T_{c13}$, and the 4T mark length will be formed by $dT_{top4}$, $T_{top4}$ and $T_{c14}$, to provide different mark lengths, respectively.

In summary of the foregoing, the number of independent parameters in the recording pulse division method (IVa) as defined in FIG. 8, is nine parameters totaling three each at n=2, 3 and 4 ($dT_{top2}$, $T_{top2}$, $T_{c12}$, $dT_{top3}$, $T_{top3}$, $T_{c13}$, $dT_{top4}$, $T_{top4}$, $T_{c14}$), five parameters at n=5 ($dT_{top5}$, $T_{top5}$, $T_{last5}$, $dT_{last5}$, $T_{c15}$) and thirteen parameters at n=6 or more ($dT_{top}$, $T_{top}$, $T_{mp}$, $T_{last}$, $T_{c1}$, $T_{last+}$, $T_{c1+}$, $dT_{last+}$, $T_{last-}$, $T_{c1-}$, $dT_{last-}$, $dT_{top+}$, $T_{top+}$). Namely, the number of parameters is 9+5+130=27 in total.

Further, usually, either $dT_{last+}$ or $T_{c1+}$ is $dT_{last+}$=0 or $T_{c1+}$=$T_{c1}$, whereby the number of independent parameters can be reduced by one. Likewise, either $dT_{last-}$ or $T_{c1-}$ may be made to be $dT_{last-}$=0 or $T_{c1-}$=$T_{c1}$, whereby the number of independent parameters can be reduced by one. Namely, at n=6 or more, independent parameters may be made to be eleven ($dT_{top}$, $T_{top}$, $T_{mp}$, $T_{last}$, $T_{c1}$, $T_{last+}$, $dT_{last+}$, $T_{last-}$, $dT_{last-}$, $dT_{top+}$, $T_{top+}$) or eleven ($dT_{top}$, $T_{top}$, $T_{mp}$, $T_{last}$, $T_{c1}$, $T_{last+}$, $T_{c1+}$, $T_{last-}$, $T_{c1-}$, $dT_{top+}$, $T_{top+}$).

The merit of the recording pulse division method (IVa) resides in that four record mark length with n=4L−3, 4L−2, 4L−1 and 4L at the same dividing number m=L (L≧2) are taken as one set, and on the basis of an optical recording method to be used for forming the record mark length with n=4L−2, the record mark length with n=4L−3 and n=4L−1 are formed by adjusting the rear end recording pulse section $\alpha_m T$=$T_{last}$ and the preceding or subsequent section ($\beta_{m-1}T$, $\beta_m T$=$T_{c1}$) in such an optical recording method.

Another merit of the recording pulse division method (IVa) resides in that four record mark lengths with n=4L−3, 4L−2, 4L−1 and 4L at the same dividing number m=L (L≧2), are taken as one set, and on the basis of an optical recording method to be used for forming the record mark length with n=4L−1, the record mark length with n=4L is formed by adjusting the front end recording pulse section $\alpha_1 T$=$T_{top}$ and the subsequent section $\beta_1 T$ in such an optical recording method.

Further, adjustment of $\beta_{m-1}T$ is carried out via adjustment of $dT_{last}$, and adjustment of $\beta_1 T$ is carried out via adjustment of $T_{top}$=$\alpha_1 T$ and $dT_{top}$.

And, thirteen parameters at n=6 or more ($dT_{top}$, $T_{top}$, $T_{mp}$, $T_{last}$, $T_{c1}$, $T_{last+}$, $T_{c1+}$, $dT_{last+}$, $T_{last-}$, $T_{c1-}$, $dT_{last-}$, $dT_{top+}$, $T_{top+}$) being constant irrespective of L means nothing but that in the four record mark lengths with n=4L−3, 4L−2, 4L−1 and 4L (L≧2), the respective ($\alpha_1$, $dT_{top}$, $\beta_1$, $\alpha_m$, $\beta_{m-1}$, $\beta_m$) values are constant irrespective of L except for the case of n=5. More preferably, they are made constant irrespective of L, including the case of n=5.

Figure 26:
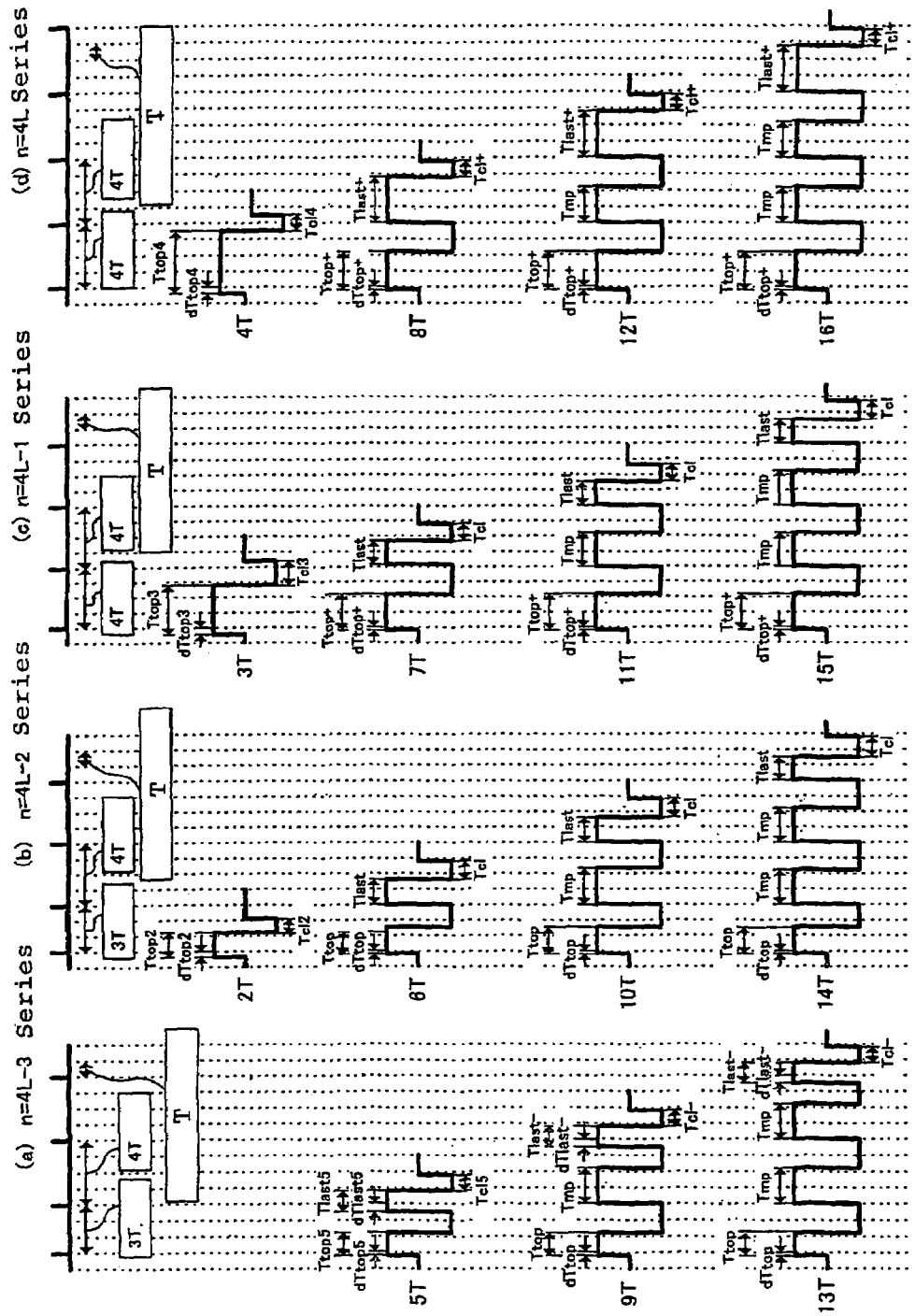
FIG. 26 is views illustrating specific examples of timing charts wherein recording pulse division method (IVb) is applied to mark lengths with n=2 to 16.

FIG. 26 is another example of the recording pulse division method (IV). In FIG. 26, particularly when m=2 or more, four mark lengths with n=4L−3, 4L−2, 4L−1 and 4L (L being an integer of L≧2) are taken as one set, and if L is increased or decreased by 1, m is increased or decreased by 1. And, as a rule, on the basis of an optical recording method to be used for forming the record mark length with n=4L−2, mark length differences of plus 2T and minus 1T, are realized by using constant parameters irrespective of L.

Specifically, four record mark lengths with n=4L−3, 4L−2, 4L−1 and 4L to be formed by the same dividing number m=L (L≧2) are taken as one set, and on the basis of an optical recording method to be used for forming the record mark length with n=4L−2, at least $\alpha_m$ is reduced in such an optical recording method to form the record mark length with n=4L−3, and on the basis of an optical recording method to be used for forming the record mark length with n=4L−2, at least $\alpha_1$ is increased in such an optical recording method to form the record mark length of n=4L−1, and further, on the basis of an optical recording method to be used for forming the record mark length with n=4L−1, at least $\alpha_m$ is increased in such an optical recording method to form the record mark length with n=4L. And, in each of the n=4L−3 series, the n=4L−2 series, the n=4L−1 series and the n=4L series, independent parameters not depending on L will be determined. In such a manner, the number of independent parameters can be reduced to a large extent. In the following, this specific example will be referred to as recording pulse division method (IVb).

Figure 27:
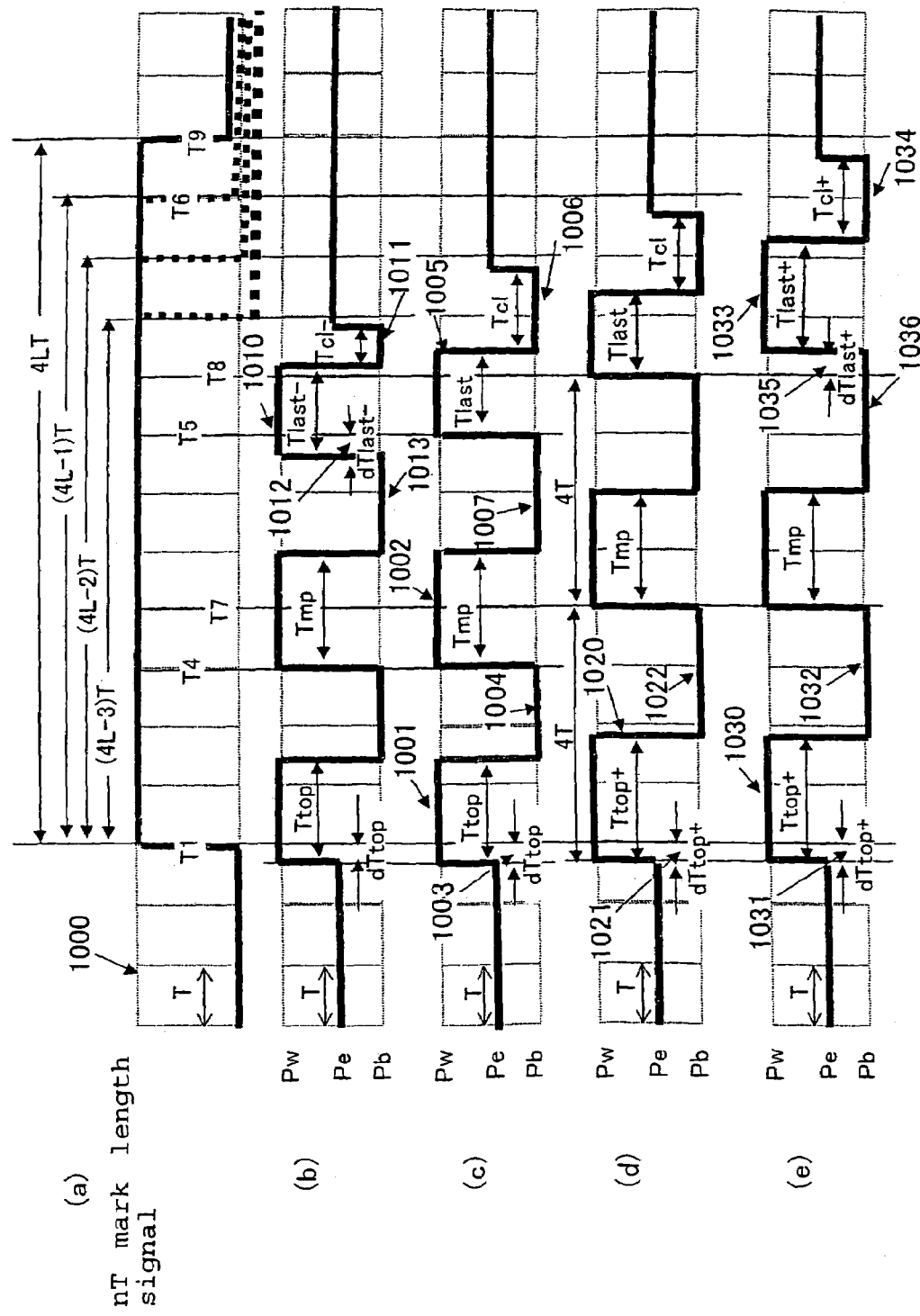
FIG. 27 is views illustrating periodic parameter changes wherein four mark lengths with n=4L−3, n=4L−2, n=4L−1 and n=4L are taken as one set, in a case where L=3 in FIG. 26.

Particularly, with reference to FIG. 27 showing an example of the case where L=3, a detailed description will be made by paying attention to the periodic parameter changes in FIG. 26 wherein four mark lengths with n=4L−3, 4L−2, 4L−1 and 4L (L being an integer of L≧2) are taken as one set.

Firstly, the recording pulse width basically has a constant value of $T_{mp}$=$\alpha cT$. And, as a rule, the recording pulses will be generated with a period of 3T or 4T, as synchronized with the reference clock period T. And, every time when n is increased by 4 (every time when the mark length is increased by 4T, or every time when L is increased by 1), a set of an intermediate recording pulse of $T_{mp}$ and the subsequent off-pulse will be added with a period of 4T. The reference clock period T is represented by one box section 1000 in FIG. 27(a), and the nT mark has, at its front, time T1 as one point synchronized with the reference clock.

And, when n=4L−2 (FIG. 27(c)), $T_{top}$=$\alpha_1 T$ (1001) will be generated with a time deviation of $dT_{top}$ (1003) from T1. In this Fig., $dT_{top}$ has a positive value when the deviation is a delay from T1.

$dT_{top}$ defines a deviated time in synchronization from the front position (T1) of the nT mark at the front position of $T_{top}$ and is used for accurate adjustment of the forward end position of the mark. Usually, the front recording pulse has no residual heat from the preceding recording pulse, and it is preferred to set $T_{top}$≧$T_{mp}$, so that a heating effect equivalent to heating at the subsequent $T_{mp}$ section can be obtained. $\beta_1 T$ (1004) is determined by $\beta_1 T$=3T−($T_{top}$+$dT_{top}$) and thus is not an independent parameter.

After $T_{top}$, recording pulses will be generated in such an order that first $T_{mp}$ (1002) will be formed at T4 with a period of 3T, as synchronized with the reference clock, thereafter the period becomes 4T, and $T_{last}$=$\alpha_m T$ (1005) will be formed at T5, and finally an off-pulse of $T_{c1}$=$\beta_m T$ (1006) will be generated. Accordingly, the off-pulse section $\beta_i T$ (2≦i≦m−2) will be 4T−$T_{mp}$=(4−αc)T=βcT, but will not appear in the example shown in FIG. 27. Further, $\beta_{m-1}T$ will also be 4T−$T_{mp}$ and thus is not an independent parameter. This recording pulse division method is different from the recording pulse division methods (IIb) and (IIIb) in that if L is increased by one, $T_{mp}$ will be repeatedly generated every 4T period as synchronized with the reference clock period. Of course, when n=5, 6, 7 or 8, no intermediate recording pulse section $T_{mp}$ will be generated. Further, it is optionally possible to add a deviation of $dT_{last}$ to the starting point of $T_{last}$, but it is preferred to set $dT_{last}$=0.

Hereinafter, the relation of the recording method at n=4L−3, n=4L−2 and n=4L−1 is the same as the relation of the recording method at n=3L−1, n=3L and n=3L+1 in the recording pulse division method (IIb). Further, hereinafter, the relation of the recording method at n=4L−2, n=4L−1 and n=4L, is the same as the relation of the recording method at n=3L, n=3L+1 and n=3L+2 in the recording pulse division method (IIIb).

Namely, when n=4L−3 (FIG. 27(b)), $T_{top}$=$\alpha_1 T$ will be generated with a time deviation of $dT_{top}$ from T1. Further, after $T_{top}$, recording pulses will be generated in such an order that first $T_{mp}$ will be generated at T4 with a period of 3T, as synchronized with the reference clock, thereafter the period becomes 4T, and $T_{last}$=$\alpha_m T$ will be generated at T5, and finally an off-pulse of $T_{c1}$=$\beta_m T$ will be generated. Here, $T_{last}$ and $T_{c1}$ are independent parameters which may take the values $T_{last-}$ (1010) and $T_{c1-}$ (1011), respectively, which are different from the case of n=4L−2. Further, $T_{last-}$ (1010) may have the synchronization deviated from the reference clock by adding a correction value $dT_{last-}$ (1012). By $T_{last-}$, $T_{c1-}$ and $dT_{last-}$, a mark length shorter by 1T than the case of N=4L−2 will be formed. Usually, it is preferred to set $T_{last} \geq T_{last-}$, so that $0<(T_{last}-T_{last-}) \leq T$. Further, $\beta_{m-1}T$ (1013) is determined by $\beta_{m-1}T=4T-T_{mp}+dT_{last-}$ and thus is not an independent parameter. Namely, adjustment of $dT_{last-}$ means that adjustment of $\beta_{m-1}T$ is carried out.

On the other hand, when n=4L−1 (FIG. 27(d)), $T_{top}=\alpha_1 T$ will be generated with a time deviation of $dT_{top}$ from T1, but $T_{top}$ and $dT_{top}$ may take the values $T_{top+}$ (1020) and $dT_{top+}$ (1021) which are different from other cases of 4L−3 and 4L−2.

Further, after $T_{top+}$, recording pulses will be generated in the order of m−2 pieces of $T_{mp}$ and $T_{last}$, and finally, $T_{c1}$ will be generated. Mainly by adjusting $T_{top}$ to a value $T_{top+}$ which is different from n=4L−2 and correcting it with $dT_{top+}$, a mark length longer by 1T than n=4L−2, will be formed. At that time, $\alpha_2 T$ is set to rise with a period of 4T from T1. Usually, it is preferred to set $T_{top+}>T_{top}$, so that $0<(T_{top+}-T_{top})\leq T$. Accordingly, $\beta_1 T$ (1022) is determined by $\beta_1 T=4T-(T_{top+}+dT_{top+})$ and thus is not an independent parameter. Namely, adjustment $dT_{top+}$ and $T_{top+}$ means that adjustment of $\beta_1 T$ is carried out.

When n=4L (FIG. 27(e)), $T_{top}=\alpha_1 T$ will be generated with a time deviation of $dT_{top}$ from T1, but $T_{top}$ and $dT_{top}$ will take the same values $T_{top+}$ (1030) and $dT_{top+}$ (1031) as in the case of n=4L−1. At that time, $\alpha_2 T=T_{mp}$ is set to rise with a period of 4T from T1. Accordingly, $\beta_1 T$ (1032) is determined by $\beta_1 T=4T-(T_{top+}+dT_{top+})$ and is not an independent parameter. Namely, adjustment of $dT_{top+}$ and $T_{top+}$ means that adjustment of $\beta_1 T$ is carried out.

After m−2 pieces of $T_{mp}$ including $\alpha_2 T$, are generated, a recording pulse $T_{last}$ will be generated, and finally, a cooling pulse $T_{c1}$ will be generated. $T_{last}$ and $T_{c1}$ are independent parameters which may take the values $T_{last+}$ (1033) and $T_{c1+}$ (1034), respectively, which are different from the case of n=4L−1. Further, $T_{last+}$ (1033) may have the synchronization deviated from the reference clock by adding a correction value $dT_{last+}$ (1035). By $T_{last+}$, $T_{c1+}$ and $dT_{last+}$, a mark length longer by 1T than the case of n=4L−1 will be formed. Usually, it is preferred to set $T_{last+}\geq T_{last}$, so that $0<(T_{last+}-T_{last})\leq T$. Further, $\beta_{m-1}T$ (1036) is determined by $\beta_{m-1}T=4T-T_{mp}+dT_{last+}$ and thus, is not an independent parameter. Namely, adjustment of $dT_{last+}$ means that adjustment of $\beta_{m-1}T$ is carried out.

However, it is desirable that n=5 has a degree of freedom to decide $dT_{top}$, $T_{top}$, $T_{last}$, $dT_{last}$ and $T_{c1}$, respectively, which are different from the case of n=4L−3. Therefore, in order to make it clear that they are independent parameters, in FIG. 26, they are identified by $dT_{top5}$, $T_{top5}$, $T_{last5}$, $dT_{last5}$ and $T_{c5}$. With the 5T mark length, n/m=2.5, and as is different from other mark lengths with n=4L−3, the repeating period of the recording pulses tends to be small at about 2.5T. Therefore, with the 5T mark length, there is a case where it is difficult to realize low jitter and an accurate mark length by the same parameters as for other mark lengths with n=4L−3.

When n=2, 3 or 4, m=1. Therefore, by means of a pair of a recording pulse section $T_{top}$ and an off-pulse section $\beta_1 T=T_{c1}$, mark lengths with n=2, 3 and 4 will, respectively, be formed, and at the same time, low mark end jitter will be realized. Each case is defined by three parameters of $dT_{top}$, $T_{top}$ and $T_{c1}$. And, the respective parameters are to be set independently of $dT_{top}$, $T_{top}$ and $T_{c1}$ in any other mark lengths. Namely, as shown in FIG. 26, the 2T mark length will be formed by $dT_{top2}$, $T_{top2}$ and $T_{c12}$, the 3T mark length will be formed by $dT_{top3}$, $T_{top3}$ and $T_{c13}$, and the 4T mark length will be formed by $dT_{top4}$, $T_{top4}$ and $T_{c14}$, to provide different mark lengths, respectively.

In summary of the forgoing, the number of independent parameters in the recording pulse division method (IVb) defined in FIG. 26 is nine parameters totaling three each at n=2, 3 and 4 ($dT_{top2}$, $T_{top2}$, $T_{c12}$, $dT_{top3}$, $T_{top3}$, $T_{c13}$, $dT_{top4}$, $T_{top4}$, $T_{c14}$), five parameters at n=5 ($dT_{top5}$, $T_{top5}$, $T_{last5}$, $dT_{last5}$, $T_{c15}$) and thirteen parameters at n=6 or more ($dT_{top}$, $T_{top}$, $T_{mp}$, $T_{last}$, $T_{c1}$, $T_{last-}$, $T_{c1-}$, $dT_{last-}$, $dT_{top+}$, $T_{top+}$, $T_{last+}$, $T_{c1+}$, $dT_{last+}$). Namely, the number of parameters is 9+5+13=27 in total.

Further, usually, either $dT_{last+}$ or $T_{c1+}$ is set to be $dT_{last+}=0$ or $T_{c1+}=T_{c1}$, whereby the number of independent parameters can be reduced by one. Likewise, either $dT_{last-}$ or $T_{c1-}$ may be set to be $dT_{last-}=0$ or $T_{c1-}=T_{c1}$, whereby the number of independent parameters can be reduced by one. Namely, independent parameters at n=6 or more may be made to be eleven ($dT_{top}$, $T_{top}$, $T_{mp}$, $T_{last}$, $T_{c1}$, $T_{last-}$, $dT_{last-}$, $dT_{top+}$, $T_{top+}$, $T_{last+}$, $dT_{last+}$) or eleven ($dT_{top}$, $T_{top}$, $T_{mp}$, $T_{last}$, $T_{c1}$, $T_{last-}$, $T_{c1-}$, $dT_{top+}$, $T_{top+}$, $T_{last+}$, $T_{c1+}$).

The merit of the recording pulse division method (IVb) resides in that four record mark lengths with n=4L−3, 4L−2, 4L−1 and 4L at the same dividing number m=L ($L\geq 2$) are taken as one set, and on the basis of an optical recording method to be used for forming the record mark length with n=4L−2, the record mark lengths with n=4L−3 and n=4L−2 are respectively formed solely by adjusting the rear end recording pulse section $\alpha_m T=T_{last}$ and the preceding or subsequent section ($\beta_{m-1}T$, $\beta_m T=T_{c1}$) in such an optical recording method, and on the basis of an optical recording method to be used for forming the record mark length with n=4L−1, the record mark lengths with n=4L−1 and 4L−2 are respectively formed solely by adjusting the front end recording pulse section $\alpha_1 T=T_{top}$ and the subsequent section $\beta_1 T$ in such an optical recording method, and on the basis of an optical recording method to be used for forming the record mark length with n=4L−1, the record mark length with n=4L−1 and n=4L are respectively formed solely by adjusting the rear end recording pulse section $\alpha_m T=T_{last}$ and the preceding or subsequent section ($\beta_{m-1}T$, $\beta_m T=T_{c1}$) in such an optical recording method. Further, adjustment of $\beta_{m-1}T$ is carried out via adjustment of $dT_{last}$, and adjustment of $\beta_1 T$ is carried out via adjustment of $T_{top}=\alpha_1 T$ and $dT_{top}$.

And, thirteen parameters at n=6 or more ($dT_{top}$, $T_{top}$, $T_{mp}$, $T_{last}$, $T_{c1}$, $T_{last-}$, $T_{c1-}$, $dT_{last-}$, $dT_{top+}$, $T_{top+}$, $T_{last+}$, $T_{c1+}$, $dT_{last+}$) being constant irrespective of L means nothing but that in the four recording mark lengths with n=4L−3, 4L−2, 4L−1 and 4L ($L\geq 2$), the respective ($\alpha_1$, $dT_{top}$, $\beta_1$, $\alpha_m$, $\beta_{m-1}$, $\beta_m$) values are constant irrespective of L except for the case of n=5. More preferably, they are set to be constant irrespective of L including the case of n=5.

Now, some points common to each of the above described recording methods will be described.

Independent parameters to define the divided recording pulse strategies in the above description, i.e. the independent parameters at n=2, 3, 4 and 5 ($dT_{top2}$, $T_{top2}$, $T_{c12}$, $dT_{top3}$, $T_{top3}$, $T_{c13}$, $dT_{top4}$, $T_{top4}$, $T_{c14}$), ($dT_{top5}$, $T_{top5}$, $T_{last5}$, $dT_{last5}$, $T_{c15}$) and the independent parameters at n=6 or more ($dT_{top}$, $T_{top}$, $T_{mp}$, $T_{last}$, $T_{c1}$, $T_{last+}$, $T_{c1+}$, $dT_{last+}$, $T_{last-}$, $T_{c1-}$, $dT_{last-}$, $dT_{top+}$, $T_{top+}$), etc., may be replaced by values normalized by the reference clock period T. Those having $T_{top2}$, $T_{top+}$, $T_{last2}$, $T_{last+}$, $T_{c12}$, $T_{c1+}$, etc. normalized by the reference clock period T, will be represented by $\alpha_{12}$, $\alpha_{1+}$, $\alpha_{m2}$, $\alpha_{m+}$, $\beta_{m2}$, $\beta_{m+}$, etc. with the subscripts being as they are. On the other hand, parameters having $dT_{top2}$, $dT_{top+}$, $dT_{last2}$, $dT_{last+}$, etc. normalized by T, will be represented by $\eta_{top2}$, $\eta_{top+}$, $\eta_{last2}$, $\eta_{last+}$, etc. with the subscripts being left as they are.

Further, in each method, $T_{top} = T_{mp} - dT_{top*}$, and $T_{last} - T_{mp} - dT_{last*}$ (* represents a subscript such as 2, 3, 4, 5, + or −), whereby $T_{top*}$ or $T_{last*}$ may be made to be a subordinate parameter.

According to the above-described recording pulse division methods, the number of independent parameters is reduced by maintaining the regularity as far as possible on the basis of the synchronization with the reference clock period and the periodicity relating to mark length n. And, according to the above-described recording pulse division methods, it has been realized to simplify the recording pulse generation circuit and to facilitate the determination of the optimum parameters.

As a matter of course, it is optionally possible to deviate the rising or falling timing of a specific recording pulse or cooling pulse at a level of ±0.2T from the timing shown in the above-described recording pulse division methods. Further, particularly, $dT_{top}$, $\beta_m T$ or the like may finely be adjusted for every recording mark depending upon the record mark length or the length of the space between the record marks preceding the record mark in question or depending upon the record mark length or the length of the space between the record marks subsequent to the record mark in question, whereby it is possible to suppress thermal interference between the adjacent record marks. Even if the number of independent parameters is additionally increased in this manner, such is not beyond the gist of the present invention.

In the above description, a case wherein n is 2 to 16 or from 2 to 17 has been illustrated. However, the present invention is by no means restricted to such values which n may take. With respect to n=16 or 17, or more, for example, in the recording method (IIa), (IIIa) or (IVa), a pair of a cooling pulse and a recording pulse $T_{mp}$ may simply be added before $\beta_{m-1}$ with a period of 3T or 4T, whereby the number of independent parameters will not increase. On the other hand, it is also unnecessary to use all of such values (from 2 to 16, or from 2 to 17) as n. On the other hand, the maximum value $n_{max}$ of n is not limited to 16 or 17.

For example, in a case where the optical recording method to which the present practical mode may be applied, is to be applied to CD-RW, when EFM−modified information is to be recorded by plural record mark lengths and space lengths between record marks, $n_{max}=11$, and n takes integers of from 3 to 11. And, it is preferred that the ratio of erasing power Pe to writing power Pw is usually set to be Pe/Pw=0.1 to 0.6, and bias power Pb is set to be Pb≦0.2 Pe.

Further in a case where the optical recording method to which the present practical mode may be applied, is to be used as a recording method for RW-DVD, when EFM+ modified information is to be recorded by plural record mark lengths and space lengths between record marks, $n_{max}=14$, and n takes integers of from 3 to 11 and 14. And, it is preferred that the ratio of erasing power Pe to writing power Pw is usually set to be Pe/Pw=0.1 to 0.6, and bias power Pb is set to be Pb≦0.2 Pe.

The number of independent parameters in the case of the recording pulse division method (IIa), (IIIa) or (IVa) for CD-RW or RW-DVD will be the number obtained by subtracting 3 i.e. the number of independent parameters in the case of n=2.

Still further, in a case where the optical recording method to which the present practical mode may be applied, is to be used as a recording method for e.g. Blu-Ray which has recently attracted attention, $n_{max}=8$, and n takes integers of from 2 to 8. And, it is preferred that the ratio of erasing power Pe to writing power Pw is usually set to be Pe/Pw=0.2 to 0.6, and bias power Pb is set to be Pb≦0.2 Pe.

Further, in a case where the optical recording method to which the present practical mode may be applied, is to be applied to CD-RW, it is preferred that the average value of recording pulse sections $\alpha_i T$ (i=1 to m) and the average value of off-pulse sections $\beta_i T$ (i=1 to m-1) are both set to be at least 3 nsec, whereby it becomes easy to secure the time-following property of the laser power to be applied. More preferably, individual $\alpha_i T$ (i=1 to m) and $\beta_i T$ (i=1 to m-1) are set to be at least 3 nsec.

On the other hand, in a case where the optical recording method to which the present practical mode may be applied, is to be applied to RW-DVD or a medium having a higher density, it is preferred that the average value of recording pulse sections $\alpha_i T$ (i=1 to m) and the average value of off-pulse sections $\beta_i T$ (i=1 to m-1) are both set to be at least 2 nsec, whereby it becomes easy to secure the time-following property of the laser power to be applied.

Here, the time width of a pulse $\alpha_i T$ (i=1 to m) is defined by the time when the power, in the transition of the power level between Pw and Pb (or Pw-Pe), has reached a power level of one-half of Pw-Pb (or Pw-Pe). Accordingly, for example, the time width of the recording pulse of $\alpha_1 T$ in FIG. 5, is the duration from the time when the power has reached a power level of one-half of Pe−Pw during the change from Pe to Pw of the rising of the pulse, to the time when the power has reached a power is level of one-half of Pw−Pb during the change from Pw to Pb of the falling of the pulse.

The reason will be explained as to why in the case of CD, it is preferred to set $\alpha_i T$ ($\beta_i T$) to be at least 3 nsec, while in high density recording at a level of at least DVD, it is preferred to set $\alpha_i T$ ($\beta_i T$) to be at least 2 nsec. Namely, in the case of high density recording at a level of at least DVD, the diameter of the focused laser beam for recording is at most about 70% of the case of CD, and accordingly, the spatial influence given by recording pulse irradiation for once will also be about 70%. The diameter of the focused laser beam is thus reduced, whereby the spatial resolution will be improved, and pulse irradiation for a short time of about 2 nsec corresponding to about 70% of 3 nsec will be effective. Further, in the case of the smaller beam system, the area to be heated is also small, whereby the cooling is quick, and also with respect to an off-pulse section, even if it is shortened to a level of about 2 nsec, an adequate cooling effect will be obtained.

Further, in the above recording pulse division methods, the dividing number m may be made to be 2 only when n=4, whereby good results may sometimes be obtained. Such an operation is most preferably applied to CD-RW. Namely, in the case of CD-RW, the length of the 4T record mark is about 1.1 μm i.e. larger by at least twice than a high density medium at a level of at least RW-DVD (4T mark length: about 0.53 μm), whereby with a single recording pulse, the heat accumulated at the molten region tends to be hardly dissipated, whereby recrystallization is likely to take place. In such a case, for example, in the 5T mark in FIG. 4, the time from the base point T1 of the mark to the position of the reference clock which becomes the starting point of $dT_{last}$, may not necessarily be 3T and may have 2T or 2.5T.

Namely, the timing of 2T or 2.5T expired from T1 may be considered as the starting point of $dT_{last}$.

Further, as another method to supplement the cooling deficiency in the 4T mark length, it is also effective to insert a cooling pulse $\beta_0 T$ shorter by about 1T, before $\alpha_1 T$, while maintaining the recording pulse dividing number to be 1.

Further, insertion of $\beta_0 T$ may be applied to all nT marks.

According to the optical recording method (I) to which the present practical mode may be applied, once its recording method is set, a high linear velocity of about 40 m/s may be the upper limit, and good recording or retrieving will be possible even at an optional linear velocity of not more than one-half thereof. And, if the above divided recording pulse generation method (II), (III) or (IV) is employed, the same medium may be used at a different linear velocity by changing the ratio of $\alpha_i$ to $\beta_i$ (where i=1 to m-1) while maintaining the switching period for the group of recording pulses to be constant at about 3T or 4T and while maintaining the dividing number m to be constant. Further, if the above divided recording pulse generation method (IIa), (IIb), (IIIa), (IIIb), (IVa) or (IVb) is employed, it will be possible to use the same medium at different linear velocities by changing the ratio of $\alpha_i$ to $\beta_i$ (where i=1 to m-1), while maintaining the prescribed regularity according to the periodicity relating to three of the dividing number m, the synchronization with the reference clock and n.

In such a case, at any linear velocity, it is usual to employ a pulse division method as shown in FIG. 6 wherein a writing power Pw and a bias power Pb are alternately applied to form a mark having a length of nT, and it is usual that the optimum values of parameters to decide such a specific method, vary depending upon the linear velocity. Accordingly, it is preferred that on a medium to which the present practical mode may be applied, at least one of the recording pulse division method information such as the optimum writing power $Pw_0$, the optimum erasing power $Pe_0$, the optimum bias power $Pb_0$, $\alpha_i$ (i is at least one of from 1 to m), $\beta_i$ (i is at least one of from 1 to m), the dividing number m, etc. suitable for the recording linear velocity, is preliminarily recorded.

And, on the basis of the recording pulse division method (I), the recording pulse division method (V) will be applied.

Recording Pulse Division Method (V)

This is an optical recording method wherein a rewritable optical recording medium is a disk, and on the same disk plane, recording is carried out at plural recording linear velocities while maintaining the spatial linear density of record marks to be approximately constant, wherein the above-mentioned recording pulse division method (I) is employed so that $\alpha_i$ at the maximum linear velocity $V_{max} = \alpha_{imax}$ (i=1 to m) is set to be from 0.5 to 2, and as the linear velocity lowers, $\alpha_i$ (i=1 to m) are, respectively, simply reduced while maintaining m to be constant. To maintain the spatial linear density of record marks to be approximately constant, can be accomplished by changing the reference clock period in inverse proportion to the linear velocity. In such a case, $(\alpha_i + \beta_i)$ is preferably maintained to be about 3 or 4, and $\alpha_i + \beta_i$ ($2 \leq i \leq m-1$) is preferably made to be constant irrespective of the linear velocity.

In the same manner, recording pulse division methods may be defined also for (II), (III), (IV), (IIa), (IIb), (IIIa), (IIIb), (IVa) and (IVb), respectively, derived from the recording pulse division method (I), and they will be referred to as (VI), (VII), (VIII), (VIa), (VIb), (VIIa), (VIIb), (VIIIa) and (VIIIb), respectively.

The lower limit in the recording linear velocity where good recording can be carried out while maintaining m to be constant, will be represented by $V_{min}$.

In the recording pulse division method (VIa), (VIb), (VIIa), (VIIb), (VIIIa) or (VIIIb), it is possible that m is maintained to be constant, and further, while maintaining $\alpha_i + \beta_i$ ($2 \leq i \leq m-1$) to be about 3 or 4, the ratio of $V_{max}/V_{min}$ can be made to be at least 2. It is thereby possible to maintain the synchronization with the changing reference clock period and the periodicity relating to n, within a wide linear velocity range. Further, it is possible to simplify the logical circuit for generating divided recording pulses. Further, the number of independent parameters required to optimize each linear velocity can be reduced.

Particularly, in these recording pulse division methods, at $T_{mp} = \alpha_i T$, it is preferred to bring the linear velocity and $\alpha_i$ to a substantially proportional relation to each other. Particularly, by setting the absolute time width of $\alpha_i T$ to be substantially constant, it is possible to bring the linear velocity and $\alpha_i$ accurately to a proportional relation to each other. Further, with respect to $T_{mp} = \alpha c T$ ($2 \leq i \leq m-1$), a portion $T_{mp0}$ where the absolute time width is constant, and a portion defined by $\gamma T$ which depends on the reference clock period (accordingly, the linear velocity), may be put together to make $T_{mp} = \alpha c T = T_{mp0} + \gamma T$. Usually, $\gamma$ is real number of $0 < \gamma < 3$, preferably $0 < \gamma \leq 2$. Even in this case, $\alpha_c$ is preferably made to be substantially in proportion to the linear velocity. In a case where $\alpha_1 T = T_{top} = dT_{top} - T_{mp}$, it is also preferred to maintain the absolute time width of $T_{mp}$ to be substantially constant, while $dT_{top}$ is independently changed at each linear velocity.

Further, when such methods are applied to CD-RW and RW-DVD as specific examples, with respect to the 1-time velocity reference linear velocity, the maximum linear velocity $V_{max}$ and the minimum linear velocity $V_{min}$, different values will be used for CD-RW and RW-DVD. Namely, in the case of CD-RW, the 1-time velocity reference linear velocity $V_1$ is from 1.2 m/s to 1.4 m/s, and in the case of RW-DVD, it is 3.49 m/s. Further, in the case of CD-RW, the maximum linear velocity $V_{max}$ is usually a linear velocity within a range of from 32-times to about 48-times velocity, particularly 40-times velocity or 48-times velocity, of the above reference linear velocity for CD-RW. In the case of RW-DVD, it is usually a linear velocity within a range of from 10-times velocity to about 16-times velocity, particularly 10-times velocity, 12-times velocity and 16-times velocity, of the above reference linear velocity for RW-DVD.

Likewise, in the case of CD-RW, the minimum linear velocity $V_{min}$ is usually a linear velocity of at most about 12-times velocity, and in the case of RW-DVD, it is usually a linear velocity of at most about 6-times velocity. As a matter of course, when $V_{max}$ and $V_{min}$ are to be used in a pair, they are selected from the linear velocity range wherein $V_{max} > V_{min}$.

Accordingly, in a case where CD-RW is taken into consideration, as the 1-time velocity reference linear velocity, $V_{max}$ and $V_{min}$, the above-mentioned values for CD-RW will be used, and when RW-DVD is taken into consideration, as the 1-time velocity reference linear velocity, $V_{max}$ and $V_{min}$, the above-mentioned values for RW-DVD will be used.

Here, the present invention is by no means restricted to the above practical mode. The above practical mode is an example of the present invention, and any one having substantially the same construction as the technical concept of the present invention as disclosed in the claims and showing the same effects, will be included within the technical scope of the present invention.

Further, as a specific example to which the present invention is applicable, a rewritable DVD recording medium useful for high linear velocity recording of at least 10-times velocity, can be realized. More specifically, it is possible to provide a recording method for a rewritable recording medium having retrieving compatibility with DVD with respect to the recording signal format, by carrying out mark length modulation recording by EFM+ modulation (combination of mark lengths and space lengths between marks corresponding to time lengths of from 3T to 11T and 14T to the reference clock period T of data), wherein an amorphous state of the recording layer is used as record marks.

Further, CD-RW useful for high linear velocity recording of at least 40-times velocity can be realized. More specifically, with CD-RW, it is possible to provide a recording method for a rewritable recording medium having retrieving compatibility with CD with respect to the recording signal format, by carrying out mark length modulation recording by EFM modulation (combination of mark lengths and space lengths between marks corresponding to time lengths of from 3T to 11T to the reference clock period T of data), wherein an amorphous state of the recording layer is used as record marks.

Further, DVR useful for high data transfer rate recording of at least 200 Mbps can be realized. More specifically, it is possible to provide a recording method for a high density rewritable recording medium by carrying out mark length modulation recording by (1, 7) Run-Lnght-Limited modulation (combination of mark lengths and space lengths between marks corresponding to time lengths of from 2T to 8T to the reference clock period T of data) wherein an amorphous state of the recording layer is used as record marks.

(2) Recording Medium to be Used for Optical Recording Method

As a recording medium to be used for the optical recording method of the present invention, an optical recording medium having a phase change type recording layer may, for example, be mentioned. As a specific example of such an optical recording medium, an optical recording medium may be mentioned which has a layered structure having a first protective layer (a lower protective layer), a recording layer (a phase change type recording layer), a second protective layer (an upper protective layer), a reflective layer and a protective coating layer in this order on a substrate of a disk shape, whereby recording or retrieving of signals is carried out by applying a laser beam through the substrate (which is used as a substrate side incident type optical information recording medium). Further, as another specific example of the optical recording medium having a phase change type recording layer, a recording medium may be mentioned which has a layered structure having a reflective layer, a second protective layer (a lower protective layer), a recording layer (a phase change type recording layer), a first protective layer (an upper protective layer) and a protective coating layer in this order on a substrate of a disk shape, whereby recording or retrieving of signals is carried out by applying a laser beam through the upper protective layer (which is used as a film side incident type optical information recording medium). With this film side incident type optical information recording medium, recording or retrieving of signals is carried out by applying a laser beam from the upper protective layer side without via the substrate, whereby the distance between the recording layer and an optical head can be reduced to at most a few hundred μm, and it is possible to improve the recording density of the medium by using an object lens having a numerical aperture of at least 0.7.

Here, the above-mentioned layered structures of the substrate side incident type optical recording medium and the film side incident type optical recording medium are merely exemplary. For example, in either the substrate side incident type optical recording medium or the film side incident type optical recording medium, an interface layer may be provided between the protective layer and the reflective layer, and in the film side incident type optical recording medium, an underlayer may be provided between the substrate and the reflective layer.

Preferred in the present invention is to employ a recording medium using for the recording layer a recording material having a high crystallization speed, which makes a high data transfer rate possible.

Now, each layer of the substrate, the recording layer and other layers (the protective layer, the reflective layer and the protective coating layer) will be described.

(1) Substrate

For the substrate, a resin such as polycarbonate, an acrylic resin or polyolefin, or glass, may, for example, be used. Among them, a polycarbonate resin has been practically most widely used for e.g. CD-ROM and is also inexpensive, and thus most preferred. The thickness of the substrate is usually at least 0.1 mm, preferably at least 0.3 mm. On the other hand, it is usually at most 20 mm, preferably at most 15 mm. It is generally from about 0.6 mm to 1.2 mm. In a substrate side incident type optical recording medium, the substrate is required to transmit a laser beam and thus is required to be transparent to the laser beam. On the other hand, in a film side incident type optical recording medium, the substrate is not necessarily required to be transparent.

On the substrate, usually, concentric or spiral tracks (grooves) are formed. Further, the shape of the substrate is a disk shape. Here, the "disk shape" means a rotatable shape and is usually meant for a flat disk shape, but is not limited to a flat disk shape. For example, in order to make the design of the optical information recording medium attractive, the shape may be a flat oval shape or a flat square shape.

(2) Recording Layer

For the recording layer, compounds of a type such as GeSbTe, InSbTe, AgSbTe and AgInSbTe, are selected as repeatedly recordable materials. Among them, a composition containing a pseudo binary alloy of $Sb_2Te_3$ and GeTe, more specifically a $\{(Sb_2Te_3)_{1-\alpha}(GeTe)_\alpha\}_{1-\beta}Sb_\beta$ composition (wherein $0.2 \leq \alpha \leq 0.9$, $0 \leq \beta \leq 0.1$), as the main component, or a composition containing Sb, as the main component, which contains at least 50 atomic % of Sb, is used in many cases.

The optical recording method of the present invention is preferably applied to a recording medium using for the recording layer a material having a high crystallization speed. In order to increase the crystallization speed, it is more preferred to use a composition containing Sb as the main component, for the recording layer. Here, in the present invention, "containing Sb as the main component" means that based on the entire recording layer, the content of Sb is at least 50 atomic %. The reason for using Sb as the main component is such that amorphous Sb can be crystallized at a very high speed, and accordingly, an amorphous mark can be crystallized in a short time. Therefore, erasing of a record mark in an amorphous state will be easy. From such a viewpoint, the content of Sb is preferably at least 60 atomic %, more preferably at least 70 atomic %. However, on the other hand, rather than using Sb alone, it is preferred to use together with Sb an additive element to accelerate formation of an amorphous state and to increase the archival stability of the amorphous state. In order to accelerate formation of an amorphous state of the recording layer and to increase the archival stability of the amorphous state, the content of the above additive element is made to be usually at least 1 atomic %, preferably at least 5 atomic %, more preferably at least 10 atomic %, and on the other hand, it is usually made to be at most 30 atomic %.

The above additive element to accelerate formation of the amorphous state and to increase the archival stability of the amorphous state, also has an effect to increase the crystallization temperature. As such an additive element, Ge, Te, In, Ga, Sn, Pb, Si, Ag, Cu, Au, a rare earth element, Ta, Nb, V, Hf, Zr, W, Mo, Cu, Cr, Co, nitrogen, oxygen or Se, may, for example, be employed. Among such additive elements, it is preferred to use at least one selected from the group consisting of Ge, Te, In, Ga and Sn, and it is particularly preferred to use Ge and/or Te or to use at least one of In, Ga and Sn, with a view to accelerating formation of the amorphous state, improving the archival stability of the amorphous state and increasing the crystallization temperature.

As mentioned above, in the recording layer of the recording medium, it is particularly preferred to use Sb, and Ge and/or Te, in combination, as a material for the recording layer, for crystallization at a high speed, for formation of an amorphous state and for improvement of the archival stability of the amorphous state. When Ge and/or Te is added to Sb, the content of Ge or Te in the recording layer is preferably made to be at least 1 atomic % and at most 30 atomic %. Namely, Ge and Te are preferably contained in an amount of at least 1 atomic % and at most 30 atomic %, respectively and independently. However, when the main component of the recording layer is Sb, the content of Sb will be at least 50 atomic %, and in a case where Ge and Te are to be incorporated to the recording layer together with Sb, the total amount of Ge and Te will be less than 50 atomic %.

The content of each of Ge and Te in the recording layer is more preferably at least 3 atomic %, further preferably at least 5 atomic %. Within this range, the effect to stabilize an amorphous mark will sufficiently be obtained. On the other hand, the content of each of Ge and Te in the recording layer is more preferably at most 20 atomic %, further preferably at most 15 atomic %. Within this range, it becomes possible to effectively suppress the tendency that the amorphous state is stabilized too much and the crystallization inversely tends to be slow, and thus, it will be possible to suppress a noise due to light scattering at the crystal grain boundaries.

The above compositions containing Sb as the main component may be classified into two types depending upon the amount of Te contained in the recording layer. One is a composition containing at least 10 atomic % of Te, and the other is a composition containing less than 10 atomic % of Te (inclusive of a case where no Te is contained).

As an example, the recording layer material is made to contain at least about 10 atomic % of Te and to have a compositional range wherein an alloy containing Sb in excess of the $Sb_{70}Te_{30}$ eutectic composition, is the main component. This recording layer material will be hereinafter referred to as a SbTe eutectic. Here, Sb/Te is preferably made to be at least 3, more preferably at least 4.

As another composition containing Sb as the main component, which can be classified depending upon the amount of Te contained in the recording layer, the following may be mentioned. Namely, the composition of the recording layer is made to contain Sb as the main component and to contain Te in an amount of less than 10 atomic % and further contain Ge as an essential component. As a specific example of the composition of such a recording layer, an alloy may preferably be mentioned which contains, as the main component, a eutectic alloy having a composition in the vicinity of $Sb_{90}Ge_{10}$ and which contains Te in an amount of less than 10 atomic % (in this specification, this alloy will be referred to as a SbGe eutectic).

This composition containing Te in an amount of less than 10 atomic % is not a SbTe eutectic and tends to have a nature as a SbGe eutectic. With this SbGe eutectic alloy, even if the Ge content is high at a level of 10 atomic %, the crystal grain size in a polycrystalline state after the initial crystallization is relatively fine, whereby the crystalline state tends to form a single phase and thus noise will be low. In the SbGe eutectic alloy, Te is merely additionally added and is not an essential element.

With the SbGe eutectic alloy, by making the Sb/Ge ratio relatively high, it is possible to increase the crystallization speed, and recrystallization of amorphous marks by recrystallization will be possible.

In a case where recording is carried out by forming amorphous marks by using for the recording layer a composition containing Sb as the main component, while the crystalline state is a non-recorded or erased state, it becomes very important to have a good cooling efficiency for the following reason.

Namely, with respect to the recording layer containing, as the main component, Sb of e.g. the SbTe eutectic or the SbGe eutectic, in order to meet with high speed recording, the crystallization speed is increased by increasing not the crystal nuclei-forming speed but the crystal growth speed, by further adding Sb in excess of in the vicinity of the $Sb_{70}Te_{30}$ eutectic point or the $Sb_{90}Ge_{10}$ eutectic point. Accordingly, with such a recording layer, it is preferred to increase the cooling speed of the recording layer thereby to suppress a change of amorphous marks by recrystallization (a change of amorphous marks to become smaller than the desired size). Thus, it becomes important to quench the recording layer to certainly form amorphous marks after melting the recording layer, and it becomes very important to have a good cooling efficiency of the recording layer. Therefore, in the case of the above-mentioned recording layer composition, it is particularly preferred to employ Ag or an Ag alloy having a high heat dissipation property for the reflective layer.

It is particularly preferred that the above recording layer employing the composition containing, as the main component, Sb of e.g. the SbTe eutectic or the SbGe eutectic, further contains at least one of In, Ga and Sn, so that the content of each of In, Ga and Sn in the recording layer is from 1 atomic % to 30 atomic %.

Now, the composition containing Sb as the main component will be further described with reference to specific examples.

As the composition containing Sb as the main component, firstly, a SbTe eutectic composition containing, as the main component, a $(Sb_xTe_{1-x})_{1-y}M_y$ alloy (wherein $0.6 \leq x \leq 0.9$, $0 \leq y \leq 0.3$, and M is at least one member selected from Ge, Ag, In, Ga, Zn, Sn, Si, Cu, Au, Pd, Pt, Pb, Cr, Co, O, S, Se, V, Nb and Ta) may be preferably mentioned. Here, in the above compositional formula, the composition is represented by atomic ratios. Thus, for example, x=0.6 means 60 atomic %.

In the above $(Sb_xTe_{1-x})_{1-y}M_y$ composition, it is particularly preferred to employ Ge, Ga, Ag or In alone or in combination as M, from the viewpoint of recording characteristics such as overwriting characteristics.

In the above $(Sb_xTe_{1-x})_{1-y}M_y$ composition, x is usually at least 0.6, preferably at least 0.7, more preferably at least 0.75, and on the other hand, usually at most 0.9. Further, y is usually at least 0, preferably at least 0.01, more preferably at least 0.03, and on the other hand, usually at most 0.3, preferably at most 0.2, more preferably at most 0.1. When x and y are within the above ranges, it becomes possible to obtain a recording layer capable of meeting with high speed recording.

With respect to the above $(Sb_xTe_{1-x})_{1-y}M_y$ composition, a composition employing Ge as M will further be described. As such a composition, it is preferred to employ a composition represented by $Ge_y(Sb_xTe_{1-x})_{1-y}$ (wherein $0.01 \leq y \leq 0.06$, $0.7 \leq x \leq 0.9$) which contains, as the base material, a $Sb_{70}Te_{30}$ alloy having a $Sb_{70}Te_{30}$ eutectic composition as a base and containing a large excess amount of Sb, and which further contains Ge. The amount of Ge is preferably at least 0.01, particularly preferably at least 0.02 as the value y in $Ge_y(Sb_xTe_{1-x})_{1-y}$. On the other hand, in the SbTe eutectic composition having such a large Sb content, if the amount of Ge is too much, a GeTe or GeSbTe type intermetallic compound is likely to precipitate, and also a SbGe alloy may precipitate, and thus, it is assumed that in the recording layer, crystal grains having different optical constants are present as mixed. And, by such mixed presence of crystal grains, noise of the recording layer may increase, and jitter may sometimes increase. Further, if Ge is added too much, the effect for the archival stability of amorphous marks will be saturated. Therefore, the amount of Ge is usually at most 0.06, preferably at most 0.05, more preferably at most 0.04, as the value of y in $Ge_y(Sb_xTe_{1-x})_{1-y}$.

In the above GeSbTe eutectic composition, it is particularly preferred to further incorporate In, Ga and/or Sn. Namely, it is particularly preferred to employ a composition represented by $M1_zGe_y(Sb_xTe_{1-x})_{1-y-z}$ ($0.01 \leq z \leq 0.4$, $0.01 \leq y \leq 0.06$, $0.7 \leq x \leq 0.9$, and M1 is at least one element selected from the group consisting of In, Ga and Sn). By adding at least one selected from a group of elements represented by In, Ga and Sn, as M1, the characteristics will be further improved. An element such as In, Ga or Sn is capable of increasing the optical contrast between the crystalline state and the amorphous state and also has an effect to reduce jitter. Here, z showing the content of M1 is usually at least 0.01, preferably at least 0.02, more preferably at least 0.05, and on the other hand, it is usually at most 0.15, preferably at most 0.1. Within this range, the above-mentioned effect for improvement of the characteristics will obtained satisfactorily.

In the above GeSbTe alloy containing In and Sn, $Ge_x(In_wSn_{1-w})_yTe_zSb_{1-x-y-z}$ may be mentioned as another preferred compositional range. Here, the content of Sb is larger than any one of the content of Ge, the content of In, the content of Sn and the content of Te, and x, y, z and w representing the atomic ratios, will satisfy the following (i) to (vi).

(i) $0 \leq x \leq 0.3$
(ii) $0.07 \leq y-z$
(iii) $w \times y - z \leq 0.1$
(iv) $0 < z$
(v) $(1-w) \times y \leq 0.35$
(vi) $0.35 \leq 1-x-y-z$ With the above recording layer composition, it becomes possible to carry out overwriting satisfactorily at a linear velocity of at least 20 m/s. Now, the relation between the contents of the respective elements in the above recording layer composition and the characteristics will be described in detail.

(Sb, Formula (vi))

The content of Sb is larger than any one of the content of Ge, the content of In, the content of Sn and the content of Te. Namely, the recording material of the present invention contains Sb as the main material. Specifically, the Sb content is at least 35 atomic % and larger than the content of any one of other elements contained. In order to sufficiently obtain the effects of the present invention, the Sb content is preferably at least 40 atomic %, more preferably at least 45 atomic %.

(Sn, Formulas (ii) and (v))

The influence which the Sn content gives to the reflectance in the crystalline state or the difference in reflectance between crystalline and amorphous states (signal amplitude), and the influence which the In content gives to the reflectance in the crystalline state or the difference in reflectance between crystalline and amorphous states (signal amplitude), are substantially equal. Therefore, in the above recording layer composition, either Sn or In is incorporated. And, the sum of the Sn content and the In content is made larger than the Te content within a certain range, whereby the reflectance of crystal or the signal amplitude can be increased. On the other hand, if the Te content becomes large, the reflectance of crystal or the signal amplitude will be low. Accordingly, in order to obtain the desired reflectance in the crystalline state and the signal amplitude, it becomes important to control the relation between the contents of Sn and/or In and the content of Te.

Therefore, the value of (y-z) in the above formula is at least 0.07, preferably at least 0.1, more preferably at least 0.13, particularly preferably at least 0.15. If the value of y becomes large, the optimum power tends to be small, such being desirable.

Further, if Sn is too much, the jitter characteristic tends to deteriorate. Accordingly, the value of $(1-w) \times y$ in the formula is at most 0.35, preferably at most 0.3. Accordingly, if Te is incorporated in a large amount, the sum of the In content and the Sn content is required to be large with a view to controlling the signal amplitude, but in consideration of the jitter characteristic, Sn can not be increased so much. Therefore, when the Te content is large, it is preferred to incorporate In in addition to Sn. Specifically, In may be incorporated in a case where the Te content is so large that Sn needs to be incorporated beyond 35 atomic % to suppress a decrease in the signal amplitude or the reflectance of crystal due to Te.

(In, Formula (iii))

By employing In, the reflectance in a crystalline state and the difference in reflectance between crystalline and amorphous states (signal amplitude) can be made large, and it is accordingly preferred to employ In as an element to be incorporated to the recording layer.

By employing In, there is a merit such that as compared with Sn, the influence to the jitter characteristic can be reduced, in addition to the merit that the reflectance in a crystalline state and the difference in reflectance between crystalline and amorphous states (signal amplitude) can be made large. It is considered that rather than Sn or Te, it has a function to lower noise at grain boundaries. On the other hand, In induces a decrease in reflectance during the storage for a long time, which is considered to be derived from the metastable crystalline state. Whereas, Te tends to suppress a decrease in reflectance during the storage for a long time. Accordingly, with a view to suppressing a decrease in reflectance of an optical information recording medium during the storage for a long time, it becomes important to make the In content and the Te content to satisfy a prescribed relation. Namely, in the above formula, the value of (the In content-the Te content) is adjusted to be within a prescribed range, whereby it will be possible to suppress a decrease in reflectance during the storage for a long time. Specifically, if the value of w×y−z in the above formula is small, the decreasing rate of the reflectance during the storage for a long time becomes small, and the value of w×y−z is therefore preferably at most 0.1, more preferably at most 0.05, further preferably at most 0. Here, w×y−z=0 means that the In content and the Te content are the same. Thus, it is further preferred in the present invention that the In content and the Te content are the same, or the In content is smaller than the Te content.

Thus, if it is attempted to minimize the decrease in reflectance during the storage for a long time, In can not be incorporated so much relative to Te. Therefore, in order to satisfy the above relation formula 0.07≦y−z, it is preferred to incorporate Sn in addition to In in the above recording layer composition. Specifically, if w×y−z<0.07, it becomes impossible to satisfy 0.07≦y−z unless Sn is incorporated in addition to In. Further, if the contents of In and Te are increased without incorporating Sn, it tends to be difficult to obtain a crystallization speed suitable for high speed recording. Also from this viewpoint, it is preferred to incorporate both In and Sn. Namely, it is preferred to set 0<w<1.

Further, if In is too much, the signal quality tends to deteriorate during the storage for a long time of the optical information recording medium. Further, if In is increased without incorporating Sn, a stable crystalline layer having a low reflectance which is observable with the In—Sb system, may appear. Therefore, the In content i.e. the value of w×y, is preferably at most 0.35.

(Te, Formula (iv))

In the above recording layer composition, Te is incorporated. Te is capable of improving repetitive recording durability. Therefore, the Te content is preferably made large to some extent, but, as mentioned above, it is necessary to control the relation between In and/or Sn, and Te, and the relation between In and Te, within the prescribed ranges. Specifically, z representing the content of Te in the above formula is made to be 0<z, preferably 0.01≦z, more preferably 0.05≦z, further preferably 0.08≦z, particularly preferably 0.1≦z, most preferably 00.1<z.

Usually, z representing the Te content becomes less than 0.29, but this is a value naturally determined by other relation formulas defined by the above general formulas. As mentioned above, it is preferred to make the contents of In and Te to be large to some extent, but since Te has a function to decrease the crystallization speed, z representing the Te content is made to be preferably at most 0.25, more preferably at most 0.20, in order to obtain a crystallization speed suitable for high speed recording.

(Ge, Formula (i))

Ge may be used to adjust the crystallization speed. Namely, Ge is not substantially related to such characteristics as the reflectance, the signal amplitude (the difference in reflectance between crystalline and amorphous states) and the decrease in reflectance during the storage of the medium for a long time. Therefore, Ge can be used to obtain a crystallization speed suitable for the recording conditions desired to be used. If Ge increases, the crystallization speed decreases. Accordingly, for example, with an optical information recording medium for higher speed recording, the Ge content may be reduced to adjust the crystallization speed. However, the crystallization speed is influenced by the contents of other elements. Namely, if Sn increases, the crystallization speed increases, and if In or Te increases, the crystallization speed decreases. Accordingly, it is preferred to carry out adjustment of the crystallization speed depending upon the recording conditions by adjusting the content of Ge, after deciding the content ratio of elements other than Ge taking the above-mentioned various characteristics into consideration. If the Ge content is too much, the crystallization speed tends to be too slow. Accordingly, x in the above formula is at most 0.3, preferably at most 0.25, more preferably at most 0.2. Further, the influence of the content to the crystallization speed is particularly large with Ge and Te.

Further, if the Ge content is large, when recorded amorphous marks are stored for a long period, the recorded amorphous marks before the storage tend to be hardly crystallized than after the storage. If this phenomenon becomes remarkable, when overwriting is carried out after storing the recorded optical information recording medium for a long period of time, the signal quality of overwritten signals tends to be inadequate. Namely, old marks after storage for a long period of time will not be sufficiently erased, whereby the signal quality of new record marks will be poor. This phenomenon of becoming hardly crystallizable is problematic only in recording for the first time after storage for a long period of time, and amorphous marks newly recorded after storage for a long time will have a normal crystallization speed. In any case, this phenomenon can be reduced by reducing the Ge content. In this sense, the smaller the Ge content, the better, and the value of x in the above formula is made to be particularly preferably at most 0.1, most preferably at most 0.07.

As mentioned above, Te or In has an effect to lower the crystallization speed. Accordingly, when the crystallization speed is to be lowered, to obtain the same crystallization speed, when the contents of Te and In are large, the Ge content can be made small. In this sense, the Te content i.e. the value z is preferably at least 0.05, more preferably at least 0.08, most preferably at least 0.1. Further, at that time, the In content i.e. the value of w×y, is preferably at least 0.05, more preferably at least 0.08. Further, as mentioned above, when the Te content is large, it is preferred to incorporate both In and Sn. Namely, in the most preferred composition, all of Ge, In, Sb, Sn and Te are incorporated.

On the other hand, if the Ge content is too small, the storage stability of amorphous marks tends to deteriorate, and they tend to crystallize during the storage for a long time. The storage stability of amorphous marks tends to be improved by increasing the amount of In, but the influence of Ge tends to be more strong. On the other hand, by the influence of other elements, there may be a case where the storage stability of amorphous marks is relatively good even if the Ge content is zero. Accordingly, the value of x in the above formula is at least 0, but preferably larger than 0, more preferably at least 0.01, further preferably at least 0.02.

In the above GeSbTe eutectic composition, as elements which may be incorporated other than In, Ga and Sn, nitrogen, oxygen and sulfur may be mentioned. These elements have an effect to prevent segregation in repetitive overwriting or to finely adjust the optical characteristics. The content of nitrogen, oxygen and sulfur is more preferably at most 5 atomic %, based on the total amount of Sb, Te and Ge.

Further, Sn, Cu, Zr, Hf, V, Nb, Ta, Cr and/or Co may be incorporated to the above GeSbTe eutectic composition. These elements have an effect to increase the crystallization temperature and to further improve the archival stability, without lowering the crystal growth rate, by their addition in a very small amount. However, if the amount of these elements is too much, archival segregation of a specific substance or segregation by repetitive overwriting is likely to take place. Accordingly, the amount of their addition is preferably at most 5 atomic %, particularly preferably at most 3 atomic %. If segregation takes place, amorphous stability which the recording layer initially has, the recrystallization speed, etc., may be changed, and the overwriting characteristics may be deteriorated.

On the other hand, as the SbGe eutectic composition being a composition containing Sb as the main component, a composition comprising, as the main component, a TeGeSb type having Te added to the SbGe eutectic, or a composition comprising, as the main component, an InGeSb type, GaGeSb type or SnGeSb type ternary alloy having In, Ga or Sn added to the SbGe eutectic, may be mentioned. By adding Te, In, Ga or Sn to the SbGe eutectic alloy, the effect to increase the difference in the optical characteristics between the crystalline state and the amorphous state can be made distinct. It is particularly preferred to add Sn.

As a preferred composition of such a SbGe eutectic alloy, $Te_\gamma M2_\delta$ $(Ge_\epsilon Sb_{1-\epsilon})$ (wherein $0.01 \leq \epsilon \leq 0.3$, $0 \leq \delta \leq 0.3$, $0 \leq \gamma \leq 0.1$, $2 \leq \delta/\gamma$, $0 < \delta+\gamma \leq 0.4$, and M2 is one selected from the group consisting of In, Ga and Sn) may be mentioned. By adding In, Ga or Sn to the SbGe eutectic alloy, the effect to increase the difference in the optical characteristics between the crystalline state and the amorphous state can be made remarkable.

By using In or Ga as element M2, jitter in ultrahigh speed recording will be improved, and it becomes possible to increase the optical contrast. For this purpose, $\delta$ representing the content of In and/or Ga is usually at least 0, preferably at least 0.01, more preferably at least 0.05. However, if In or Ga is excessive, separately from the crystalline phase to be used as an erased state, other crystalline phases of In—Sb type or Ga—Sb type having a very low reflectance may sometimes be formed. Accordingly, $\delta$ is made to be usually at most 0.3, preferably at most 0.2. Further, when In and Ga are compared, lower jitter can be realized with In, and In is accordingly preferred as the above M2.

On the other hand, by using Sn as element M2, jitter at ultrahigh speed recording can be improved, and it becomes possible to take a large optical contrast (the difference in reflectance between the crystalline state and the amorphous state). For this purpose, $\delta$ showing the content of Sn is usually at least 0, preferably at least 0.01, more preferably at least 0.05. However, if Sn is excessive, an amorphous phase immediately after recording may sometimes change to another amorphous phase having a low reflectance. Especially when stored for a long time, such a stabilized amorphous phase tends to precipitate to deteriorate the erasing performance. Accordingly, $\delta$ is made to be usually at most 0.3, preferably at most 0.2.

It is possible to employ plural elements among In, Ga and Sn, as element M2, but it is particularly preferred to incorporate In and Sn. When In and Sn are to be incorporated, the total content of these elements is made to be usually at least 1 atomic %, preferably at least 5 atomic % and usually at most 40 atomic %, preferably at most 30 atomic %, more preferably at most 25 atomic %.

In the above TeM2GeSb type composition, it becomes possible to improve the archival change of the erasing ratio in ultrahigh speed recording. For this purpose, y representing the content of Te is made to be usually at least 0, preferably at least 0.01, particularly preferably at least 0.05. However, if Te is excessive, noise may sometimes becomes high, and y is made to be usually smaller than 0.1.

Further, in the above TeM2GeSb type composition, when Te and element M2 are to be incorporated, it is effective to control their total content. Accordingly, $\delta+\gamma$ representing the content of Te and element M2, is made to be usually larger than 0, preferably at least 0.01, more preferably at least 0.05. By adjusting $\delta+\gamma$ within the above range, it becomes possible to effectively obtain the effect of incorporating Te and element M2 simultaneously. On the other hand, in order to effectively obtain the effect of using the GeSb type eutectic alloy as the main component, $\delta+y$ is made to be usually at most 0.4, preferably at most 0.35, more preferably at most 0.3. On the other hand, $\delta/\gamma$ representing the atomic ratio of element M2 to Te is made to be preferably at least 2. By incorporating Te, the optical contrast tends to be low, and accordingly, when Te is incorporated, it is preferred to increase the content of element M2 to some extent (to increase 5 to some extent).

As elements which may be added to the above TeM2GeSb type composition, Au, Ag, Pd, Pt, Si, Pb, Bi, Ta, Nb, V, Mo, a rare earth element, N, 0, etc. may be mentioned, and they are used for e.g. fine adjustment of the optical characteristics or the crystallization speed, but their amount to be added is about 10 atomic % at the maximum.

In the foregoing, one of the most preferred compositions is a composition containing, as the main component, an alloy type represented by $In_p Sn_q Te_r Ge_s Sb_t$ ($0 \leq p \leq 0.3$, $0 \leq q \leq 0.3$, $0 < p+q \leq 0.3$, $0 \leq r < 0.1$, $0 < s \leq 0.2$, $0.5 \leq t \leq 0.9$, and $p+q+r+s+t=1$). In a case where Te, and In and/or Sn, are used in combination, it is preferred to set $(p+q)/r \geq 2$.

The thickness of the recording layer is preferably at least 5 nm in order to obtain a sufficient optical contrast and to accomplish recording or erasing in a short time by increasing the crystallization speed. Further, in order to make the reflectance sufficiently high, it is more preferably at least 10 nm.

On the other hand, in order to avoid cracking and at the same time to obtain a sufficient optical contrast, the thickness of the recording layer is made to be preferably at most 100 nm, more preferably at most 50 nm. This is to reduce the heat capacity and to increase the recording sensitivity. Further, within the above range, it is possible to minimize the volume change due to a phase change, whereby it is possible to minimize the influence of the repetitive volume change by repetitive overwriting to the upper and lower protective layers. Consequently, accumulation of irreversible microscopic deformations can be suppressed, noise will be reduced, and repetitive overwriting durability will be improved.

With a high density recording medium such as rewritable DVD, the requirement against noise is severer, and accordingly, the thickness of the recording layer is made to be more preferably at most 30 nm.

The above recording layer is usually obtained by DC or RF sputtering of a prescribed alloy target in an inert gas, particularly Ar gas.

Further, the density of the recording layer is usually at least 80%, preferably at least 90%, of the bulk density. Here, as the bulk density p, the approximate value represented by the following formula (1) is usually employed, but it is also possible to actually measure it by preparing a bulk of the alloy composition constituting the recording layer.

$$\rho = \Sigma m_i \rho_i \quad (1)$$

(Wherein $m_i$ is the mol concentration of each element i, and $m_i \rho_i$ is the atomic weight of an element i.)

In the sputtering deposition method, it is possible to increase the density of the recording layer by increasing the amount of high energy Ar irradiated to the recording layer, by reducing the pressure of the sputtering gas (usually a rare gas such as Ar, and the following description will be made with reference to the case of Ar) during the deposition, or by placing the substrate closely in front of the target. The high energy Ar is either one where Ar ions irradiated to the target for sputtering are partly bounced back and reach the substrate, or one where Ar ions in the plasma are accelerated by a sheath voltage over the entire surface of the substrate and reach the substrate.

Such an effect of irradiation with a high energy rare gas is referred to as an atomic peening effect. In sputtering with an Ar gas which is commonly used, Ar will be incorporated into the sputter film by the atomic peening effect. Accordingly, by the amount of Ar in the film, the atomic peening effect can be estimated. Namely, the smaller the amount of Ar, the less the high energy Ar irradiation effect, and a film having a low density tends to be formed.

On the other hand, if the amount of Ar is large, irradiation with high energy Ar becomes vigorous, whereby the density of the film will be high, but Ar included in the film tends to precipitate as void at the time of repetitive overwriting and tends to deteriorate the repetitive overwriting durability. Accordingly, discharge is usually carried out under a proper pressure within a range of from $10^{-2}$ to $10^{-1}$ Pa order.

(3) Other Layers (Protective Layer)

To prevent evaporation or deformation due to the phase change of the recording layer and to control the thermal diffusion at that time, a protective layer is usually formed on one side or each side, preferably on each side, of the recording layer. The material for the protective layer is determined in consideration of the refractive index, thermal conductivity, chemical stability, mechanical strength, adhesion, etc. Usually, a dielectric, such as an oxide, sulfide, nitride or carbide of a metal or semiconductor, or a fluoride of Ca, Mg, Li or the like, which has high transparency and a high melting point, may be used.

In such a case, such an oxide, sulfide, nitride, carbide or fluoride may not necessarily take a stoichiometrical composition, and it is effective to control the composition or to use them in admixture in order to control the refractive index, etc. When repetitive recording characteristics are taken into consideration, a mixture of dielectrics is preferred. More specifically, a mixture of a chalcogen compound such as ZnS or a rare earth sulfide with a heat resistant compound such as an oxide, nitride, carbide or fluoride, may be mentioned. For example, a mixture of heat resistant compounds containing ZnS as the main component, or a mixture of heat resistant compounds containing a rare earth sulfate, particularly $Y_2O_2S$, as the main component, is an example of the preferred protective layer composition.

As the material for the protective layer, dielectric materials may usually be mentioned. The dielectric materials may, for example, be oxides of Sc, Y, Ce, La, Ti, Zr, Hf, V, Nb, Ta, Zn, Al, Cr, In, Si, Ge, Sn, Sb, Te, etc., nitrides of Ti, Zr, Hf, V, Nb, Ta, Cr, Mo, W, Zn, B, Al, Ga, In, Si, Ge, Sn, Sb, Pb, etc., carbides of Ti, Zr, Hf, V, Nb, Ta, Cr, Mo, W, Zn, B, Al, Ga, In, Si, etc., or mixtures thereof. Further, the dielectric materials may, for example, be sulfides, selenides or tellurides of Zn, Y, Cd, Ga, In, Si, Ge, Sn, Pb, Sb, Bi, etc., fluoride of Mg, Ca, Li, etc., or mixtures thereof.

Further, specific examples of such dielectric materials may be $ZnS-SiO_2$, SiN, GeN, $SiO_2$, $TiO_2$, CrN, $TaS_2$ and $Y_2O_2S$. Among these materials, $ZnS-SiO_2$ is widely used in view of the deposition speed, the small film stress, the small volume change due to the temperature change and the excellent weather resistance. In a case where $ZnS-SiO_2$ is employed, the compositional ratio of ZnS to $SiO_2$ i.e. $ZnS:SiO_2$, is usually from 0:1 to 1:0, preferably from 0.5:0.5 to 0.95:0.05, more preferably from 0.7:0.3 to 0.9:0.1. Most preferably, $ZnS:SiO_2$ is 0.8:0.2.

More specifically, a composite dielectric containing from 50 mol % to 90 mol % of a sulfide or sulfate of a rare earth such as La, Ce, Nd or Y, or a composite dielectric containing from 70 mol % to 90 mol % of ZnS or $TaS_2$, is preferred.

In consideration of the repetitive recording characteristics, the film density of the protective layer is preferably at least 80% of the bulk state from the viewpoint of the mechanical strength. When a mixture of dielectrics is to be used, the theoretical density represented by the above formula (1) is employed as the bulk density.

The thickness of the protective layer is usually at least 1 nm and at most 500 nm. With the thickness of at least 1 nm, the effect for preventing deformation of the substrate or the recording layer can adequately be secured, and the role as the protective layer can adequately be performed. Further, with the thickness of at most 500 nm, while adequately performing the role as the protective layer, it is possible to prevent cracking due to a remarkable increase of the internal stress of the protective layer itself or the difference in the elastic characteristics from the substrate.

Especially when a first protective layer is to be provided which is located on the laser beam incident side of the recording layer, the first protective layer is required to suppress deformation of the substrate due to heat, and its thickness is accordingly made to be usually at least 1 nm, preferably at least 5 nm, more preferably at least 10 nm, more preferably at least 20 nm, particularly preferably at least 40 nm. In this manner, it is possible to suppress accumulation of microscopic deformations of the substrate during the repetitive recording, and it is possible to avoid a remarkable increase of noise due to scattering of the retrieving laser beam.

On the other hand, the thickness of the first protective layer is usually at most 400 nm, preferably at most 300 nm, more preferably at most 200 nm, further preferably at most 150 nm, particularly preferably at most 100 nm, from the relation to the time required for deposition of the film. In this way, it becomes possible to avoid a change in the shape of the groove of the substrate as viewed from the plane of the recording layer. Namely, it is possible to suppress a phenomenon such that the depth or width of the groove becomes smaller than the shape intended on the substrate surface.

On the other hand, when a second protective layer is to be provided which is located on the side opposite to the laser beam incident side as viewed from the recording layer, the second protective layer usually has a thickness of at least 1 nm, preferably at least 5 nm, more preferably at least 10 nm, further preferably at least 15 nm, to suppress deformation of the recording layer. Further, it is preferably at most 200 nm, more preferably at most 150 nm, further preferably at most 100 nm, still further preferably at most 60 nm, particularly preferably at most 50 nm, most preferably at most 30 nm, to prevent accumulation of microscopic plastic deformations in the upper protective layer formed along repetitive recording and to suppress an increase of noise due to scattering of the retrieving laser beam.

Further, the protective layer may be formed to have a multilayer structure.

Further, the thicknesses of the recording layer and the protective layer are selected so that the efficiency for absorption of the laser beam will be good and the amplitude of recording signals will be large i.e. the contrast between the recorded state and the non-recorded state will be large, taking into consideration the interference effect due to the multilayer structure in addition to the restrictions from the aspects of the mechanical strength and reliability.

The protective layer is usually formed by sputtering, and the total amount of impurities including the amount of impurities in the target itself, and the amounts of moisture and oxygen to be included during deposition of the film, is made to be preferably less than 2 atomic %. For this purpose, the ultimate vacuum degree of the process chamber is set to be preferably less than $1\times10^{-3}$ Pa at the time of forming the protective layer by sputtering.

(Reflective Layer)

In an optical recording medium, a reflective layer may further be provided. The position at which the reflective layer is to be provided, usually depends on the incident direction of the retrieving laser beam, and it is provided on the opposite side of the recording layer to the incident side. Namely, when the retrieving laser beam is permitted to enter from the substrate side, it is common to provide a reflective layer on the opposite side of the recording layer to the substrate, and when the retrieving laser beam is permitted to enter from the recording layer side, it is common to provide a reflective layer between the recording layer and the substrate.

The material to be used for the reflective layer is preferably a material having a high reflectance, particularly preferably a metal such as Au, Ag or Al whereby a heat dissipating effect can also be expected. The heat dissipating performance is determined by the film thickness and the thermal conductivity, and the thermal conductivity is substantially proportional to the volume resistivity with these metals. Accordingly, the heat dissipation performance may be represented by the sheet resistivity. The sheet resistivity is usually at least 0.05 Ω/□, preferably at least 0.1 Ω/□ and on the other hand, usually at most 0.6 Ω/□, preferably at most 0.5 Ω/□.

This guarantees that the heat dissipation performance is particularly high and is required to suppress recrystallization to some extent in a case where competition between amorphous transformation and recrystallization is remarkable in the formation of amorphous marks, like the composition to be used for the above recording layer. In order to control the thermal conductivity of the reflective layer itself or to improve the corrosion resistance, Ta, Ti, Cr, Mo, Mg, V, Nb, Zr, Si, etc. may be added in a small amount to the above metal. The amount of such addition is usually at least 0.01 atomic % and at most 20 atomic %.

The material for the reflective layer suitable for the present invention will be described more specifically. An Al alloy may be mentioned which contains at least one element selected from the group consisting of Ta, Ti, Co, Cr, Si, Sc, Hf, Pd, Pt, Mg, Zr, Mo and Mn, in Al. Such an alloy has an improved hillock resistance, and accordingly, may be employed taking the durability, volume resistivity, the deposition speed, etc. into consideration. The content of the above-mentioned element is usually at least 0.1 atomic %, preferably at least 0.2 atomic % and on the other hand, usually at most 2 atomic %, preferably at most 1 atomic %. With respect to the Al alloy, if the amount of the added impurities is too small, the hillock resistance tends to be inadequate in many cases, although such depends also on the film deposition conditions. On the other hand, if it is too large, an adequate heat dissipating effect tends to be hardly obtainable.

As a specific example of the aluminum alloy, an aluminum alloy containing at least 15 atomic % of at least one of Ta and T1 is excellent in corrosion resistance and is a material for a reflective layer which is particularly preferred to improve the reliability of the optical recording medium.

As a preferred example of the material for the reflective layer, pure Ag, or an Ag alloy containing at least one element selected from the group consisting of Ti, V, Ta, Nb, W, Co, Cr, Si, Ge, Sn, Sc, Hf, Pd, Rh, Au, Pt, Mg, Zr, Mo, Cu, Zn, Mn and a rare earth element, in Ag, may be mentioned. In a case where the archival stability is more important, Ti, Mg or Pd is preferred as the additive component. The content of the above element is usually at least 0.01 atomic %, preferably at least 0.2 atomic % and on the other hand, usually at most 10 atomic % preferably at most 5 atomic %.

Especially, an Ag alloy containing at least 0.01 atomic % and at most 10 atomic % of at least one of Mg, Ti, Au, Cu, Pd. Pt, Zn, Cr, Si, Ge and a rare earth element, in Ag, is preferred, since the reflectance and the thermal conductivity are high, and the heat resistance is also excellent.

Further, in a case where the thickness of the above protective layer is at least 40 nm and at most 50 nm, in order to let the reflective layer have a high thermal conductivity, it is particularly preferred that the additive element contained is made to be at most 2 atomic %.

As the material for the reflective layer, particularly preferred is one containing Ag as the main component, and most preferred is pure Ag. The reason why it is preferred to contain Ag as the main component, is as follows. Namely, if record marks stored for a long time are re-recorded, a phenomenon may sometimes occur such that the recrystallization speed of the phase change recording layer increases only in the first recording immediately after the storage. The reason why such a phenomenon takes place, is not understood. However, it is considered that by the increase of the recrystallization speed of the recording layer immediately after the storage, the size of amorphous marks formed by the first recording immediately after the storage tends to be smaller than the desired size of the marks. Accordingly, in a case where such a phenomenon takes place, Ag having a very high heat dissipating performance may be used for the reflective layer to increase the cooling speed of the recording layer thereby to suppress recrystallization of the recording layer during the first recording immediately after the storage, whereby it becomes possible to maintain the size of amorphous marks at the desired size.

The thickness of the reflective layer is usually at least 10 nm, preferably at least 20 nm, more preferably at least 40 nm, further preferably at least 50 nm, in order to completely reflect the incident light without transmitted light. Further, even if the thickness is so much, there will be no change in the heat dissipating effect, and the productivity tends to be poor, or cracking is likely to take place. Accordingly, the thickness is usually at most 500 nm, preferably at most 400 nm, more preferably at most 300 nm, further preferably at most 200 nm.

Further, the reflective layer is usually formed by a sputtering method or a vacuum vapor deposition method, whereby it is preferred that the total amount of impurities including the amount of impurities in the target or the vapor deposition material itself and the amounts of moisture and oxygen to be included during deposition of the film, is preferably less than 2 atomic %. For this purpose, at the time of forming the reflective layer by sputtering, it is preferred to bring the ultimate vacuum degree of the process chamber to less than $1 \times 10^3$ Pa.

Further, if deposition is carried out at an ultimate vacuum degree poorer than 104 Pa, the deposition rate is adjusted to be at least 1 nm/sec., preferably at least 10 nm/sec., to prevent inclusion of impurities. Or, in a case where an intentional additive element is contained in an amount larger than 1 atomic %, the deposition rate is preferably adjusted to be at least 10 nm/sec. to prevent inclusion of additional impurities as far as possible.

In order to obtain a still higher thermal conductivity and high reliability, it is effective to make the reflective layer to have a multilayer structure. In such a case, at least one layer is preferably made of the above material having a thickness of at least 50% of the total reflective layer thickness. It is so constructed that this layer substantially governs the heat dissipating effect, and other layers contribute to the corrosion resistance, the adhesion to the protective layer and improvement of the hillock resistance. Particularly in a case where a reflective layer made of pure Ag or containing Ag as the main component, is provided in contact with a protective layer containing e.g. ZnS containing sulfur, in order to prevent corrosion by a reaction of Ag with sulfur, it is common to provide an interface layer containing no sulfur, such an interface layer is preferably made of a metal functioning as a reflective layer. The material for such an interface layer, Ta or Nb may be mentioned.

It is preferred to carry out deposition in an in-line apparatus having a target for the recording layer, a target for the protective layer and, if necessary, a target for the reflective layer material, set in the same vacuum chamber with a view to preventing oxidation or contamination between the respective layers. Further, such is excellent also from the viewpoint of the productivity.

(Protective Coating Layer)

On the outermost surface side of the optical recording medium, it is preferred to provide a protective coating layer made of an ultraviolet curable resin or a thermosetting resin to prevent scratching by contact with a foreign matter. The protective coating layer usually has a thickness of from 1 μm to a few hundreds μm. Further, it is also possible to provide a dielectric protective layer having a high hardness or to further provide a resin layer thereon.

(Others)

Here, the medium has been described with reference to one having a one layer structure such as CD-RW as an example, and it is not limited thereto, and the present invention is applicable to ones having other structures (such as one having a double layer structure or a higher multilayer structure, and one having a double layer structure of one side incident type or both sides incident type).

EXAMPLES

Now, the present practical mode will be described in further detail with reference to Examples. However, the present practical mode is by no means restricted by the following Examples.

Basic Example

A polycarbonate resin substrate having a thickness of 0.6 mm and having a track pitch of 0.74 μm, was formed by injection molding. The groove width was about 0.31 μm, and the depth was about 28 nm. Each of groove shapes was determined by an optical diffraction method of U groove approximation using a He—Cd laser beam having a wavelength of 441.6 nm. To the groove wobble, address information by ADIP was further imparted by phase modulation.

Then, on the substrate, a lower protective layer, a phase change type recording layer, an upper protective layer, a reflective layer and an ultraviolet-curable resin layer were formed in this order. Deposition of the respective layers was carried out by sequential deposition by sputtering on the substrate without breaking the vacuum. However, the ultraviolet-curable resin layer (thickness of about 4 μm) was coated by spin coating. Thereafter, a non-deposited substrate having a thickness of 0.6 mm was bonded by an adhesive so that the above recording layer side was located inside.

Immediately after the deposition, the recording layer was amorphous. Therefore, by irradiating the recording layer with a laser beam having a wavelength of about 810 nm and focused into an oval shape having a major axis of about 75 μm and a minor axis of about 1.0 μm, the entire surface was crystallized to obtain an initial (unrecorded) state. This initializing step was carried out by selecting the linear velocity and the initialization power within proper ranges, in order to make the recording characteristics after the initial crystallization satisfactory.

With respect to the thickness of each layer, the deposition rate was accurately measured, and then the thickness was controlled by the sputtering time. The composition of the recording layer was determined by correcting the fluorescent intensities of the respective elements obtained by a fluorescent X-ray analysis by the absolute composition separately obtained by a chemical analysis (atomic absorption spectrometry).

Recording/retrieving evaluation was carried out by means of DDU1000 tester manufactured by Pulsteck Co. (wavelength: about 650 nm, NA=0.65, spot shape: a circular form of about 0.86 μm with an intensity of $1/e^2$, hereinafter this tester will be referred to as tester 1) to form amorphous marks in the recording layer after the initial crystallization. On the basis of the reference linear velocity of 3.49 m/s of DVD being 1-time velocity, overwriting characteristics at a velocity of at least 4-times velocity were evaluated. The reference clock period of data at each linear velocity was one inversely proportionated at each linear velocity against the reference clock period 38.2 nsec of data at 1-time velocity.

Unless otherwise specified, retrieving was carried out at 1-time velocity. The output signal from DDU1000 was passed through a high frequency-passing filter having a cutoff at between 5 and 20 kHz, whereupon the jitter was measured by a time interval analyzer (manufactured by Yokogawa Electric Corporation). Modulation $m_{14}$ $(=I_{14}/I_{top})$ was read out by an inspection of the eye pattern on an oscilloscope. Here, $m_{14}$ is a value obtained by dividing the signal amplitude 114 by the upper end value of the eye pattern ($I_{top}$ corresponding to the high reflectance in the erased state).

EFM+ random data were overwritten ten times, whereupon the data to clock jitter of the recorded data (hereinafter, one normalized by the reference clock period T and represented by % will be referred to simply as jitter), the modulation $m_{14}$, $R_{top}$ and the asymmetry value were measured. Unless otherwise specified, evaluation of the overwriting characteristics was carried out after overwriting ten times on a single track (writing for the first time in an unrecorded state, followed by overwriting nine times on the same track).

Formation of a logic level to control the recording pulse division method was carried out by means of an arbitrary signal generator (AWG710, manufactured by Sony Tektronix Co.). From the above signal generator, 2 channel gate signals comprising a logic signal corresponding generally to one having G1, G2 and G3 in FIG. 3 integrated and a logic signal corresponding to G4, were taken out and, as ECL level logic signals, input as gate signals for a laser driver of the above tester.

Example 1 and Comparative Example 1

In the above Basic Example, a disk was prepared and recording was carried out as follows.

On a substrate, about 70 nm of a lower protective layer made of $(ZnS)_{80}(SiO_2)_{20}$ (the protective layer composition represented by mol % of ZnS and $SiO_2$, the same applies hereinafter), about 13 nm of a recording layer made of a $Ge_4In_{11}Sn_{22}Sb_{52}Te_{11}$ alloy (the recording layer composition being represented by atomic %, the same applies hereinafter), about 14 nm of an upper protective layer made of $(ZnS)_{80}(SiO_2)_{20}$, about 2 nm of an interface layer made of Ta, and about 200 nm of a reflective layer made of Ag, were formed in this order by sputtering.

For the initialization, a laser diode beam having a wavelength of about 810 nm and having an oval spot shape having a major axis of about 75 μm and a minor axis of about 1.0 μm, was used. And, the initialization was carried out by scanning at a linear velocity of about 24 m/s in a state such that the minor axis of this laser diode beam was aligned in the circumferential direction and moving the major axis in the radial direction by about 50 μm every one rotation. The irradiation power was about 1,500 mW.

On this disk, by means of the tester 1 with NA=0.65, overwriting of DVD compatible EFM+ modulation signal was carried out at 10-times velocity, and the characteristics were evaluated. While maintaining erasing power Pe and bias power Pb to be constant, Pw was varied every 1 mW from about 20 mW to about 30 mW, whereby the overwriting characteristics at the respective writing powers were evaluated. Each was evaluated by the value after overwriting ten times.

FIG. 10 shows divided recording pulses for the respective mark lengths used in the "3T strategy" shown in Example 1. In FIG. 10, the values of $\alpha_i$ and $\beta_i$ in each mark length are represented by the upper ruled column and the lower ruled column, respectively, in FIG. 10. These values are ones selected to minimize the jitter, by carrying out optimization of the respective parameter values by every $(1/15)T$ of the reference clock period T, and accordingly represented by the values having 15 as the denominator.

The recording pulse strategy shown in FIG. 10 corresponds to the recording pulse division method (IIa) shown in FIG. 4. Table 1 shows this as represented by means of independent parameters defined in FIGS. 4 and 5. As shown in Table 1, $T_{c1+}=T_{c1-}=T_{c1}$, and $dT_{top}=0$, and accordingly, the number of independent parameters is 19 in total.

TABLE 1

| dTtop3 | 0 |
| dTtop4 | 1/15T |

TABLE 1-continued

| dTtop5 | −2/15T |
| Ttop3 | 20/15T |
| Ttop4 | 25/15T |
| Ttop5 | 20/15T |
| Ttop | 20/15T |
| Tmp | 20/15T |
| dTlast5 | −7/15T |
| dTlast− | −5/15T |
| dTlast+ | 5/15T |
| Tlast5 | 17/15T |
| Tlast− | 16/15T |
| Tlast | 21/15T |
| Tlast+ | 30/15T |
| Tcl3 | 12/15T |
| Tcl4 | 21/15T |
| Tcl5 | 11/15T |
| Tcl = Tcl+ = Tcl− | 11/15T |

FIG. 11 shows divided recording pulses for the respective mark lengths used in the "2T strategy" shown as Comparative Example 1. In FIG. 11, the values of $\alpha_i$ and $\beta_i$ in each mark length are represented by the upper ruled column and the lower ruled column, respectively, in FIG. 11. From FIG. 11, it is evident that since the divided pulse method is the "2T strategy", in all record marks with m=at least 2, n/m is less than 2.5 except for the case of n=5, i.e. in the "2T strategy" with respect to all record marks with m=at least 2, $2.5 \leq n/m$ is not satisfied.

Figure 12:
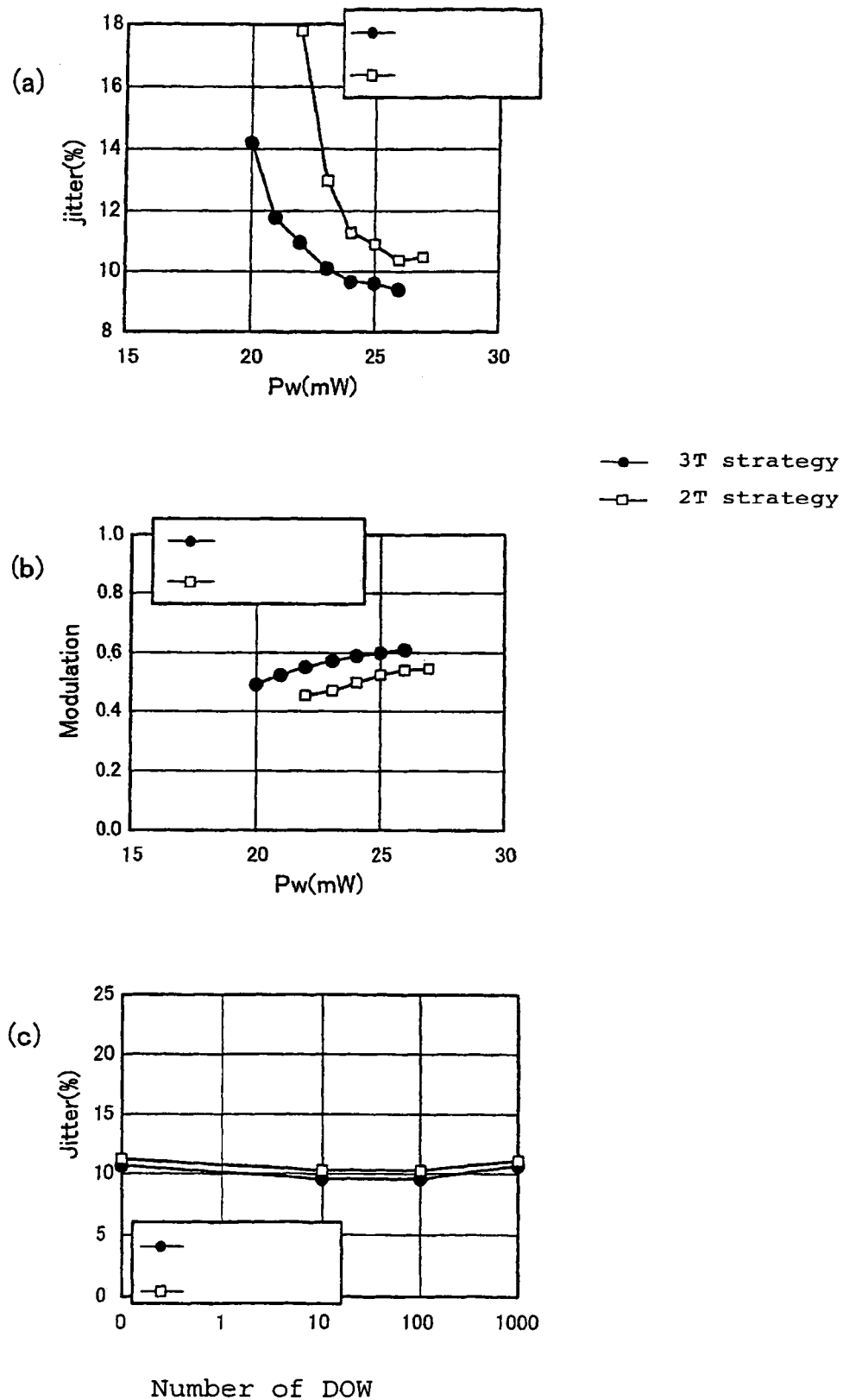
FIGS. 12(*a*) and (*b*) are graphs showing the writing power dependency of jitters and the modulation after nine times of overwriting in Example 1 and Comparative Example 1, and FIG. 12(*c*) is a graph showing the overwriting times dependency of jitters.

FIGS. 12(a) and (b) are graphs showing the writing power dependency of the jitter and the modulation after overwriting nine times (writing ten times including the first writing) in Example 1 (3T strategy) and Comparative Example 1 (2T strategy). Further, FIG. 12(c) is a graph showing the dependency on the number of overwriting times of jitter in the repetitive overwriting (direct overwriting DOW). The abscissa of FIG. 12(c) is the number of overwriting times (the number of DOW times), and 0 time is the first writing on the disk in a non-recorded state.

In the measurements of the writing power dependency in FIGS. 12(a) and (b), Pe is constant i.e. in the "3T strategy", Pe=6.0 mW, and in the "2T strategy", Pe=5.7 mW. Further, in FIG. 12(c), in the "3T strategy", the measurement was carried out with Pw=24 mW and Pe=6.0 mW, and in the "2T strategy", the measurement was carried out with Pw=26 mW and Pe=5.7 mW. In each case, Pb=0.8 mW being constant.

From FIGS. 12(a) and (b), it is evident that in the "3T strategy" in Example 1, as compared with the "2T strategy" of Comparative Example 1, the jitter is low, and a high value is obtainable for the modulation. It is evident that by using the "3T strategy", good recording characteristics are obtained with a jitter value of at most 10% and a modulation of at least 0.55. Further, the writing power to obtain good characteristics is also lower by the "3T strategy", and the recording sensitivity is also improved.

Example 2 and Comparative Example 2

On the disk as used in Example 1, by means of the tester 1 with NA=0.65, overwriting of DVD compatible EFM+ modulation signal was carried out at 4-times velocity, and the characteristics were evaluated.

FIG. 13 shows the divided recording pulses for the respective mark lengths used for the "3T strategy" as Example 2. In FIG. 13, the values of $\alpha_i$ and $\beta_i$ in each mark length are represented by the upper ruled column and the lower ruled column, respectively, in FIG. 13. These values were ones selected to minimize the jitter value by carrying out optimization of the respective parameter values by every ($1/15$)T of the reference clock period T, and thus represented by the values having 15 as the denominator.

The recording pulse strategy shown in FIG. 13 correspond to the recording pulse division method (VIa) wherein the recording pulse division method (IIa) shown in FIG. 4 is applied at a low linear velocity. Table 2 shows this as represented by means of independent parameters defined in FIGS. 4 and 5. As shown in Table 2, $T_{c1+}=T_{c1-}=T_{c1}$, and $dT_{top}=0$, and accordingly, the number of independent parameters is 19 in total.

TABLE 2

| dTtop3 | −1/15T |
|---|---|
| dTtop4 | 1/15T |
| dTtop5 | −2/15T |
| Ttop3 | 7/15T |
| Ttop4 | 11/15T |
| Ttop5 | 7/15T |
| Ttop | 7/15T |
| Tmp | 7/15T |
| dTlast5 | −12/15T |
| dTlast− | −13/15T |
| dTlast+ | 7/15T |
| Tlast5 | 6/15T |
| Tlast− | 6/15T |
| Tlast | 7/15T |
| Tlast+ | 11/15T |
| Tcl3 | 32/15T |
| Tcl4 | 40/15T |
| Tcl5 | 34/15T |
| Tcl = Tcl− = Tcl+ | 34/15T |

FIG. 14 shows divided recording pulses for the respective mark lengths used in the "2T strategy" shown as Comparative Example 2. In this case, optimization of the parameter value is carried out by every ($1/16$)T. In FIG. 14, the values of $\alpha_i$ and $\beta_i$ in each mark length, are represented by the upper ruled column and the lower ruled column, respectively, in FIG. 14. As is evident from FIG. 14, the divided pulse method is "2T strategy", whereby in all record marks with m=at least 2, n/m is less than 2.5 except for the case of n=5. Namely, it is evident that in the "2T strategy" in all record marks with m=at least 2, $2.5 \leq n/m \leq 5$ is not satisfied.

Figure 15:
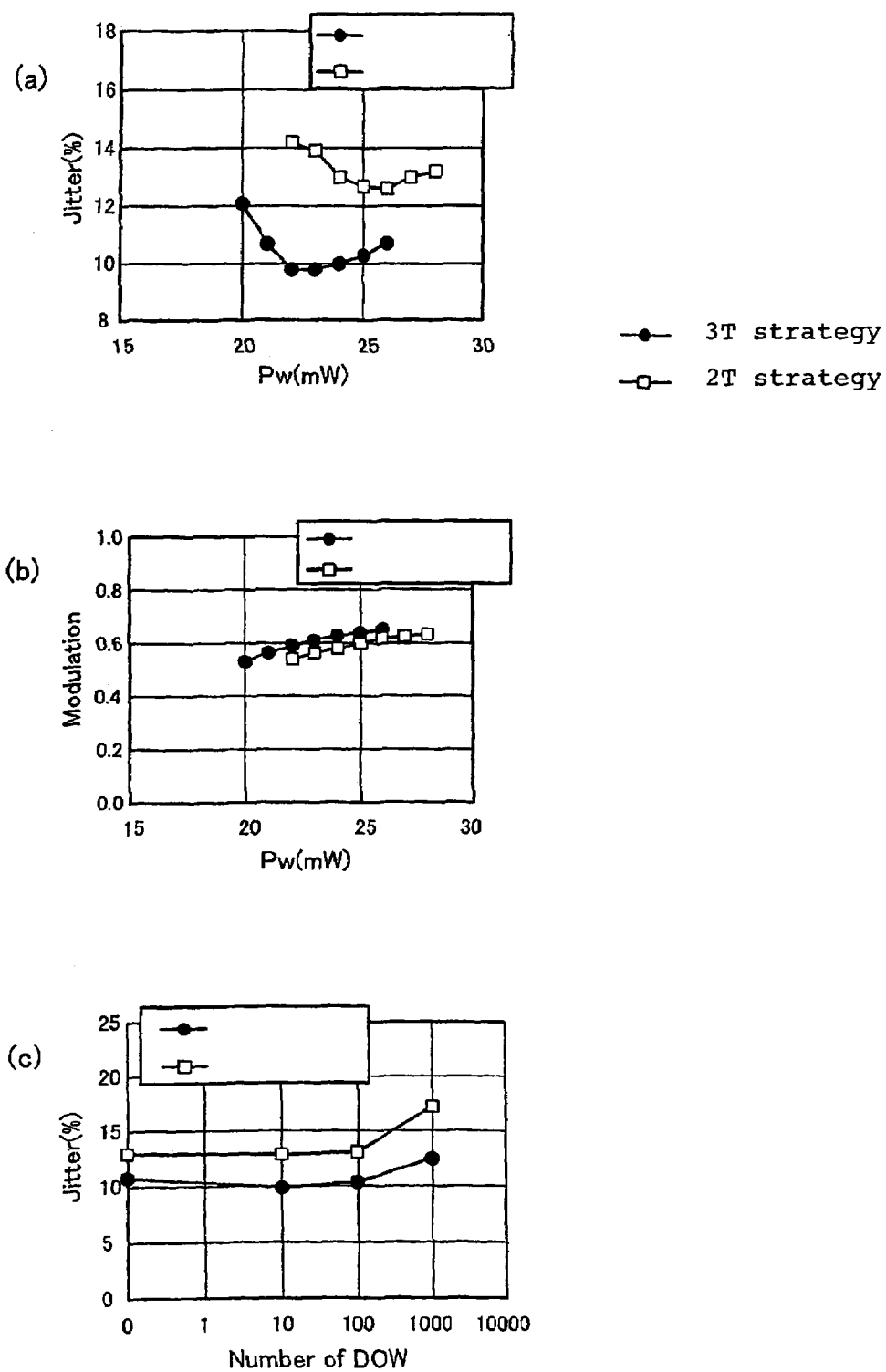
FIGS. 15(*a*) and (*b*) are graphs showing the writing power dependency of jitters and modulation after nine times of overwriting in Example 2 and Comparative Example 2, and FIG. 15(*c*) is a graph showing the overwriting times dependency of jitters.

FIGS. 15($a$) and ($b$) are graphs showing the writing power dependency of the jitter and the modulation after overwriting nine times (writing ten times including the first writing) in Example 2 (3T strategy) and Comparative Example 2 (2T strategy). Further, FIG. 15($c$) is a graph showing the dependency of the jitter on the number of overwriting times. In the measurements of the writing power dependency in FIGS. 15($a$) and ($b$), Pe is constant i.e. in the "3T strategy", Pe=6 mW, and in the "2T strategy", Pe=7 mW. Further, in FIG. 15($c$), in the "3T strategy", the measurement was carried out with Pw=22 mW and Pe=6 mW, and in the "2T strategy", the measurement was carried out with Pw=26 mW and Pe=7 mW. In each case, Pb=0.5 mW being constant.

By the "3T strategy" in Example 2, as compared with the "2T strategy" of Comparative Example 2, the jitter is substantially low, and a high value is obtainable for the modulation. It is evident that by using the "3T strategy", good recording characteristics are obtained with a jitter value of about 10% and a modulation of at least 0.6. Further, the writing power to obtain the good characteristics is also lower by the "3T strategy", and the recording sensitivity is also improved.

Example 3 and Comparative Example 3

In the above-described Basic Example, a disk was prepared and recording was carried out as follows.

On a substrate, about 80 nm of a lower protective layer made of $(ZnS)_{80}(SiO_2)_{20}$, about 13 nm of a recording layer made of a $Ge_8In_{10}Sn_{15}Sb_{62}Te_5$ alloy, about 20 nm of an upper protective layer made of $(ZnS)_{80}(SiO_2)_{20}$, about 2 nm of an interface layer made of Ta, and about 200 nm of a reflective layer made of Ag, were formed in this order by sputtering.

For the initialization, a laser diode beam having a wavelength of about 810 nm and having an oval spot shape with a major axis of about 75 μm and a minor axis of about 1.0 μm, was used. And, the initialization was carried out by scanning at a linear velocity of about 24 m/s in a state where the minor axis of this laser diode beam was aligned in the circumferential direction and moving the major axis in the radial direction by every about 50 μm for every rotation. The irradiation power was about 1,500 mW.

On this disk, by means of the tester 1 with NA=0.65, overwriting of DVD compatible EFM+ modulation signal was carried out at 10-times velocity, and the characteristics were evaluated. While maintaining erasing power Pe and bias power Pb to be constant, Pw was varied every 1 mW from about 20 mW to about 30 mW, whereby the overwriting characteristics at the respective writing powers were evaluated. Each was evaluated by the value after overwriting ten times.

FIG. 16 shows divided recording pulses for the respective mark lengths used for the "3T strategy" shown in Example 3. In FIG. 16, the values of $\alpha_i$ and $\beta_i$ in each mark length are represented by the upper ruled column and the lower ruled column, respectively, in FIG. 16. These values are ones selected to minimize the jitter value by carrying out optimization of the respective parameter values by every ($1/15$)T of the reference clock period T, and thus represented by the values having 15 as the denominator.

The recording pulse strategy shown in FIG. 16 corresponds to the recording pulse division method (IIIa) shown in FIG. 8. Table 3 shows this as represented by means of independent parameters defined in FIGS. 8 and 9. $T_{c1+}=T_{c1-}=T_{c1}$ and $dT_{top}=0$, and accordingly, the number of independent parameters is 18 in total. Further, in Table 3, with respect to the 5T mark, $dT_{last5}$ is defined on the basis of the time point upon expiration of 3T from T1.

TABLE 3

| dTtop3 | −1/15T |
|---|---|
| dTtop4 | 0 |
| dTtop5 | −1/15T |
| Ttop3 | 18/15T |
| Ttop4 | 29/15T |
| Ttop5 | 20/15T |
| Ttop | 25/15T |
| Ttop+ | 30/15T |
| Tmp | 25/15T |
| dTlast5 | −9/15T |
| dTlast+ | 0 |
| Tlast5 | 15/15T |
| Tlast | 18/15T |
| Tlast+ | 30/15T |
| Tcl3 | 5/15T |
| Tcl4 | 8/15T |
| Tcl5 | 8/15T |
| Tcl = Tcl+ | 8/15T |

FIG. 17 shows divided recording pulses for the respective mark lengths used in the "2T strategy" shown as Comparative Example 3. In FIG. 14, the values of $\alpha_i$ and $\beta_i$ in each mark length are represented by the upper ruled column and the lower ruled column, respectively, in FIG. 17. As is evident from FIG. 17, since the divided pulse method is "2T strategy", in all record marks with m=at least 2, n/m is less than 2.5 except for the case of n=5. Namely, it is evident that in the "2T strategy" with respect to all record marks with m=at least 2, $2.5 \leq n/m$ is not satisfied.

Figure 18:
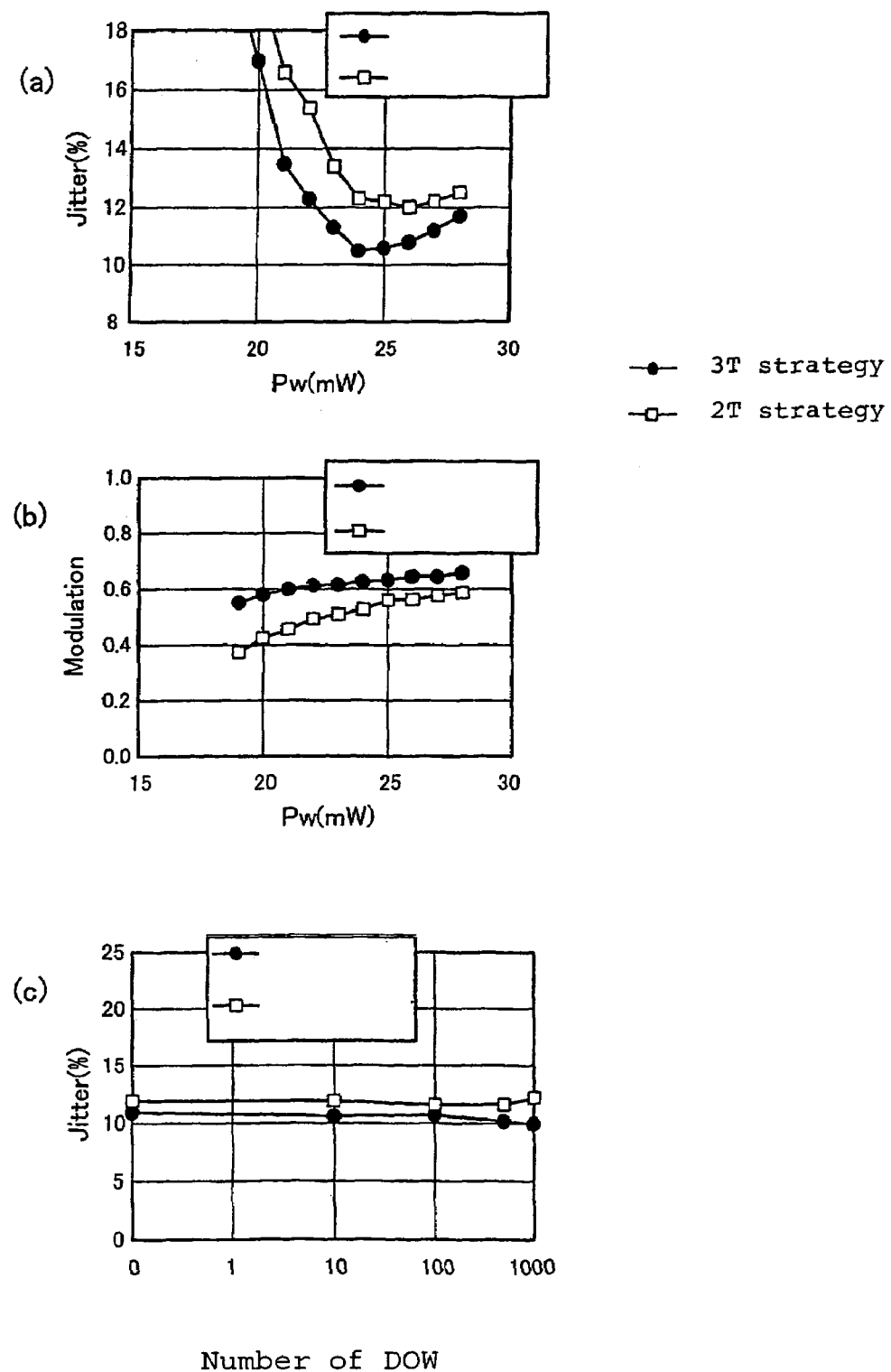
FIGS. 18(*a*) and (*b*) are graphs showing the writing power dependency of jitters and modulation after nine times of overwriting in Example 3 and Comparative Example 3, and FIG. 18(*c*) is a graph showing the overwriting times dependency of jitters.

FIGS. 18(*a*) and (*b*) are graphs showing the writing power dependency of the jitter and the modulation after overwriting nine times (writing ten times including the first writing) in Example 3 (3T strategy) and Comparative Example 3 (2T strategy). Further, FIG. 18(*c*) is a graph showing the dependency on the number of overwriting times of the jitter. In the measurements of the writing power dependency in FIGS. 18(*a*) and (*b*), Pe is constant i.e. in the "3T strategy", Pe=5.8 mW, and in the "2T strategy", Pe=5.6 mW. Further, in FIG. 18(*c*), in the "3T strategy", the measurement was carried out with Pw=24 mW and Pe=5.8 mW, and in the "2T strategy", the measurement was carried out with Pw=24 mW and Pe=5.6 mW. In each case, Pb=0.5 mW being constant.

The "3T strategy" in Example 3, as compared with the "2T strategy" in Comparative Example 3, the jitter is low, and a high value can be obtainable for the modulation. It is evident that by using the "3T strategy", good recording characteristics are obtained with a jitter value on the order of 10% and a modulation of at least 0.6. Further, the writing power to obtain the good characteristics is lower by the "3T strategy", and the recording sensitivity is also improved.

Example 4 and Comparative Example 4

On the disk as used in Example 3, by means of the tester 1 with NA=0.65, overwriting of DVD compatible EFM+ modulation signal was carried out at 4-times velocity, and the characteristics were evaluated.

FIG. 19 shows divided recording pulses for the respective mark lengths used in the "3T strategy" shown in Example 4. In FIG. 19, the values of $\alpha_i$ and $\beta_i$ in the respective mark lengths are represented by the upper ruled column and the lower ruled column, respectively, in FIG. 19. These values are ones selected to minimize the jitter value by carrying out optimization of the respective parameter values by every ($\frac{1}{16}$)T of the reference clock period T, and thus represented by the values having 16 as the denominator.

The recording pulse strategy shown in FIG. 19 corresponds to the recording pulse division method (VIIa) in which the recording pulse division method (IIIa) shown in FIG. 8 was applied at a low linear velocity. FIG. 4 shows this as represented by means of independent parameters defined in FIGS. 8 and 9. $T_{c1+}=T_{c1}$, and $dT_{top}=0$, and accordingly, the number of independent parameters is 18 in total. Further, in Table 4, with respect to the 5T mark, $dT_{last5}$ is defined on the basis of the time point upon expiration of 3T from T1.

TABLE 4

| | |
|---|---|
| dTtop3 | −2/16T |
| dTtop4 | −1/16T |
| dTtop5 | −1/16l |
| Ttop3 | 8/16T |
| Ttop4 | 14/16T |
| Ttop5 | 10/16T |
| Ttop | 10/16T |
| Ttop+ | 13/16T |
| Tmp | 10/16T |
| dTlast5 | −12/16T |
| dTlast+ | 0 |

TABLE 4-continued

| | |
|---|---|
| Tlast5 | 12/16T |
| Tlast | 7/16T |
| Tlast+ | 18/16T |
| Tcl3 | 21/16T |
| Tcl4 | 30/16T |
| Tcl5 | 12/16T |
| Tcl = Tcl+ | 24/16T |

FIG. 20 shows divided recording pulses for the respective mark lengths used in the "2T strategy" shown as Comparative Example 4. In FIG. 20, the values of $\alpha_i$ and $\beta_i$ in each mark length are represented by the upper ruled column and the lower ruled column, respectively, in FIG. 20. As is evident from FIG. 20, since the divided pulse method is "2T strategy", in all record marks with m=at least 2, n/m is less than 2.5 except for the case of n=5. Namely, in the "2T strategy", with respect to all record marks with m=at least 2, $2.5 \leq n/m$ is not satisfied.

Figure 21:
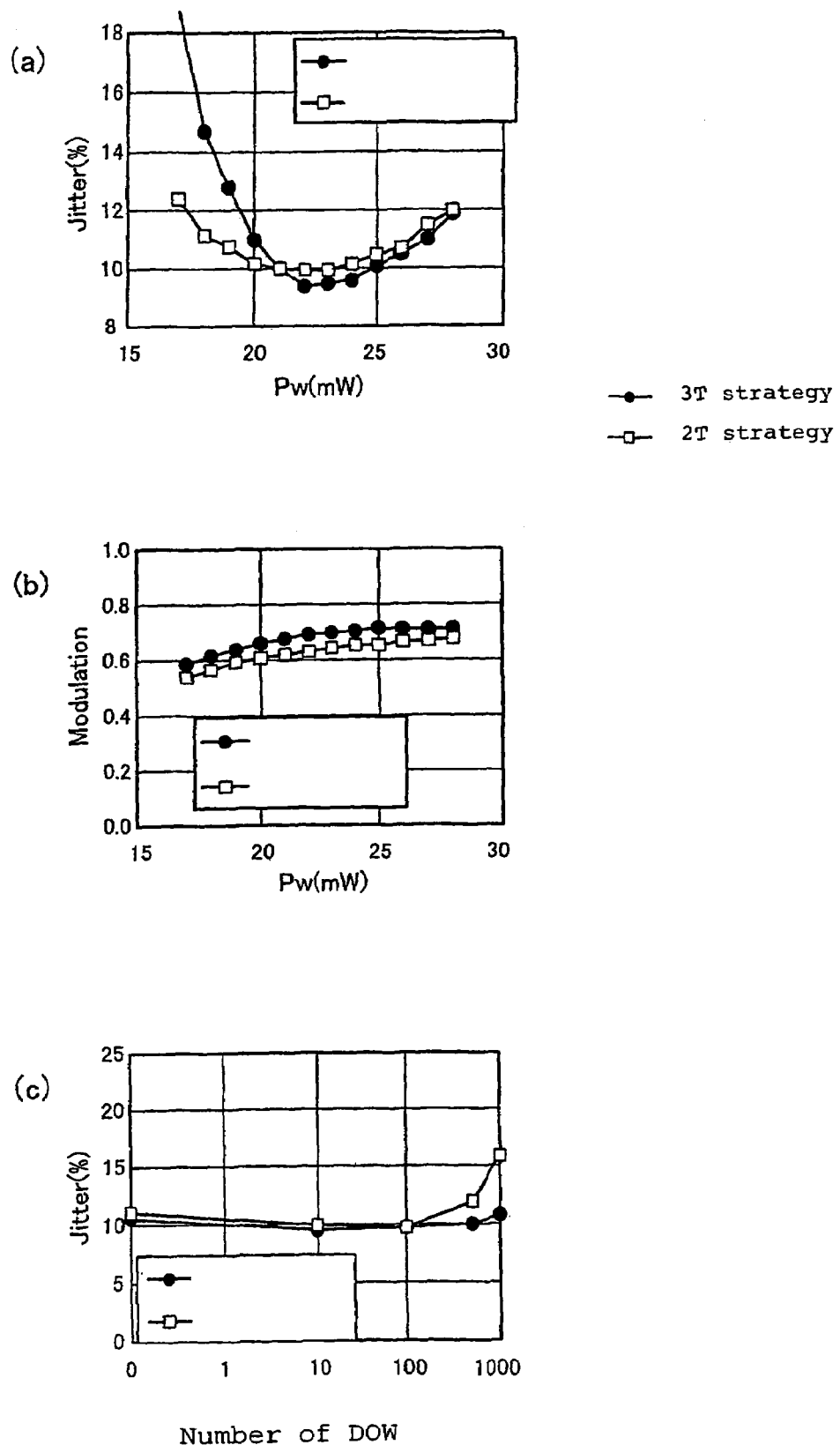
FIGS. 21(*a*) and (*b*) are graphs showing the writing power dependency of jitters and modulation after nine times of overwriting in Example 4 and Comparative Example 4, and FIG. 21(*c*) is a graph showing the overwriting times dependency of jitters.

FIGS. 21(*a*) and (*b*) are graphs showing the writing power dependency of the jitter and the modulation after overwriting nine times (writing ten times including the first writing) in Example 4 (3T strategy) and Comparative Example 4 (2T strategy). Further, FIG. 21(*c*) is a graph showing the dependency of the jitter on the number of overwriting times in the case of repetitive overwriting. In the measurements of the writing power dependency in FIGS. 21(*a*) and (*b*), Pe is constant i.e. in the "3T strategy", Pe=5.5 mW, and in the "2T strategy", Pe=5.5 mW. Further, in FIG. 21(*c*), in the "3T strategy", the measurement was carried out with Pw=23 mW and Pe=5.5 mW, and in the "2T strategy", the measurement was carried out with Pw=22 mW and Pe=5.5 mW. In each case, Pb=0.1 mW being constant.

In the "3T strategy" in Example 4, as compared with the "2T strategy" in Comparative Example 4, equivalent values are obtainable with respect to both the jitter and the modulation. It is evident that by using the "3T strategy", good recording characteristics are obtained with a jitter value of 10% and a modulation of at least 0.6. Further, the writing power to obtain the good characteristics is lower by the "3T strategy", and the recording sensitivity and the repetitive overwriting durability are also improved.

Example 5 and Example 6

In the above-described Basic Example, a disk was prepared and recording was carried out as follows.

On a substrate, about 65 nm of a lower protective layer made of $(ZnS)_{80}(SiO_2)_{20}$ (the protective layer composition being represented by mol % of ZnS and $SiO_2$, the same applies hereinafter), about 5 nm of a GeN interface layer, about 13 nm of a recording layer made of a $Ge_7In_6Sn_{24}Sb_{56}Te_7$ alloy (the recording layer composition being atomic %), about 5 nm of a GeN interface layer, about 10 nm of an upper protective layer made of $(ZnS)_{80}(SiO_2)_{20}$, about 2 nm of an interface layer made of Ta and about 150 nm of a reflective layer made of Ag, were formed in this order by sputtering.

For the initialization, a laser diode beam having a wavelength of about 810 nm and having an oval spot shape with a major axis of about 75 μm and a minor axis of about 1.0 μm, was used. And, the initialization was carried out by scanning at a linear velocity of about 30 m/s in a state such that the minor axis of this laser diode beam was aligned in the circumferential direction and moving the major axis in the radial direction by every about 50 μm for every rotation. The irradiation power was about 1,600 mW.

On the above disk, by means of the tester 1 with NA=0.65, overwriting of a DVD compatible EFM+ modulation signal was carried out at 12-times velocity (Example 5) or 4-times velocity (Example 6), and the characteristics were evaluated. For the "4T strategy" in Examples 5 and 6, the divided recording pulses as shown in FIGS. 28 and 29 were used for the respective mark lengths. In FIGS. 28 and 29, the values of $\alpha_1$ and $\beta_1$ in each mark length are represented by the upper ruled column and the lower ruled column, respectively, in the Figs. These values were ones selected to minimize the jitter values by carrying out optimization of the respective parameter values by every $(1/12)T$ and $(1/15)T$ of the reference clock period T, respectively, in Examples 5 and 6, and thus are represented by values having 12 or 15 as the denominator.

The recording pulse strategies shown in FIGS. 28 and 29 correspond to the recording pulse division method (IVa) shown in FIG. 8 and the recording pulse division method (VIIIa) wherein it is applied at a low linear velocity. When represented by means of independent parameters defined in FIG. 8, the divided recording pulses in FIGS. 28 and 29 will be defined by the values as shown in Table 5. The number of independent parameters is 24 in total. Among them, if the number of parameters being 0 is deducted, the number of independent parameter is 18. Further, in Table 5, with respect to the 5T mark, $dT_{last5}$ is defined on the basis of the time point upon expiration of 3T from T1.

TABLE 5

|  | 4-times velocity | 12-times velocity |
|---|---|---|
| dTtop3 | 0 | 0 |
| dTtop4 | 0 | 0 |
| dTtop5 | 0 | 0 |
| dTtop | 0 | 0 |
| dTtop+ | 0 | 0 |
| Ttop3 | 4/15T | 12/12T |
| Ttop4 | 11/15T | 22/12T |
| Ttop5 | 5/15T | 13/12T |
| Ttop | 5/15T | 16/12T |
| Ttop+ | 10/15T | 20/12T |
| Tmp | 10/15T | 20/12T |
| dTlast5 | −11/15T | −6/12T |
| dTlast− | −12/15T | −11/12T |
| dTlast+ | 0 | 0 |
| Tlast5T | 5/15T | 9/12T |
| Tlast | 6/15T | 12/12T |
| Tlast− | 5/15T | 12/12T |
| Tlast+ | 10/15T | 22/12T |
| Tcl3 | 34/15T | 6/12T |
| Tcl4 | 44/15T | 8/12T |
| Tcl5 | 28/15T | 8/12T |
| Tcl | 30/15T | 8/12T |
| Tcl− | 28/15T | 8/12T |
| Tcl+ | 42/15T | 8/12T |

Figure 30:
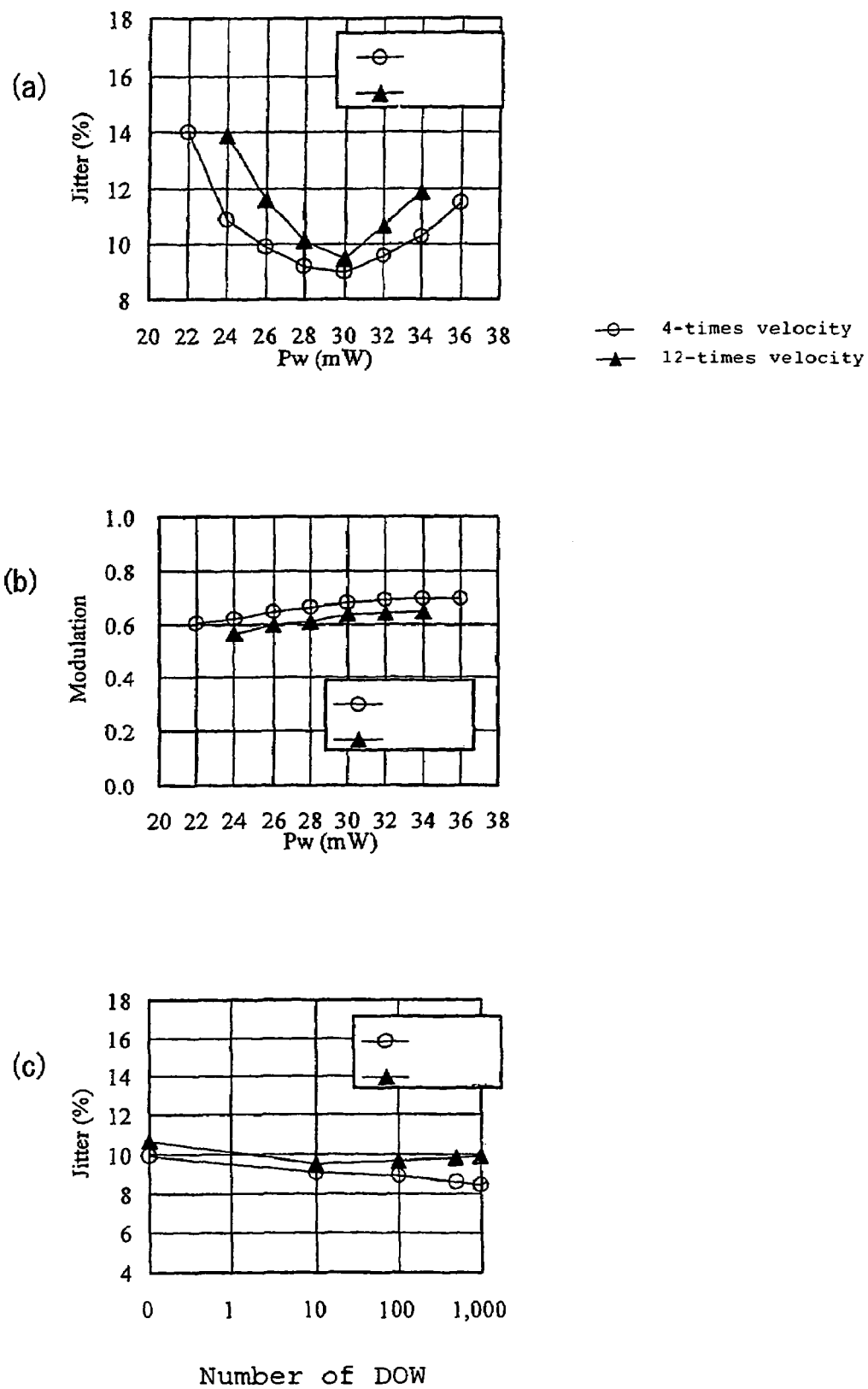
FIGS. 30(*a*) and (*b*) are graphs showing the writing power dependency of jitters and modulation after nine times of overwriting in Example 5 and Example 6, and FIG. 30(*c*) is a graph showing the overwriting times dependency of jitters.

FIGS. 30(*a*) and (*b*) show the writing power dependency of jitter and modulation after overwriting nine times (writing ten times including the first writing). Further, FIG. 30(*c*) shows the dependency of jitter on the number of overwriting times in the repetitive overwriting. The results of Examples 5 and 6 distinguished by legends of "12-times velocity" and "4-times velocity", respectively, in the Figs. In the measurements of the writing power dependency in FIGS. 30(*a*) and (*b*), Pe and Pb are constant, i.e. in the "12-times velocity", Pe=6.4 mW and Pb=0.3 mW, and in the "4-times velocity", Pe=6.2 mW and Pb=0. mW. Further, in FIG. 30(*c*), in the "12-times velocity", the measurement was carried out with Pw=30 mW, Pe=6.4 mW and Pb=0.3 mW, and in the "4-times velocity", the measurement was carried out with Pw=30 mW, Pe=6.2 mW and Pb=0.1 mW.

By the "4T strategy" in Examples 5 and 6, equivalent values were obtained with respect to both jitter and modulation. It is evident that by using the "4T strategy", good recording characteristics were obtained with a jitter value of at most about 10% and a modulation of at least 0.6. Further, good results were obtained also with respect to the recording sensitivity and the repetitive overwriting durability.

On the other hand, when the "2T strategy" was applied to the recording media in these Examples, the cooling effect at the cooling sections was inadequate at each of 12-times velocity and 4-times velocity. Specifically, in the "2T strategy", it was difficult to form good amorphous marks, and jitter values lower than about 13% were not obtained. Further, in the "1T strategy", the portion melted by the writing power was substantially completely recrystallized, and it was difficult to form amorphous marks.

Example 7

A disk based on the CD-RW format was prepared, and recording was carried out, as follows.

A polycarbonate resin substrate having a thickness of 1.2 mm and a track pitch of 1.6 μm was formed by injection molding. The groove width was about 0.6 μm, and the depth was about 30 nm.

Then, on the substrate, about 80 nm of a lower protective layer made of $(ZnS)_{80}(SiO_2)_{20}$ (the protective layer composition being represented by mol % of ZnS and $SiO_2$, the same applies hereinafter), about 15 nm of a recording layer made of a $Sn_{25}Ge_{13}Sb_{62}$ alloy (the recording is layer composition being represented by atomic %), about 30 nm of an upper protective layer made of $(ZnS)_{80}(SiO_2)_{20}$, about 3 nm of an interface layer made of Ta, and about 150 nm of a reflective layer made of Ag, were formed in this order, and finally, an ultraviolet-curable resin layer was formed in this order. The respective layers were sequentially deposited on the substrate by sputtering without breaking vacuum. However, the ultraviolet-curable resin layer (thickness: about 4 μm) was coated by spin coating.

Immediately after the deposition, the recording layer was amorphous, and by a laser beam having a wavelength of about 810 nm and focused into an oval shape having a major axis of about 75 μm and a minor axis of about 1.0 μm, the entire surface was crystallized at a linear velocity of 12 m/s and with an initialization power of about 800 mW to obtain an initial (unrecorded) state.

Recording/retrieving evaluation was carried out by means of DDU1000 tester manufactured by Pulsteck Co. (wavelength: about 780 nm, NA=0.5, spot shape: an oval shape of about 1.42×1.33 μm with an intensity of $1/e^2$, hereinafter this tester will be referred to as tester 2).

The reference clock period of data was set to be about 5.8 nsec i.e. the value inversely proportionated at each linear velocity against the reference clock period 231 nsec of data at 1-time velocity.

Unless otherwise specified, retrieving was carried out at 1-time velocity. The output signal from DDU1000 was passed through a high frequency-passing filter having a cutoff at between 5 and 20 kHz, whereupon the jitter was measured by a time interval analyzer (manufactured by Yokogawa Electric Corporation). Modulation $m_{11}$ ($=I_{11}/I_{top}$) was read out by an inspection of the eye pattern on an oscilloscope.

Formation of a logic level to control the recording pulse division method was carried out by means of an arbitrary signal generator (AWG620 or AWG710, manufactured by Sony Tektronix Co.). From the above signal generator, 2 channel gate signals comprising a logic signal corresponding generally to one having G1, G2 and G3 in FIG. 5 integrated and a logic signal corresponding to G4, were taken out and, as ECL level logic signals, input as gate signals against a laser driver of the above tester 2.

EFM random data were overwritten ten times, whereupon the mark lengths and space lengths jitters, and $m_{11}$ were measured. With EFM random data, mark lengths and space lengths of from 3T to 11T randomly appear. The reference clock period of data at 40-times velocity was set to be the value (about 5.8 nsec) inversely proportionated at the linear velocity against the reference clock period 231 nsec of data at 1-time velocity, and mark length modulation recording by EFM modulation was carried out. Retrieving was carried out at 1-time velocity.

In Example 7 for "3T strategy", divided recording pulses shown in FIG. 31 were used for the respective mark lengths. In FIG. 31, the values of $\alpha_i$ and $\beta_i$ in each mark length are represented by the upper ruled column and the lower ruled column, respectively, in the Fig. These values were ones selected to minimize the jitter value by carrying out optimization of the respective parameter values by every $\frac{1}{15}T$ of the reference clock period T, respectively, in Example 7, and thus are represented by the values having 15 as the denominator.

The recording pulse strategy in FIG. 31 corresponds to the recording pulse division method (IIa) shown in FIGS. 4 and 5, but is different in that two divided recording pulses were used for the formation of the 4T mark length and in that $dT_{top}$ is different between 6T and 7T mark lengths and 8T, 9T, 10T and 11T mark lengths, whereby the number of independent parameters were further increased. In this Example, a thermal interference effect was observed between the prescribed record marks and the preceding or subsequent record marks, and therefore, correction by $dT_{top}$ was carried out. When parameters to form the 4T mark, $dT_{top4}$, $T_{top4}$, $dT_{last4}$, $T_{last4}$, $T_{c14}$, and $dT_{top6}$ and $dT_{top8}$ i.e. $dT_{top}$ values for the 6-7T mark lengths and the 8-11T mark lengths respectively, are added to the independent parameters defined in FIG. 4, divided recording pulses in FIG. 31 will be defined by the values as shown in Table 6. The number of independent parameters is 23 in total. Further, in Table 6, with respect to the 4T and 5T marks, $dT_{last4}$ and $dT_{last5}$ are defined on the basis of the time point upon expiration of 3T from T1.

TABLE 6

| | |
|---|---|
| dTtop3 | −2/15T |
| dTtop4 | −5/15T |
| dTtop5 | −2/15T |
| dTtop6 | 0 |
| dTtop8 | −1/15T |
| Ttop3 | 23/15T |
| Ttop4 | 21/15T |
| Ttop5 | 21/15T |
| Ttop | 21/15T |
| Tmp | 20/15T |
| dTlast4 | −14/15T |
| dTlast5 | −7/15T |
| dTlast− | −6/15T |
| dTlast+ | 3/15T |
| Tlast4 | 11/15T |
| Tlast5 | 16/15T |
| Tlast− | 15/15T |

TABLE 6-continued

| | |
|---|---|
| Tlast | 21/15T |
| Tlast+ | 32/15T |
| Tcl3 | 15/15T |
| Tcl4 | 12/15T |
| Tcl5 | 12/15T |
| Tcl = Tcl− = Tcl+ | 12/15T |

Figure 32:
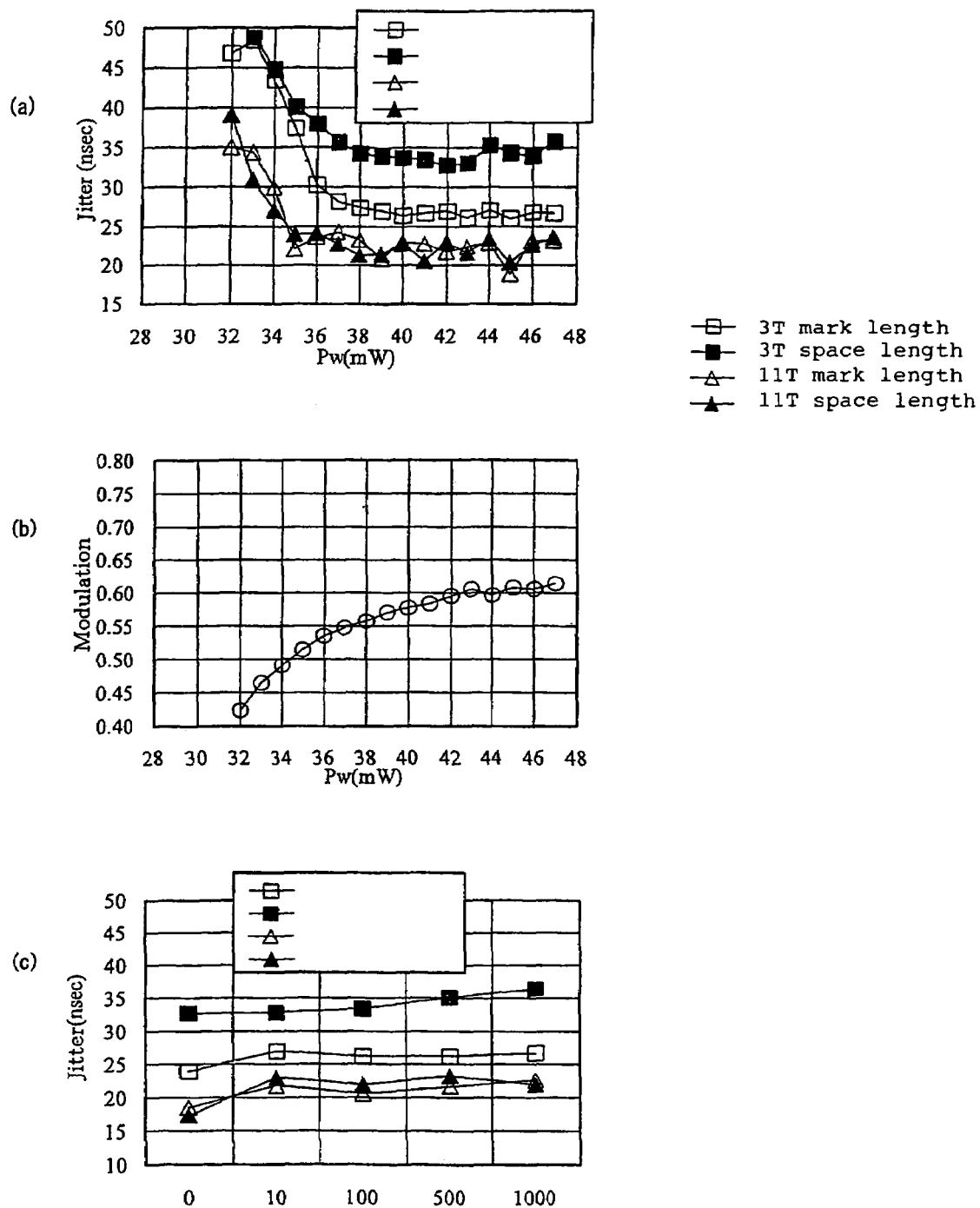
FIGS. 32(*a*) and (*b*) are graphs showing the writing power dependency of jitters and modulation after nine times of overwriting in Example 7, and FIG. 32(*c*) is a graph showing the overwriting times dependency of jitters.

FIGS. 32(a) and (b) show the writing power dependency of jitter and modulation after overwriting nine times (writing ten times including the first writing). With CD-RW, usually, jitter (not normalized by the clock period) is measured for every mark length or (space) length between marks. However, here, with respect to 3T and 11T mark lengths and space lengths between marks, jitter was shown as representatives.

Further, FIG. 32(c) shows the dependency of jitter on the number of overwriting times in the repetitive overwriting. In the measurements of the writing power dependency in FIGS. 32(a) and (b), Pe/Pw and Pb were constant i.e. Pe/Pw=0.27 (instead of the value Pe, the ratio of Pe/Pw is made constant), and Pb=0.8 mW. Further, in FIG. 32(c), Pw=42 mW, Pe=11 mW, and Pb=0.8 mW. By the "3T strategy" in Example 7, good values were obtained with respect to both jitter and modulation. Namely, good recording characteristics were obtained with a jitter value of at most 35 nsec and a modulation of at least 0.6, which are required by CD-RW standards.

On the other hand, when the "2T strategy" was applied to the recording medium of this Example, the cooling effect at the cooling sections was inadequate. By using the "2T strategy", it was difficult to form good amorphous marks, and a jitter value lower than about 40 nsec was not obtained. Further, by the "1T strategy", the portion melted by writing power was substantially completely recrystallized, and it was difficult to form amorphous marks.

Comparative Example 5

By using the disk in Example 1 and the recording pulse strategy and measuring conditions in Table 1, it was attempted to adjust the mark lengths by changing only $\alpha_m$ by paying attention to the cases of 8T, 9T and 10T marks with L=3.

$\alpha_m = 21/15T$ employed for the 9T mark, was used as the base. And, for the 8T mark, $\alpha_m$ was shortened to adjust the mark length. Further, for the 10T mark, $\alpha_m$ was elongated to adjust the mark length. Specifically, for the 8T mark, $\alpha_m = 14/15T$, whereby the 8T mark length was obtained. Whereas, for the 10T mark, $\alpha_m = 25/15T$, whereby the 10T mark length was obtained.

For every mark length, jitter was separately measured, whereby with respect to the respective marks of 8T, 9T and 10T, jitters were 16.7%, 9.5% and 10.2%, respectively.

In Example 1, for the respective marks of 8T, 9T and 10T, the jitters were 10.4%, 9.2% and 8.8%, respectively, (here, the data to clock jitter in this case was about 9%).

From the foregoing results, it is evident that by adjustment of only $\alpha_m$, the jitter at the rear end of a mark length tends to be high. This indicates that by the change of $\alpha_m$, the thermal distribution will also change as between before and after irradiation with $\alpha_m T$. Accordingly, it is evident that when $\alpha_m$ is changed, at least either $\beta_{m-1}$ or $\beta_m$ is required to be adjusted.

Comparative Example 6

By using the disk in Example 3 and the recording pulse strategy and measuring conditions in Table 3, it was attempted to adjust the mark lengths by changing only $\alpha_1$ by paying attention to the cases of 10T and 11T marks with L=3.

$\alpha_1 = 25/15\,T$ employed for the 10T mark was used as the base. And, for the 11T mark, $\alpha_1$ is elongated to adjust the mark length. However, even if it was attempted to elongate $\alpha_1$, it was impossible to obtain a 11T mark length (about 420 nsec at 1-time velocity). The maximum mark length obtained here was at a level of 400 nsec.

If it is attempted to simply increase $\alpha_1$, due to the heat accumulating effect of the front pulse $\alpha_1 T$, the front end of the mark rather tends to be recrystallized. It is considered that therefore, even if $\alpha_1$ is elongated, the mark length will not extend beyond a certain value. Therefore, the space between $\alpha_1 T$ and $\alpha_2 T$ was taken to be 4T (accurately, in FIG. 7, the length from T1 to the rising of $\alpha_2 T$ was made to be 4T), so that $\beta_1 T$ was elongated. As a result, good results equivalent to Example 3 were obtained. This indicates that by elongating $\beta_1 T$, the heat accumulating effect by $\alpha_1 T$ was suppressed, whereby recrystallization of the front end of the mark was suppressed.

INDUSTRIAL APPLICABILITY

According to the present invention, an optical recording method or an optical recording device applicable to recording at a high data transport rate will be provided.

In the foregoing, the present invention has been described in detail with reference to specific embodiments. However, it is evident to those skilled in the art that various changes and modifications are possible without departing from the concept and scope of the present invention.

Further, this application is based on a Japanese application (JP2003-199522) filed on Jul. 18, 2003 and a Japanese application (JP2003-334342) filed on Sep. 25, 2003, and their entireties are hereby included by reference.

What is claimed is:

1. An optical recording method for recording mark length-modulated information on a recording medium by applying a recording laser beam locally to the recording medium, characterized in that
when the record mark length of one record mark is represented by nT (where T is the reference clock period, and n is a natural number of at least 2),
in order to form the record mark length of nT, m pieces of recording pulses $\alpha_i T$ ($1 \leq i \leq m$) and m pieces of off-pulses $\beta_i T$ ($1 \leq i \leq m$), represented by:

$\alpha_1 T, \beta_1 T, \alpha_2 T, \beta_2 T, \ldots, \alpha_i T, \beta_i T, \ldots, \alpha_m T, \beta_m T$ where m is a natural number representing a pulse dividing number, $\alpha_i$ ($1 \leq i \leq m$) is a real number of larger than 0, $\beta_i$ ($1 \leq i \leq m-1$) is a real number of larger than 0, and $\beta_m$ is a real number of at least 0), are used, and
a recording laser beam having a writing power $Pw_i$ is applied within a time of $\alpha_i T$ at any of $1 \leq i \leq m$,
a recording laser beam having a bias power $Pb_i$ of $Pb_i < Pw_i$ and $Pb_i < Pw_{i+1}$, is applied within a time of $\beta_i T$ at any of $1 \leq i \leq m-1$,
the front recording pulse $\alpha_1 T$ will rise as deviated for a time of $dT_{top}$ from the front position of the record mark having a length of nT ($dT_{top}$ being positive, when the rising is delayed from the front position of the record mark having a length of nT),
with respect to at least two record marks, the pulse dividing number m is at least 2, and with respect to all record marks with m being at least 2, $2.5 \leq n/m$,
in a case where plural different record mark lengths are to be respectively formed by the same pulse dividing number m, $\alpha_1$ and/or $\alpha_m$ is changed to form such record mark lengths having different lengths respectively, provided that
when the $\alpha_1$ is changed, $dT_{top}$ and/or $\beta_1$ is also changed, and
when the $\alpha_m$ is changed, $\beta_{m-1}$ and/or $\beta_m$ is also changed, and 2. The optical recording method according to claim 1, wherein with respect to all record marks with the pulse dividing number m being at least 2, $n/m \leq 5$.

3. The optical recording method according to claim 1, wherein with respect to all record marks with the pulse dividing number m being at least 2, $\alpha_i + \beta_i$, at $1 \leq i \leq m-1$ takes a value of either about 3 or 4.

4. The optical recording method according to claim 1, wherein on the basis of an optical recording method to be used for forming one record mark length A among plural different record mark lengths to be formed by the same pulse dividing number m,
$\alpha_1$ or $\alpha_m$ is changed in such an optical recording method, to form record mark lengths other than the record mark length A among the plural different record mark lengths.

5. The optical recording method according to claim 1, wherein at least three different record mark lengths are formed by the same pulse dividing number m.

6. The optical recording method according to claim 1, wherein m is increased by 1 every time when n is increased by 3 or 4.

7. The optical recording method according to claim 6, wherein
m=1 for a record mark length with n=2, 3 or 4,
m=2 for a record mark length with n=5, 6 or 7,
m=3 for a record mark length with n=8, 9 or 10,
m=4 for a record mark length with n=11, 12 or 13, and
m=5 for a record mark length with n=14, 15 or 16.

8. The optical recording method according to claim 7, wherein three record mark lengths with n=3L−1, 3L and 3L+1 to be formed by the same dividing number m=L L≧2, are taken as one set, and on the basis of an optical recording method to be used for forming the record mark length with n=3L, at least $\alpha_m$ is decreased or increased in such an optical recording method to form the record mark length with n=3L−1 or n=3L+1, respectively.

9. The optical recording method according to claim 8, wherein with respect to the three record mark lengths with n=3L−1, 3L and 3L+1 L≧2, their respective $\alpha_m$, $\beta_{m-1}$ and $\beta_m$ values are constant irrespective of L.

10. The optical recording method according to claim 8, wherein with respect to the three record mark lengths with n=3L−1, 3L and 3L+1 L≧2, their respective $\alpha_m$, $\beta_{m-1}$ and $\beta_m$ values are constant irrespective of L, except for a case where n=5.

11. The optical recording method according to claim 7, wherein three record mark lengths with n=3L−1, 3L and 3L+1 to be formed by the same dividing number m=L L≧2, are taken as one set; and
on the basis of an optical recording method to be used for forming the record mark length with n=3L, at least $\alpha_m$ is decreased in such an optical recording method to form the record mark length with n=3L−1, and further, on the basis of an optical recording method to be used for forming the record mark length with n=3L, at least $\alpha_1$ is increased in such an optical recording method to form the record mark length with n=3L+1.

12. The optical recording method according to claim 11, wherein with respect to the three record mark lengths with n=3L−1, 3L and 3L+1 L≧2, their respective $\alpha_1$, $dT_{top}$, $\beta_1$, $\alpha_m$, $\beta_{m-1}$ and $\beta_m$ values are constant irrespective of L.

13. The optical recording method according to claim 11, wherein with respect to the three record mark lengths with n=3L−1, 3L and 3L+1 L≧2, their respective $\alpha_1$, $dT_{top}$, $\beta_1$, $\alpha_m$, $\beta_{m-1}$ and $\beta_m$ values are constant irrespective of L, except for a case where n=5.

14. The optical recording method according to claim 1, wherein with respect to all record mark lengths with n being at least 6, n/m is made to be at least 3.

15. The optical recording method according to claim 6 or 14, wherein
m=1 for a record mark length with n=2, 3 or 4,
m=2 for a record mark length with n=5, 6, 7 or 8,
m=3 for a record mark length with n=9, 10 or 11,
m=4 for a record mark length with n=12, 13 or 14, and
m=5 for a record mark length with n=15, 16 or 17.

16. The optical recording method according to claim 15, wherein three record mark lengths with n=3L, 3L+1 and 3L+2 to be formed by the same dividing number m=L L≧2, are taken as one set; and
on the basis of an optical recording method to be used for forming the record mark length with n=3L, at least $\alpha_m$ is increased in such an optical recording method to form the record mark length with n=3L+1, and further,
on the basis of an optical recording method to be used for forming the record mark length with n=3L+1, at least $\alpha_1$ is increased in such an optical recording method to form the record mark length with n=3L+2.

17. The optical recording method according to claim 15, wherein three record mark lengths with n=3L, 3L+1 and 3L+2 to be formed by the same dividing number m=L L≧2, are taken as one set; and
on the basis of an optical recording method to be used for forming the record mark length with n=3L, at least $\alpha_1$ is increased in such an optical recording method to form the record mark length with n=3L+1, and further,
on the basis of an optical recording method to be used for forming the record mark length with n=3L+1, at least $\alpha_m$ is increased in such an optical recording method to form the record mark length with n=3L+2.

18. The optical recording method according to claim 16, wherein with respect to the three record mark lengths with n=3L, 3L+1 and 3L+2 L≧2, their respective $\alpha_1$ $dT_{top}$, $\beta_1$, $\alpha_m$, $\beta_{m-1}$ and $\beta_m$ values are constant irrespective of L.

19. The optical recording method according to claim 6 or 14, wherein
m=1 for a record mark length with n=2, 3 or 4,
m=2 for a record mark length with n=5, 6, 7 or 8,
m=3 for a record mark length with n=9, 10, 11 or 12, and
m=4 for a record mark length with n=13, 14, 15 or 16.

20. The optical recording method according to claim 19, wherein four record mark lengths with n=4L−3, 4L−2, 4L−1 and 4L to be formed by the same dividing number m=L L≧2, are taken as one set; and
on the basis of an optical recording method to be used for forming the record mark length with n=4L−2, at least $\alpha_m$ is increased or decreased in such an optical recording method to form the record mark length with n=4L−1 or 4L−3, respectively, and further,
on the basis of an optical recording method to be used for forming the record mark length with n=4L−1, at least $\alpha_1$ is increased in such an optical recording method to form the record mark length with n=4L.

21. The optical recording method according to claim 19, wherein four record mark lengths with n=4L−3, 4L−2, 4L−1 and 4L to be formed by the same dividing number m=L L≧2, are taken as one set; and
on the basis of an optical recording method to be used for forming the record mark length with n=4L−2, at least $\alpha_m$ is decreased in such an optical recording method to form the record mark length with 4L−3,
on the basis of an optical recording method to be used for forming the record mark length with n=4L−2, at least $\alpha_1$ is increased in such an optical recording method to form the record mark length with n=4L−1, and further,
on the basis of an optical recording method to be used for forming the record mark length with n=4L−1, at least $\alpha_m$ is increased in such an optical recording method to form the record mark length with n=4L.

22. The optical recording method according to claim 20, wherein with respect to the four record mark lengths with n=4L−3, 4L−2, 4L−1 and 4L L≧2, their respective $\alpha_1$, $dT_{top}$, $\beta_1$, $\alpha_m$, $\beta_{m-1}$ and $\beta_m$ values are constant irrespective of L.

23. The optical recording method according to claim 20, wherein with respect to the four record mark lengths with n=4L−3, 4L−2, 4L−1 and 4L L≧2, their respective $\alpha_1$, $dT_{top}$, $\beta_1$, $\alpha_m$, $\beta_{m-1}$ and $\beta_m$ values are constant irrespective of L, except for a case where n=5.

24. The optical recording method according to claim 1, wherein when n=4, n/m=2.

25. An optical recording device for recording mark length-modulated information on a recording medium by applying a recording laser beam locally to the recording medium, characterized in that it is constructed so that
when the record mark length of one record mark is represented by nT, where T is the reference clock period, and n is a natural number of at least 2,
in order to form the record mark length of nT, m pieces of recording pulses $\alpha_i T$, $1 \leq i \leq m$, and m pieces of off-pulses $\beta_i T$, $1 \leq i \leq m$, represented by: $\alpha_1 T$, $\beta_1 T$, $\alpha_2 T$, $\beta_2 T$, ..., $\alpha_i T$, $\beta_i T$, ..., $\alpha_m T$, $\beta_m T$,
where m is a natural number representing a pulse dividing number, $\alpha_i$, $1 \leq i \leq m$, is a real number of larger than 0, $\beta_i$, $1 \leq i \leq m-1$, is a real number of larger than 0, and $\beta_m$ is a real number of at least 0, are used, and
a recording laser beam having a writing power $Pw_i$ is applied within a time of $\alpha_i T$ at any of $1 \leq i \leq m$,
a recording laser beam having a bias power $Pb_i$ of $Pb_i < Pw_i$ and $Pb_i < Pw_{i+1}$, is applied within a time of $\beta_i T$ at any of $1 \leq i \leq m-1$,
the front recording pulse $\alpha_1 T$ will rise as deviated for a time of $dT_{top}$ from the front position of the record mark having a length of nT $dT_{top}$ being positive, when the rising is delayed from the front position of the record mark having a length of nT,
with respect to at least two record marks, the pulse dividing number m is at least 2, and with respect to all record marks with m being at least 2, $2.5 \leq n/m$,
in a case where plural different record mark lengths are to be respectively formed by the same pulse dividing number m, $\alpha_1$ and/or $\alpha_m$ is changed to form such record mark lengths having different lengths respectively, provided that
when the $\alpha_1$ is changed, $dT_{top}$ and/or $\beta_1$ is also changed, and
when the $\alpha_m$ is changed, $\beta_{m-1}$ and/or $\beta_m$ is also changed.

* * * * *

UNITED STATES PATENT AND TRADEMARK OFFICE
CERTIFICATE OF CORRECTION

PATENT NO. : 7,277,376 B2
APPLICATION NO. : 11/251941
DATED : October 2, 2007
INVENTOR(S) : Michikazu Horie et al.

It is certified that error appears in the above-identified patent and that said Letters Patent is hereby corrected as shown below:

Column 76, lines 11-12, change "also changed, and" to --also changed.--.

Signed and Sealed this

Fifteenth Day of April, 2008

JON W. DUDAS
*Director of the United States Patent and Trademark Office*